United States Patent [19]

Fisk et al.

[11] 4,104,726

[45] Aug. 1, 1978

[54] PROGRAMMABLE CONTROLLER FOR CONTROLLING REPRODUCTION MACHINES

[75] Inventors: Bernard C. Fisk, Dallas, Tex.; Gerald C. Verschage, Henrietta, N.Y.

[73] Assignee: Xerox Corporation, Stamford, Conn.

[21] Appl. No.: 628,035

[22] Filed: Nov. 3, 1975

Related U.S. Application Data

[63] Continuation of Ser. No. 496,663, Aug. 12, 1974.

[51] Int. Cl.² ............... G06F 15/20; G03G 15/00
[52] U.S. Cl. ............................ 364/518; 355/14; 364/107; 364/120
[58] Field of Search .............. 444/1; 340/172.5; 235/151.1, 151; 355/3, 14, 16, 17; 178/6.6 A; 346/74 R, 74 ES; 364/107, 120, 514, 515, 518

[56] References Cited

U.S. PATENT DOCUMENTS

| | | | |
|---|---|---|---|
| 3,512,885 | 5/1970 | Osborne et al. | 355/14 |
| 3,690,760 | 9/1972 | Banks et al. | 355/14 X |
| 3,797,931 | 3/1974 | Miciukiewicz et al. | 355/14 X |
| 3,914,047 | 10/1975 | Hunt, Jr. et al. | 355/14 X |

*Primary Examiner*—Joseph F. Ruggiero
*Attorney, Agent, or Firm*—G. Gregory Schivley; John E. Beck; James J. Ralabate

[57] ABSTRACT

A programmable controller is utilized to control a reproduction machine for producing impressions of an original on a support material. The reproduction machine includes a photosensitive member and a plurality of discrete operating components mutually cooperable with the photoreceptive member to electrostatically produce the impressions. The programmable controller incorporates a computer which operates under the direction of a master program. The computer calculates timing signals in accordance with the program information and stores the timing signals in a memory for later actuation of the components in a properly timed sequence to produce the copies desired. The machine, under the direction of the computer, periodically checks the operability of at least one of the operating components in the interval between the timing signals. Similarly, the timing signals stored in the memory are periodically updated during the intervals between actuation of the operating components.

5 Claims, 29 Drawing Figures

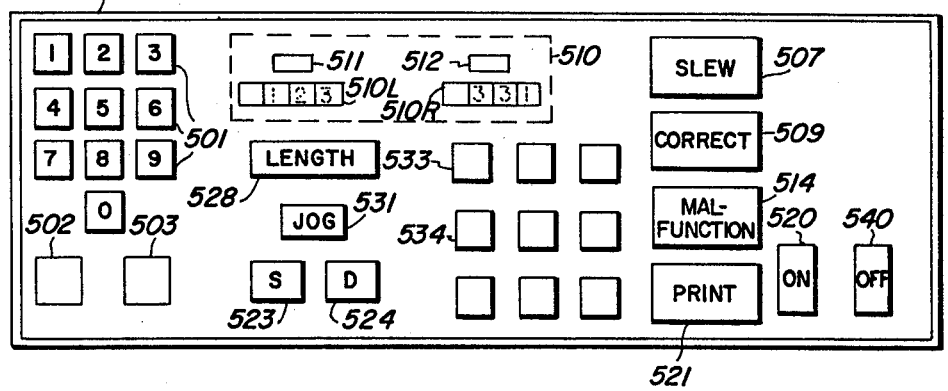
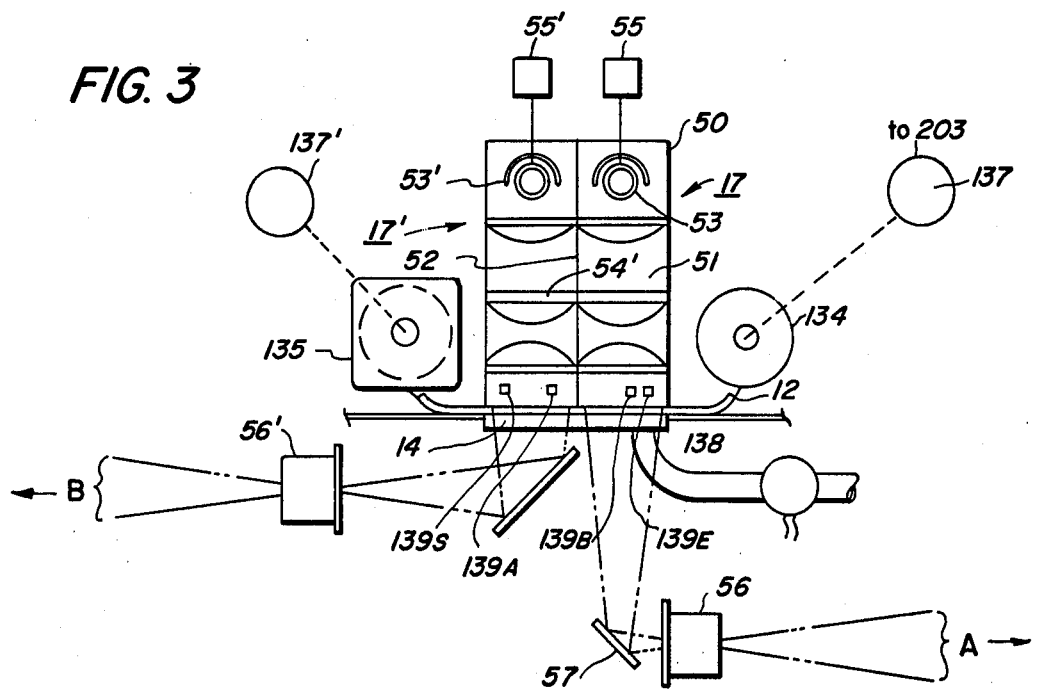
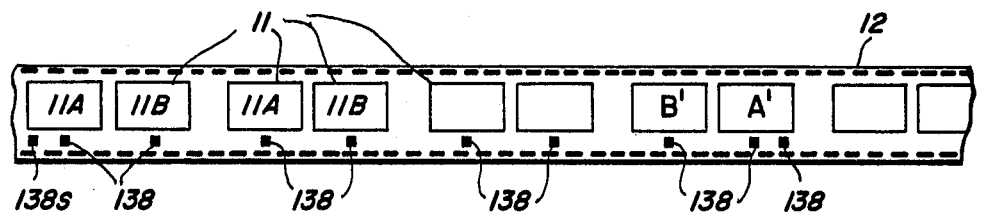

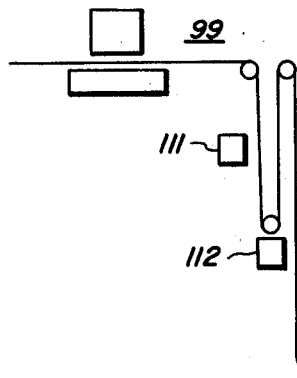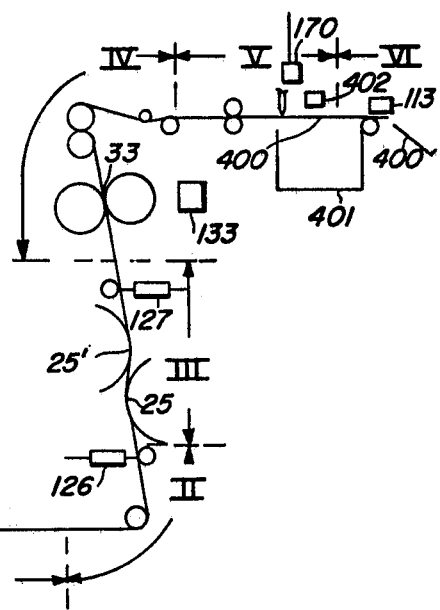
FIG. 10 PAPER PATH PITCH ZONES
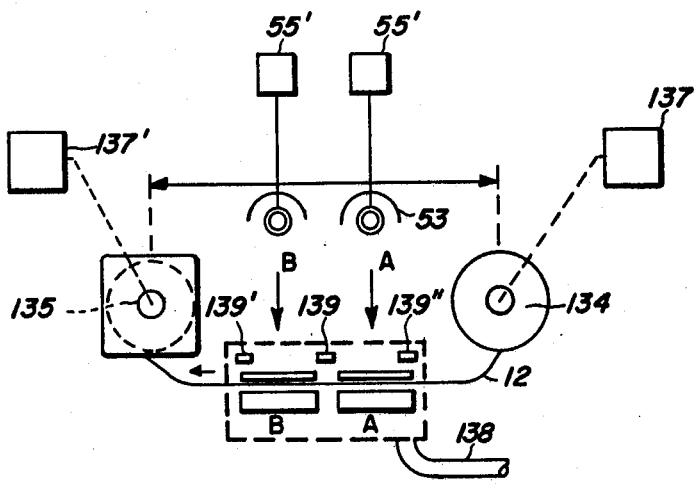
FIG. 11 FILM PITCH ZONES
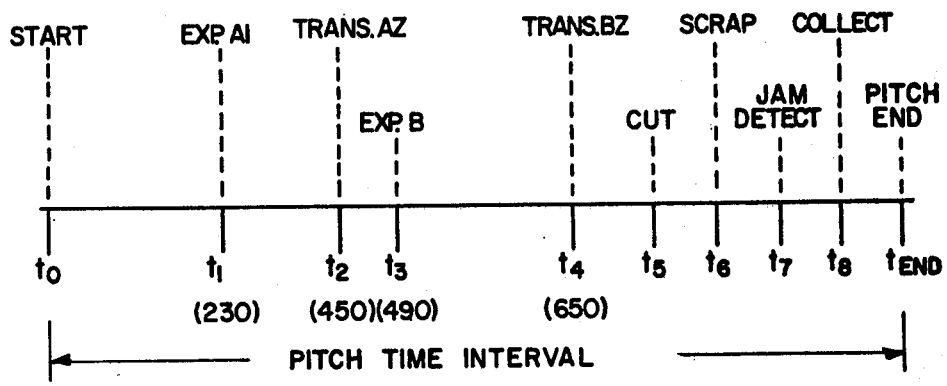
FIG. 14

XEROGRAPHIC PITCH ZONES

POWER ON

GENERAL SEQUENCE

FIG. 18 — INITIALIZATION AND WARMUP

DATA ACQUISITION

CHECK OUT START

CALCULATION

START-UP SEQUENCE

EMERGENCY CONDITIONS
PART #1

EMERGENCY CONDITIONS
PART #2

CYCLE OUT

PROGRAMMABLE CONTROLLER FOR CONTROLLING REPRODUCTION MACHINES

This is a continuation, of application Ser. No. 496,663, filed Aug. 12, 1974.

This invention relates to reproducing machines in general and, in particular, to a computer controlled reproducing machine and improved apparatus for and method of controlling and operating reproducing machines.

As the public has become accustomed to the convenience and economy of xerographic machines designed to make copies on ordinary plain paper, they are increasingly demanding more economical, high speed, reliable and inexpensive reproducing machines of flexible and versatile nature with diverse optional and add-on features. In response, many breakthroughs and significant enhancements have been made to erographic machines to the point where in the span of about a dozen years or so, the machine speeds have increased dramatically.

One of the areas where major efforts have been directed for improvement has been control aspect of the machine and significant advances have been made in this area in recent years in the form of hardwired control logic that gives the machine added versatility and reliability. While the hardwired logic has provided significant advances to the overall enhancement of the machine, it has been shown to have its inherent limitations. Thus, for example, the functions provided by the hardwired logic are generally wired into the logic circuitry and frozen. Consequently, when a new function has to be added or existing functions have to be modified, the logic must be redesigned and rewired. But the time, efforts and cost involved in modifying existing logic, or designing a new hardwired logic control for machines of new configuration, or of old configuration with new add-on or optical features, have been found rather significant and burdensome.

Additionally, the increased complexity of the modern high speed copier/duplicator has resulted in a tremendous increase in control circuitry, which today is normally carried on circuit boards and through individual wiring. This increase in control circuitry has at this same time created a tremendous space problem, namely where to put the circuitry and still retain a reasonable machine size. In addition, subsequent changes, alterations, additions, and the like often bring with them increased amounts of circuit boards and wires which may tax to the limit the available space.

While developments in the art of the circuit controller fabrication offer promise in alleviating the problems alluded to above, such developments have not heretofore appeared useful for the electrostatic copier/reproduction machines as we know them today. Recent advances in circuit fabrication techniques, i.e. L.S.I. chips, are of some help in reducing wiring bulk but do not themselves alleviate the necessity of rewiring in the event of design changes. As for controllers one may consider the control of an asynchronous pointer operated through a data processing system. However, typically, electrostatic type copiers and reproduction machines are synchronous by nature and not asynchronous, or readily converted to asynchronous operation. This in part is due to the fact that most copiers employ a continuous photosensitive member or support therefor, and are hence alien to the use of individual photosensitive plates which appear to be required for asynchronous type operation.

It is therefore an object of the present invention to overcome the aforementioned difficulties found in the presently available copier/duplicator machines.

It is another object of the present invention to provide a new and improved reproduction machine.

It is an object of the present invention to provide an improved programmable controller for a reproduction machine.

It is yet another object of the present invention to provide a programmable controller for a high speed copier/duplicator machine which provides timed control signals to the process control devices of the machine for actuating the operating components of the machine.

It is a further object of the present invention to provide an improved method for controlling and operating an electrostatic reproduction machine.

The foregoing and other objects of the present invention are attained in accordance with the present invention using a programmable controller computer having a program storage means to store a set of program instructions for enabling the computer to generate control signals to actuate process control devices of the machine in a timed manner in making copies as directed by the operator.

It is a feature of the present invention to provide a set of programs to be stored in the computer and designed to enable the computer to respond to the operator's instructions, such as a selection of the copy length, copy numbers, etc. and calculate the requisite timing information to control the machine operating components to produce the copies desired.

It is another feature of the present invention to provide a method of controlling a reproduction machine to produce copies from originals, comprising the steps of programming a computer so that it enables the computer to respond to the machine status in terms of machine operativeness and to the operating instructions provided by the operator that pertain to the reproduction run such as document numbers, number of copies for the respective documents, and length of the copy images, and generate control signals to operate the machine to make copies according to the operator's instructions.

It is yet another feature of the present invention to provide a program designed to provide noise immunity.

It is yet another feature of the present invention to provide a machine wherein the control signals for the machine are derived, under the control of software, in successive cycles, each cycle starting with a pitch or start signal, followed by a series of timed signals referenced back to the pitch signal, and then applied to the machine control devices to implement the machine process steps.

It is a further feature of the present invention to provide a roll fed, single pass electrostatographic reproducing machine.

It is still another feature of the present invention to provide, as document originals, a film cassette or roll having a plurality of documents in sets, each set having one or more pre-collated pages positioned in series in successive frames and the sets and the pages being coded for identification.

It is yet a further feature of the invention to provide an electrostatographic machine that has photoreceptive means in duplicate and so disposed that either one or both can be operated to make image impressions on either one or the other or both sides of the web material fed therepast.

The foregoing and other objects and features and advantages of the present invention will become clearer from the following detailed description of an illustrative embodiment of the present invention in conjunction with the accompanying drawings, in which:

FIG. 1B shows a schematic front view of an exemplary operator control console of the controller;

FIG. 3 is an enlarged schematic view of the document input module for the machine shown in FIG. 1;

FIG. 4 is a view showing the document originals in the form of a plurality of film frames in series, each frame being code marked for identication;

FIG. 10 is a schematic outline showing the paper path divided into imaginary pitch zones;

FIG. 11 is a schematic outline showing the input film module divided into imaginary pitch zones;

FIGS. 13 and 14 are diagrams showing the timing relationship of the timed process events and the pitch zones for the paths illustrated in FIGS. 9, 10 and 11 during processing;

THE MACHINE

Figure 1A:
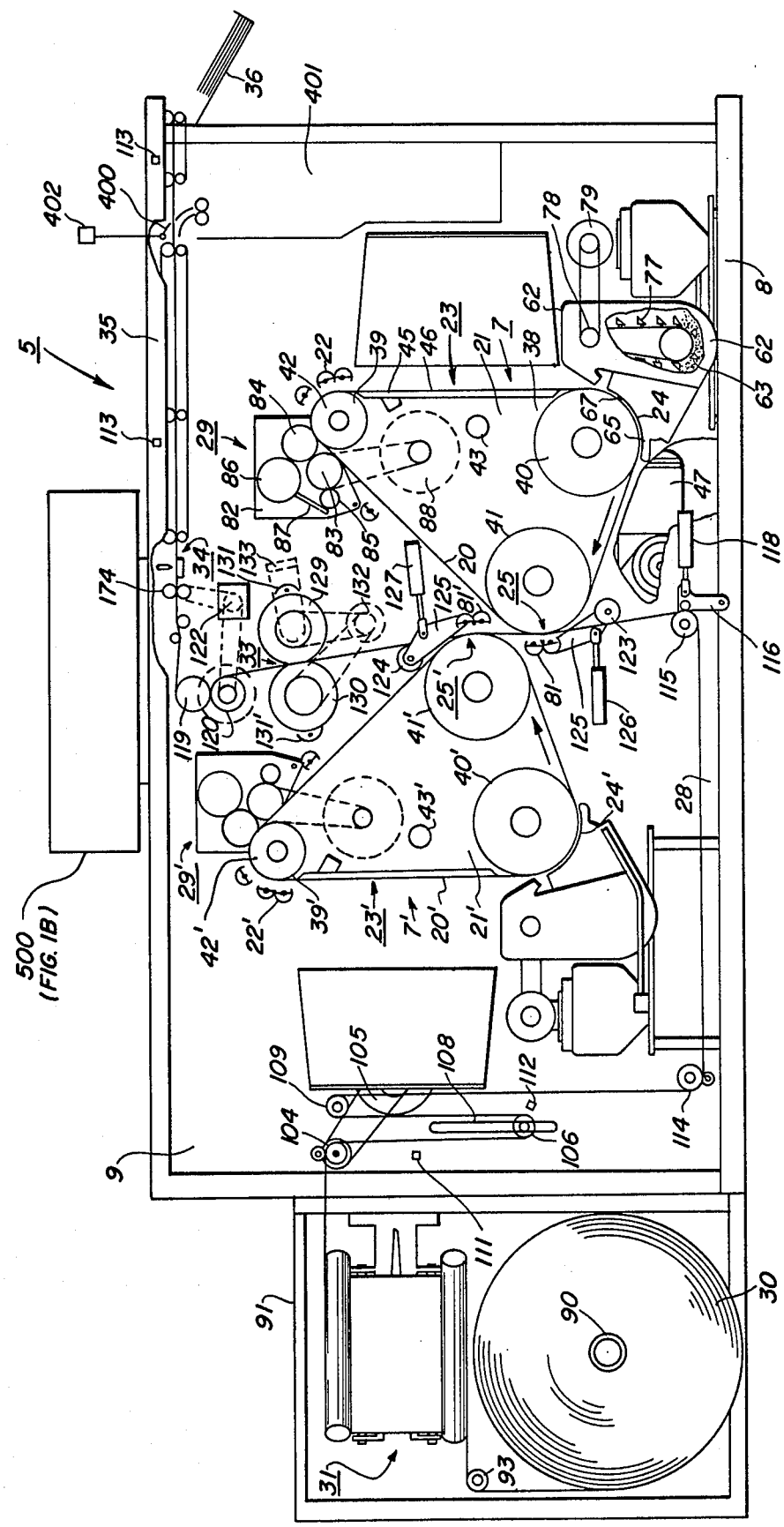
FIG. 1A shows a schematic front view of an exemplary reproduction machine with a programmable controller of the present invention.
Figure 2:
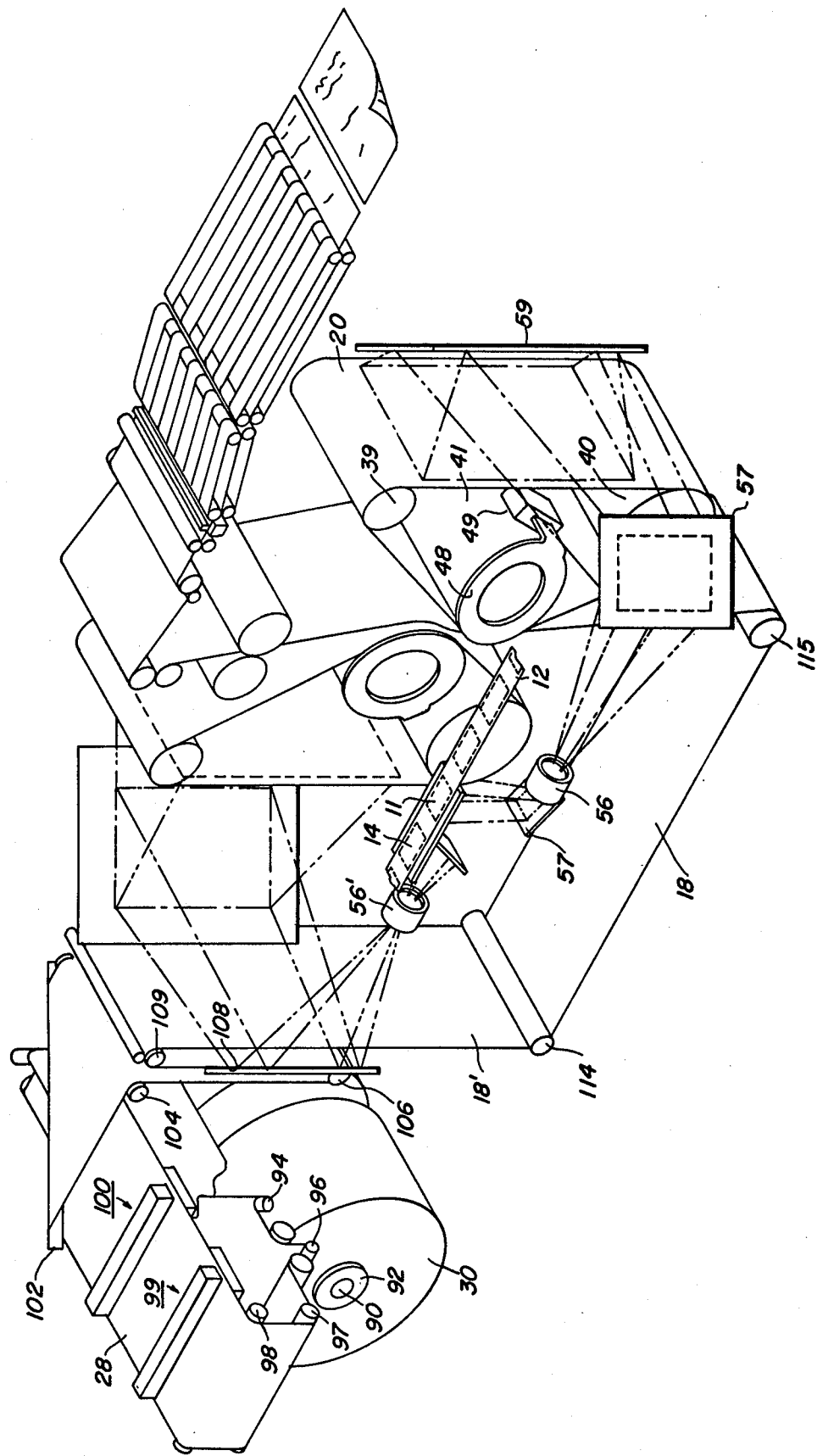
FIG. 2 is an isometric view showing details of the paper path for the reproduction machine of FIG. 1.
Figure 8:
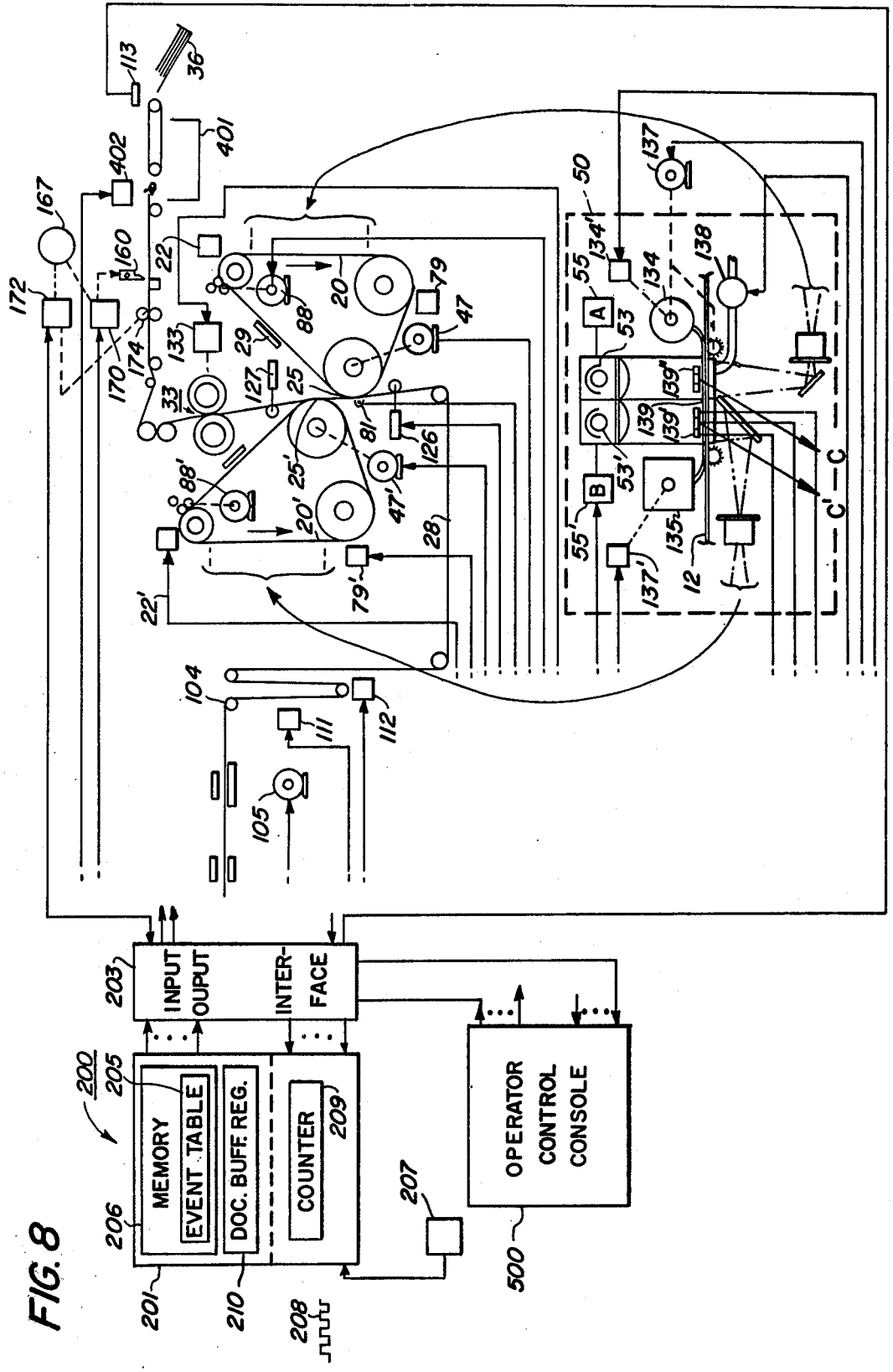
FIG. 8 is a schematic block diagram showing the programmable controller of the present invention.

Referring to the drawings in general, and in particular, to FIGS. 1A, 2 and 8, the drawings show in exemplary embodiment of the present invention in the form of a reproduction system having copier/reproduction machine, designated generally by the numeral 5 and a programmable controller 200 for operating the machine 5. Hereinafter, the invention will be described in terms of a specific copier/duplicator machine run by a specific programmable computer, but it is to be understood clearly from the outset that the specific configuration of the machine and computer is for illustrative purposes only and is not intended to limit the spirit and scope of the present invention. The exemplary machine 5 is preferably a xerographic processor and may be a simplex/duplexing machine, that is, one that produces image impressions on either or on both sides of copy material. The reproduction machine 5 includes duplicate processing units 7, 7' as will be described more fully herein.

To simplify the ensuing description of the reproduction machine 5, the xerographic processing unit 7 is described in detail, with identical areas of processing unit 7' being identified on the drawings by the same numeral followed by a prime mark.

In the exemplary reproduction machine 5, the original document or documents being reproduced are in the form of a transparent film strip having a plurality of documents, books, each document having any given number of pages or frames 11 arranged in series in a film strip 12 as seen in FIG. 4. As will be described in detail later, the frames 11 are grouped or positioned in series and are suitably coded to identify the starting and ending frames of each document and each individual frame or page. The film strip may come in a convenient cassette form. Film strip 12 is indexed in a timed manner across a copy platen 14, (seen in FIG. 3) under the control of the controller 200. The platen 14 is transparent and is sufficiently large to accommodate two frames at once. Once indexed, the frames may be flash exposed to project optical light images. Dual illumination systems are disposed above platen 14 to illuminate the frames 11 produce light image rays corresponding to the informational areas on each frame 11 and therebelow. The image rays are projected by means of independent optical systems 18, 18' onto the photosensitive surface of the xerographic plates associated therewith.

In the exemplary reproduction machine 5, seen best in FIG. 1A, the aforesaid xerographic plates comprise endless flexible photoconductive belts 20, 20' supported in belt modules 21, 21' respectively. A suitable charging device, i.e. corona generating devices 22, 22', serve to uniformly charge the respective photoconductive belts 20, 20' preparatory to imaging at the respective exposure stations 23, 23'.

Each of the latent electrostatic images formed on the photoconductive belts 20, 20' passes through respective development stations 24, 24' whereat the image is developed with an oppositely charged developing material to form a xerographic powder image corresponding to the latent image on the belts 20, 20'. Thereafter, the developed image moves to the respective transfer station 25, 25' where the image is electrostatically transferred to one side or the other of a suitable support material, in this case web 28. Following transfer, residual developer on the belts 20, 20' is removed at the respective cleaning stations 29, 29' in preparation for the next copying cycle.

Web 28 is supplied from a roll 30, a web feeding system 31 being provided to advance the web in response to damand as will appear. Following transfer of a developed image to web 28, web 28 passes through fuser 33 whereat the toner image thereon is permanently fused. Following fusing, the web 28 is cut into discrete sheets at cutting station 34, the cut sheets then being transported by discharge conveyor 35 to an output or collecting station 36.

BELT MODULES

The belt modules 21, 21' include a generally triangular subframe 38 rotatably supporting rollers 39, 40, 41. The axes of rollers 39, 40, 41 are substantially parallel with one another and are disposed at the apexes of the triangular subframe 38. The belt modules are supported in cantilever fashion from the main machine frame 8 by means of projecting support shafts 42, 43, shaft 42 being coaxial with the supper roller 39 which is journaled for rotation thereabout. Suitable locking means (not shown) are provided to retain the belt modules on their respective supporting shafts 42, 43 and in predetermined operative position relative to the remaining system components. The aforedescribed lock means is releasable to permit an entire belt module to be withdrawn for servicing and repair.

In order to provide the necessary operating tension on the photoconductive belts 20, 20' as well as to assure their proper tracking during operation thereof, supporting roller 40 is rotatably journaled in a swingable yoke having a stem supported for both rotational movement about an axis perpendicular to the axis of roll 40 and for limited axial movement therealong. Suitable spring means mounted along the stem bias the yoke and the roller supported therewithin outwardly against the belts 20, 20' associated therewith to tension the photoconductive belt. The aforedescribed support arrangement for photoconductive belts is disclosed more fully in U.S. Pat. No. 3,702,131, issued Nov. 7, 1972 and incorporated by reference herein.

It is important that the photoconductive belts 20, 20' be substantially flat opposite their respective exposure stations 23, 23' and for this purpose a vacuum platen 45 is disposed on the belt module subframe 38 opposite each exposure station 23, 23'. The outer side 46 of platen 45 facing the photoconductive belts is substantially flat. A series of orifices in the surfaces 46 lead to the interior of platen 45 which in turn communicates with a suitable source of vacuum (not shown). The exposure of the surface of the belts 20, 20' opposite platen 45 to vacuum serves to draw the respective belt tight against the side 46 of platen 45 to thereby assure a flat, photoconductive belt surface at the exposure station. To reduce friction and prevent scratching of the underside of belts 20, 20' a porous cloth or paper sheet is stretched across the platen surface 46. A more complete description of the aforedescribed belt hold down arrangement may be found in U.S. Pat. No. 3,730,623, issued May 1, 1973 incorporated by reference herein.

Belt supporting rollers 40, 40' are rotatably driven via suitable transmission means (not shown) from main drive motor 47, the photoconductive belts 20, 20' moving in the direction shown by the solid line arrow in FIG. 1A. To assure proper tracking of belts 20, 20' during operation thereof, the bearing support for roller 41 includes a tracking disc 48 (seen in FIG. 2) at one end thereof disposed in angular relationship to the axis of roller 41 so that a position of the circumference of disc 48 rides against the edge of belt 20, 20' associated therewith. A double acting belt tracking switch 49 is cooperatively disposed with the periphery of disc 48 diametrically opposite the point where disc 48 contacts the edge of the photoconductive belt, the arrangement being such that excessive lateral movement of the belts 20, 20' in either direction along supporting roll 41 tilts disc 48 to in turn actuate tracking switch 49. As will appear, actuation of switch 49 works through the programmable controller to interrupt operation of the reproduction machine 5 under certain conditions of operation.

EXPOSURE SYSTEM

As best seen in FIGS. 2 and 3, the illumination and optical systems 18 and 17', respectively, cooperate to provide a light image of the frame or frames 11 on platen 14 at the exposure station 23, 23' associated therewith. The illumination systems 17,17' are encased in a common housing 50 disposed over platen 14. Platen 14 is of a size sufficient to accommodate two frames 11, 11' at once and illumination housing 50 is sub-divided into two separate illumination chambers 51, 51' by interior wall 52. Each illumination chamber 51, 51' covers one half of the platen 14. A suitable flash lamp 53, 53' and condenser lens assembly 54, 54' are supported in each of the chambers 51, 51' above platen 14 to expose the portion of the film strip 12 thereunder respectively when lamp triggering means 55, 55' of a suitable design are energized in a timed sequence under the control of the controller 200.

THE OPTICAL SYSTEM

Figure 5:
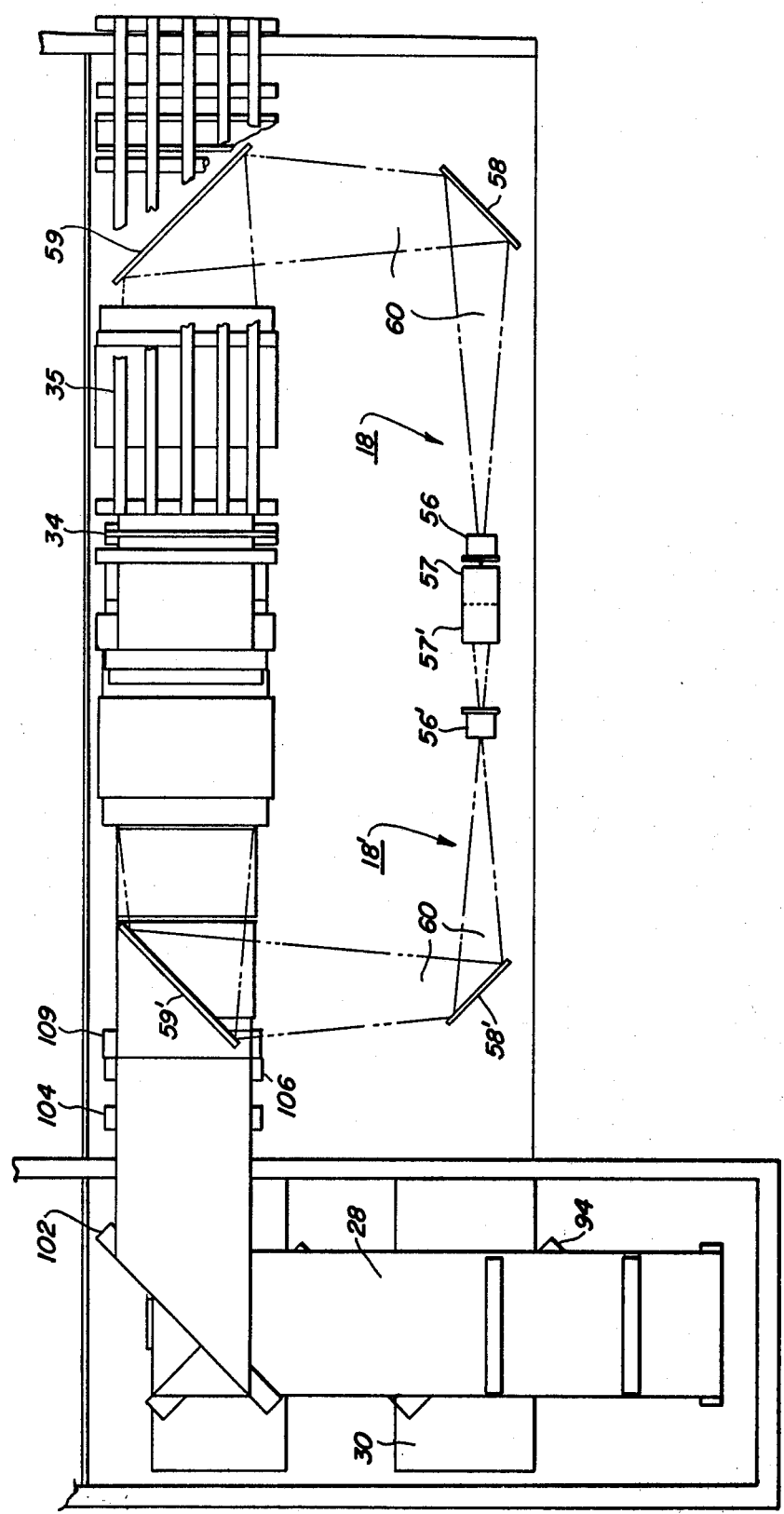
FIG. 5 is an enlarged schematic view of the optical paths for the machine shown in FIG. 1.

As best seen in FIGS. 2, 3, and 5, the optical systems 18, 18' transmit the light images generated upon actuation of the flash lamps 53, 53' to the exposure station 23, 23' associated therewith. The optical systems 18, 18' each include a lens 56. Since platen 14 is above and to one side of exposure stations 23, 23', a series of mirrors 57, 58, 59 which cooperate with the lenses 56 to provide an optical path 60 for the light images of the film frames on platen 14 to the respective exposure station 23, 23'.

THE DEVELOPER STATION

Figure 6:
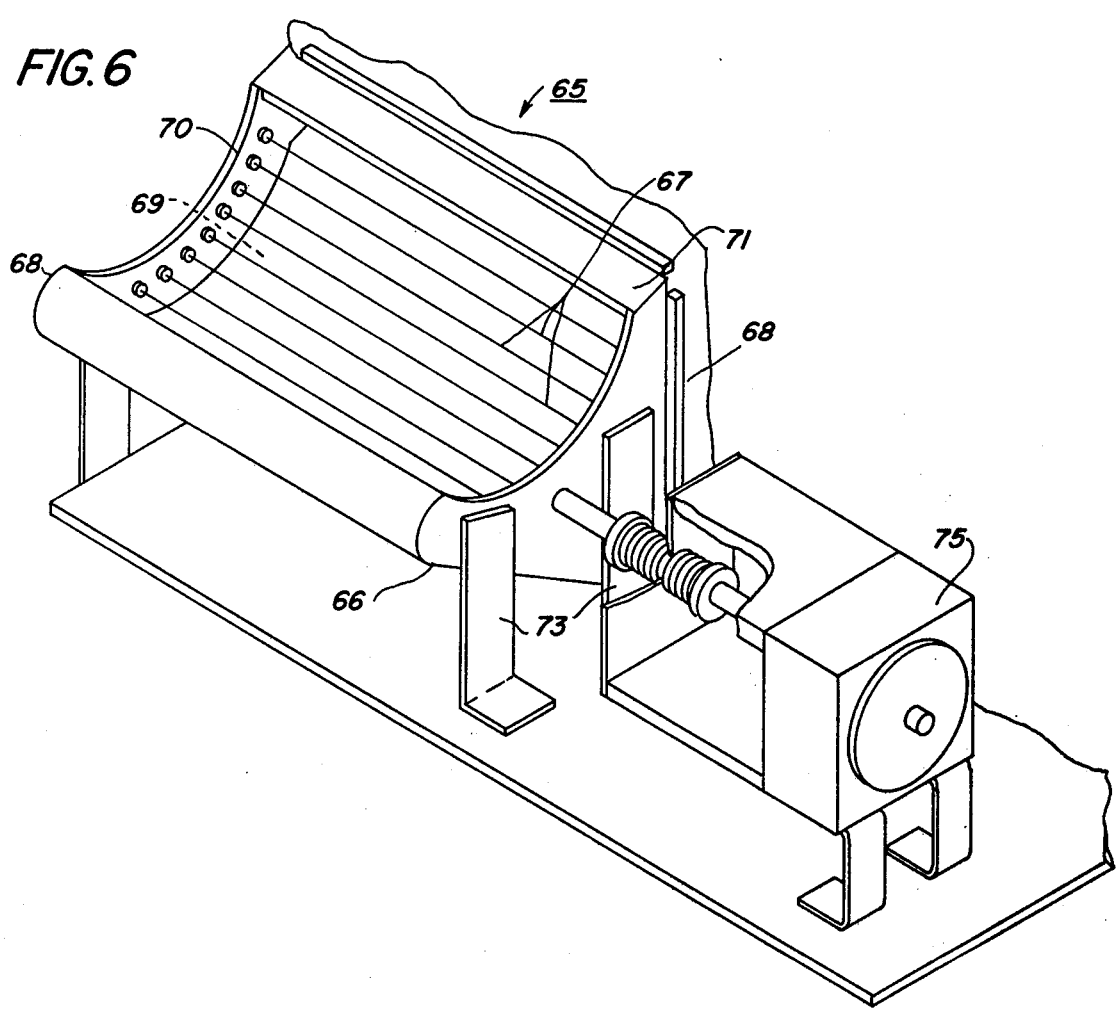
FIG. 6 is an enlarged isometric view showing details of the developing apparatus for the machine shown in FIG. 1.

The latent electrostatic image created on the photoconductive belts 20, 20' at the exposure station 23 or 23' is rendered visible through the application of developing material thereto at developing stations 24, 24', the developing material comprising a mixture of relatively large carrier particles and relatively small toner particles in triboelectric relationship to one another. Referring particularly to FIGS. 1A and 6 of the drawings, developing stations 24, 24' each include a developer housing 62 supported on machine frame 8 and in operative juxtaposition with the belt modules 21, 21' proximate belt supporting roller 40. Developer housing 62 includes a lower sump portion 63 within which a supply of developing material is disposed. The portion of developing housing 62 adjoining the photoconductive belts 20, 20' is arcuate in conformance with the arcuate shape of the photoconductive belts 20, 20' as the belts travel around the belt supporting roller 40. Supported within the housing 62 in close, spaced relationship to the adjoining belts 20, 20' is a curved developer bed 65 across and through which the developing material passes during operation thereof. Developer bed 65 consists of a lower base 66 and spaced upper electrodes 67, electrodes 67 being supported through sides 68 in predetermined spaced relationship from base 66 to form therebetween chamber 69 through which the developing material passes. A suitable seal 70 is provided along each side of bed 65 to prevent leakage of developer from the developer housing 62.

The developer bed 65 is supported in a generally upright position in the developer housing 62, housing 62 including an inlet baffle 71 cooperable with the external surface of housing 62 to form an inlet to bed 65 in the chamber 69 thereof. The lower portion of housing 62 adjoining bed 65 forms an outlet passage for the developing material to route the developing material back to the sump 63 of housing 62. The developer bed 65 is supported within developer housing 62 on flexible members 73, one side of the developer bed 65 being drivingly connected with a suitable vibrating mechanism such as acoustic coil 75.

To provide a flow of developer across electrodes 67 and through the chamber 69 of the developer bed 65, a developing material conveyor 77 is provided. The supporting roller 78 for conveyor 77 is driven by motor 79. Conveyor 77 serves to raise developing material from the sump 63 and discharge developer onto the inlet baffle 71 leading to the developer bed 65. A more complete description of the developer may be found in U.S. Pat. No 3,613,637, incorporated herein expressly by reference.

TRANSFER STATION

The images developed on the photoconductive belts 20, 20' are electrostatically transferred onto the side of web 28 opposite thereto at transfer stations 25, 25'. To facilitate transfer and subsequent separation of the web 28 from the surface of belts 20, 20' without arcing, suitable transfer corona generating devices 81, 81' are provided opposite belt supporting rollers 41.

CLEANING STATION

Following transfer, residual developing material remaining on the belt 20, 20' is removed at the cleaning station 29, 29' associated therewith. Cleaning stations 29, 29' include a housing 82 within which are mounted a pair of brush type cleaning rolls 83, 84, the periphery of which is in contact with the surface of belts 20, 20' associated therewith. Pick-off rollers 85, 86 engage each of the brush rollers 83, 84, respectively, rolls 85, 86 serving to remove developer picked up by the rolls 83, 84. A flicker bar 87 engages the rolls 85, 86 to remove developing material picked up by rolls 85, 86 from the cleaning rolls 83, 84, the removed developer being urged from the housing 82 by suitable vacuum means (not shown). The several rollers of cleaning stations 29, 29' are driven by motors 88, 88', respectively.

WEB FEEDING MECHANISM

Preferring particularly to FIGS. 2 and 5 of the drawings, the copy substrate material 28 is supplied from a relatively large roll 30 supported upon a shaft 90 and disposed in a paper supply housing 91 appended to main housing 9 of the reproduction machine 5. Drag brake 92 on shaft 90 restrains rotation of the supply roll 30. Web 28 is unwound over a first de-curling roll 93 rotatably supported within the housing 91 proximate supply roll 30. The axis of the de-curling roll 93 (FIG 1A) is substantially parallel with the axis of supply roll support shaft 90.

From the de-curling roll 93, web 28 passes over guide roll 94 where the web 28 is turned through an angle of approximately 90°. For this purpose, guide roll 94 is rotatably supported within housing 91 at an angle of 45°. From guide roll 94, web 28 passes through a second de-curling device 96 and around guide rollers 97, 98 to splicer 100. There may be provided a suitable detecting means 99 for detecting the end of the roll 30. The detecting means is so positioned that it detects the end before the end reaches the splicer 100. The detected signal may then be used by the programmable controller to stop the machine to permit the operator to mount a new roll and splice it to the old roll being used up. Splicer 100, which may comprise any suitable paper splicing device, serves to enable the leading edge of a fresh supply roll to be attached to the trailing edge of the previous web. Following splicer 100, the web 28 passes over a second guide roll 102 which turns the web through 90°. Web 28 then enters housing 9 of the reproduction machine 5.

As web 28 enters the machine housing 9, the web 28 passes over feed roll 104, roll 104 being driven by web feed motor 105. A dancer roll 106, which is arranged to float vertically in slotted openings 108 in the machine frame 8, cooperates with feed roll 104 and downstream guide roll 109 to give a proper tension to the web 28. Switches 111, 112, cooperate with dancer roll 106 enable the supply and continuity of web 28 to be monitored as will appear hereinafter.

From dancer roll 106, the web 28 is routed via guide rolls 114, 115 to the dual transfer stations 25, 25'. Guide roll 115 serves to tension the web, roll 115 being supported upon a displaceable frame 116. Spring 118 biases the frame 116 in the direction of web feed to maintain a tension upon the web 28. Following guide roll 115, web 28 is drawn past transfer stations 25, 25' and through fuser 33 by feed roll pair 119, 120, roll 120 thereof being suitably driven by motor 122 to advance web 28 against the tension imposed by the guide roll 115. Following feed roll pair 119, 120, web 28 is advanced to cutting station 34.

To enable the belt modules 21, 21' to be operated independently and belts 20, 20' thereof to move without contact with web 28, rolls 123, 124 are provided adjacent each of the transfer stations 25, 25'. Each roll 123, 124 is supported upon a displaceable frame 125 designed to enable the rolls together with the portion of the web therebetween to be moved into and out of transfer contact with the photoconductive belts 20, 20'. Suitable drive means, such as solenoids 126, 127 actuable by the controller 200 are provided to selectively move the rolls 123, 124 in such manner that the web 28 is moved into and out of transfer relationship with the photoconductive belts 20, and 20', respectively, at transfer stations 25 and 25'.

THE FUSER

Following transfer of the developed image to web 28, the web passes through fuser 33 wherein the toner image is permanently fixed. Fuser 33 comprises a heated fusing roll pair 129, 130 forming a nip between which web 28 passes. External heating lamps 131, 131' serves as the source of heat for fusing rolls 129, 130. Fusing rolls 129, 130 turn in the direction shown by the solid line arrows in the drawings, drive motor 132 being provided for this purpose. To permit pressure between fusing rolls 129, 130 to be relaxed, as, for example, when web 28 is stationary, roll 129 is supported for limited translating movement toward and away from the roll 130. A suitble drive means such as solenoid 133 actuable under the command of the controller 200 is provided to selectively displace roll 129 into and out of contact with roll 130. Alternatively other suitable fusing means such as flash fusing means may be used to effect the fusing operation.

FILM

Referring to FIGS. 3 and 4, the document originals 11 in the form of film to be copied are, as illustrated, in frames 11 arranged in series in a film strip 12 and mounted on a supply reel 134. A film take-up reel 135 disposed on the opposite side of platen 14. A suitable film advancing means 137 and 137' is provided to draw the film from reel 134 and advance the same across platen 14 and onto take-up reel 135.

The film advancing means may be arranged to advance the film strip 12 in continuous fashion in taking up the film leader or in rewinding the film, or indexing the film 12 during copying operation, as directed by the controller 200. To identify the individual frames, code marks 138 are provided along one side of film strip 12 and marks 138S, 138E are provided to identify starting and end frames to indicate the start and end of each document series. Control marks 138 are also relied upon to locate the individual film frames in proper position or platen 14. Suitable photoelectric detectes 139S, 139A, 139B, 139E are provided adjacent platen 14 to read the marks 138S, 138, 138E on the film strip 12.

In operation, the operator loads a selected supply reel or cassette 134 in place, and manually threads the film leader onto film drive path, across platen 14 and onto take-up reel 135. A suitable slew control means in the form of a button 507 on the operator console 500 may then be used to operate motor 137, to take up the film leader.

The film strip 12 may have been previously prepared off line by a suitable camera (not shown) which is used to render a photographic rendition, in the form of image transparencies of the individual pages of the original document originals. A suitable device, such as selectively operated light sources (not shown) may be employed to provide the code marks 138S, 138, 138E when the film strip is prepared.

A film strip 12 may be first prepared by photographing a number of books or documents, each having any given number of pages, up to its frame capacity. The example, suppose one of the books or documents has 100 pages. The first frame pair will comprise images of pages 1 and 2 and will carry code marks 138S and 138. The second negative pair are images of pages 3 and 4, and carry a mark 138 for each of the pair. This continues until the last negative pair, images of pages 99 and 100, which bear marks 138 and 138E. It will be understood that depending on the length of film strip 12 available and the number of pages in each document, a number of complete documents, the position of which on film strip 12 is identified by code marks 138S, 138, 138E may be provided on a single film reel 134 in a convenient cassette form. Suitable legends are normally provided with the completed film reel to identify the various documents and their position on the film.

WEB CUTTING STATION

Figure 7:
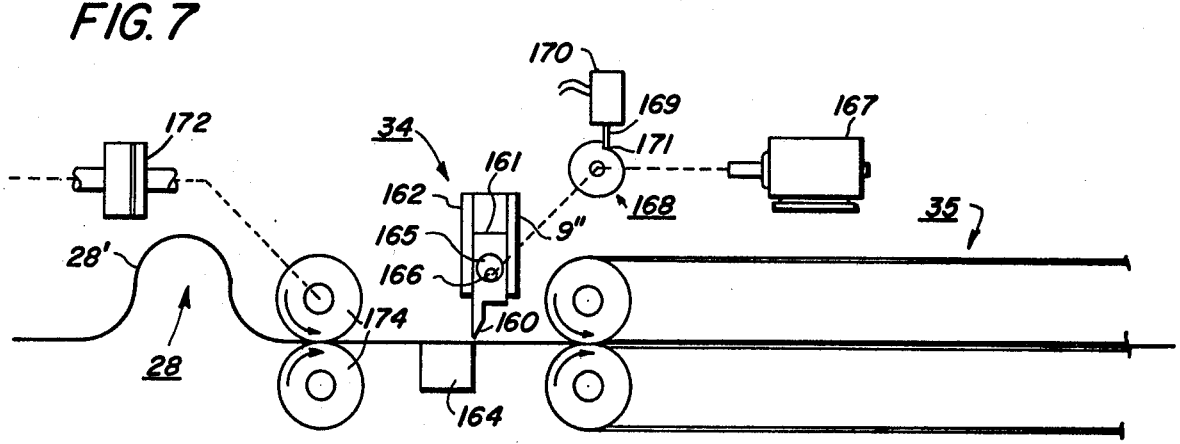
FIG. 7 is an enlarged view partially in section showing details of the guillotine assembly for the machine shown in FIG. 1.

Referring to FIG. 7, cutting station 34 includes a guillotine knife 160 supported by carriage 161 for reciprocating movement into and out of cutting relationship with lower knife member 164. Carriage 161 is supported for slideable up and down movement in frame journals 162. A rotatable eccentric drive 165 is journaled within carriage 161 and serves on rotation of eccentric shaft 166 to reciprocate carriage 161 and guillotine knife 160 up and down. A suitable drier for guillotine knife 160 is provided, exemplified by drive motor 167 coupled to eccentric shaft 166 via a solenoid operated clutch 168.

Armature 169 of clutch control solenoid 170 cooperates with clutch stop 171 of clutch 168 to engage and disengage clutch 168, it being understood that contact of armature 169 with stop 171 retains clutch 168 disengaged and motor 167 and eccentric shaft 166 uncoupled. Upon actuation of solenoid 170, armature 171 is withdrawn permitting clutch 168 to engage and drive eccentric shaft 166 to operate guillotine 160. Subsequent deenergization of solenoid 170, normally immediately thereafter, returns armature 169 into blocking position for engagement with stop 171 following one revolution of eccentric shaft 166. Actuation and deactuation of solenoid 170 is placed under the control of the controller 200 so that the operation of the guillotine is properly synchronized with the rest of the machine operation.

To prevent movement of web 28 during cutting, feed roll pair 174 brake to a stop during the cutting process, the continued feed of web 28 being accommodated by the adjoining structure in the form of a buckle 28'. A suitable brake/clutch control device 172 is provided for roll pair 174.

Hereinabove, major machine elements of a reproduction system embodying the present invention has been briefly described. As apparent from the foregoing description certain of specific operative steps indicated, such as exposure, image transfer and cutting operations must be precisely timed whereas certain other steps, such as the operation of the charging station for the developer, have to be operated in proper sequence although precise timing is not essential. These operational steps are implemented by actuating device control means that actuate process step implementing means provided therefor.

These timed control functions for reproduction systems which have been provided heretofore principally by hardwired logic are now implemented in accordance with the present invention by a programmable controller wherein the sequencing and timing of the operative steps are now programmed in software instructions and can be stored to run the machine and can be readily modified to the change sequence and timing to alter the process steps for making prints or copies of different sizes and programmed by the operator. Hereinbelow, an illustrative embodiment of the programmable controller used to operate aforedescribed copier/duplicator machine will be described in detail.

PROGRAMMABLE CONTROLLER

Referring to the system block, diagram shown in FIG. 8, the programmable controller 200 for reproduction machine 5 includes a suitable programmable computer 201, together with interface circuitry 203 for operatively coupling the computer to the various control device elements of the reproducing machine and the operator's control console 500.

For timing the operation of the reproduction machine, there is provided a timing signal clock pulse generator 207. Preferably the clock pulse generator may be of such an arrangement that its output repetition rate is related to the speed of the machine main drive motor 47 that drives the belt rollers 41 and 41'. In this manner the clock pulse train output 208 produced by generator 207 is time related to the operational speed of reproduction machine 5 and, in particular, to the speed of the travel of the belts 20 and 20' and the web 28. As apparent from this, given a fixed rate of travel of the web or belt, the pulse count can be used to measure the travel distance.

As shall be explained in detail, the computer is programed so that during the initialization period when the machine is progrmmed to make a particular copy run, means are provided for the operator to indicate a length of the image impression, plus an appropriate amount of space. For convenience and ease of reference, the length plus speed will be called pitch; also note that the impression length controls the pitch or image length and thus the time intervals between successive machine process events. Given the pitch length information, the computer is programmed to calculate a list of the time intervals between the successive process events which are stored in a table or storage location 205 of a suitable memory 206 of the computer. For each pitch cycle, a pitch signal for an imaging cycle is generated by the computer. The pitch signal may be keyed to suitable machine process events, such as image exposure step, that can be used as a reliable time reference point. The pitch interval, that is the time interval between successive pitch contains the controls signals for the machine process events for each imaging cycle.

In operation, each of the successive time interval count numbers in the table 205 is stored in a counter 209 in succession for the successive machine process events. In response to a start command by the computer the machine starts to operate and starts an imaging cycle. The start of the imaging cycle is marked by a pitch pulse. Thereafter, the next count stored in the counter is decremented to zero by the clock pulse counts. As it decrements to zero the computer generates a control signal and addresses it out to its intended device control elements or means to implement a machine event. This process continues until the end of the pitch. The process is repeated again for the succeeding pitch interval until a copy run as programmed by the operator is completed.

While the counter 209 and the table 205 for the process events may be provided internally within the computer, it need not be so limited. For example, the counter may be provided external to the computer and essentially operated in the same manner as described above.

In accordance with an aspect of the present invention, a suitable program, such as the one more fully described below, is stored in the memory 206 to run the computer as described above in generating the various signals required to operate the machine. In this connection the stored program includes instruction routines to enable the computer to calculate the count numbers, i.e. the timing list for a particular reproduction or copy run for a given pitch and other information pertinent to the reproduction run.

As is well known generally, a computer operates at an extremely high speed compared to a mechanical machine. Likewise, in the present system, the reproduction machine operates relatively slowly compared to the computer 201. In fact, the speed disparity is such that the computer can do all necessary chores to generate the timed pulse signals to implement the machine events, such as exposure, develop, transfer, cut, etc. and yet have substantial amount of time left over to perform other chores Accordingly, in accordance with another aspect of the present invention, the computer is utilized to perform a number of other functions utilizing its free time intervals, such as housekeeping chores, monitoring and updating of timing list, etc.

PROCESS PATHS AND WORK STATIONS

Referring to FIG. 8, the timed control signals generated by the computer are applied via the interface circuitry 203 to various control devices of the work stations in the various process paths that implement the process steps or machine events in making copies. The nature of the paths can be better appreciated on a functional basis. Thus, there is a paper path formed by the paper web 28, xerographic photoconductor paths formed by the belts 20 and 20' and imaging path formed for the film 12. Control devices are provided at the work stations along these paths to implement the specific machine function or process events.

Now referring to the paper path shown in FIG. 1, and depicted in a separate figure, FIG. 10, there is provided means 99 for sensing the trailing end of the web supply, suitable detectors 111 and 112 for sensing the tension or other conditions of the web 28. The path also includes one or more sheet jam detectors 113 for monitoring the condition of the individual copy sheets downstream of web cutting station 34. Other operating stations in the paper path include web control solenoids 126, 127 which move the web 28 into and out of transfer relationship with the photoconductive belts 20, 20', respectively, at transfer stations 25 and 25', a fuser loading solenoid 133, a guillotine drive solenoid 170, and a deflecting gate drive solenoid 402, for effecting the transferring, fusing, cutting and deflecting operations.

Figure 12:
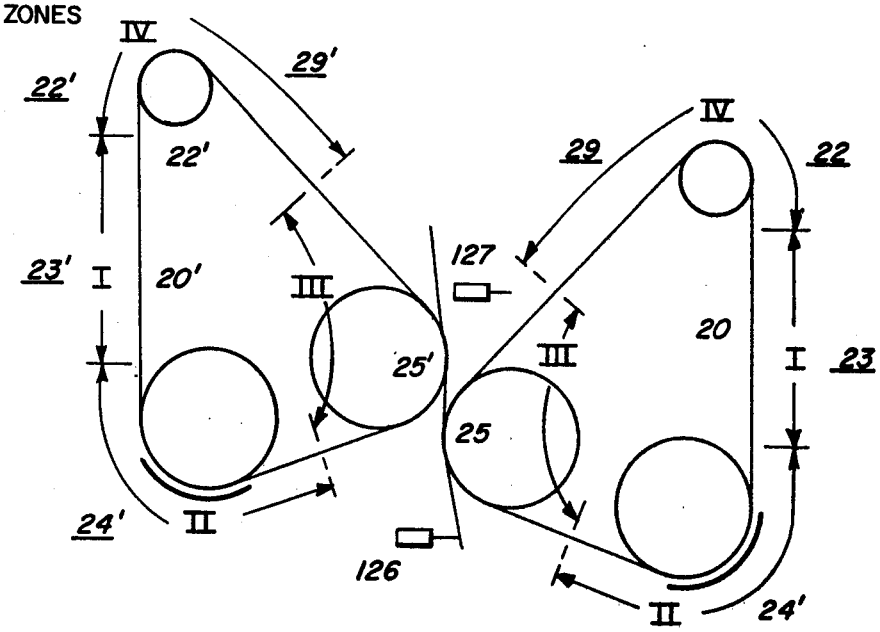
FIG. 12 is a schematic outline showing the electrostatic path divided into imaginary pitch zones.

Along the xerographic paths, essentially formed by the belts 20 and 20' as depicted in FIG. 12, there are provided exposure stations 23, 23', developer station 24, 24', transfer stations 25 and 25', cleaning stations 29, 29' and charging stations 22, 22' for their intended functions.

The optical path or image forming path, as depicted in FIG. 11, includes means 55 and 55', for triggering the lamps 53 and 53', which require precise timing so that they produce electrostatic latent images on the belts 20, 20' at the proper time. The path also includes the means for advancing and positioning the film strip 12 where the advancing the positioning of the film be time synchronized to the machine operation frames to be copied.

The control devices shown positioned along the paths are described as illustrative of various means that may be utilized to implement machine process events and that are to be controlled by the controller. Accordingly, they should not be construed as complete or limiting.

The individual control devices or means that implement or monitor the machine events or functions, may be made of any suitable conventional means, such as solid state devices, photo optical sensing means or switches, exposure circuits, solenoids, etc., arranged to monitor various states or respond to the actuating and deactuating signals from the computer via the I/O interface 203.

As generally seen in FIG. 1B, the operator console 500 may include any suitable input and output means such as a set of push buttons 501 for enabling the operator to key in digit numbers such as the document and copy numbers for a particular reproduction run. The computer is so programmed that the document numbers and corresponding copy numbers keyed in via the digit keys in any random order are placed in proper order and sequence in the computer memory 206 for later use. Suitable means including a push button 502 are provided for the operator to indicate to the computer that a document number is being keyed in. Similarly, a push button 503 with appropriate means may be provided to signify to the computer that the digit keyed is copy numbers.

There is a limit as to how many documents may be copied per reproduction run. The upper limit depends on a number of factors such as the capacity of the film, the computer memory capacity and the number of pages. Taking all of these into account, in the present embodiment the computer was programmed to copy up to any suitable number such as 10 documents per reproduction run.

In accordance with another aspect of the present invention the computer was programmed to make a copy run for making only parts of documents. Thus, suppose a document has 100 pages and the operator wishes to copy pages 50 to 70. The operator would code in page 50 as the start and page 70 as the end pages for that copy run.

For correcting erroneous entry, the console may include suitable means with appropriate entry means 509, the pressing of which in conjunction with the document number or copy number will erase the corresponding stored digit numbers. For displaying the machine status information such as the copy run information visual indicating means 510 with appropriately actuating buttons 511, 512 are provided.

The console 500 also includes a visual display means 514 indicating a malfunction and the nature, condition and the location of the malfunctioning part.

Console 500 also includes a power-on switch 520 print start button 521, and film slew control 507. Console 500 also includes suitable means 523, 524 for selecting simplex or duplex, operation of the machine. The pitch length of the copy run may be entered after pressing a push button 528 provided for the purpose and then making digit entry of the length using the digit keys 510. The console also includes a push button control key 531 for jogging or advancing the copy paper web increments.

In addition, the console may include any number of keys 533, 534, . . . for any special function that can be actuated to input signals to the computer to perform the special functions.

INTERFACE CIRCUITRY

Figure 9:
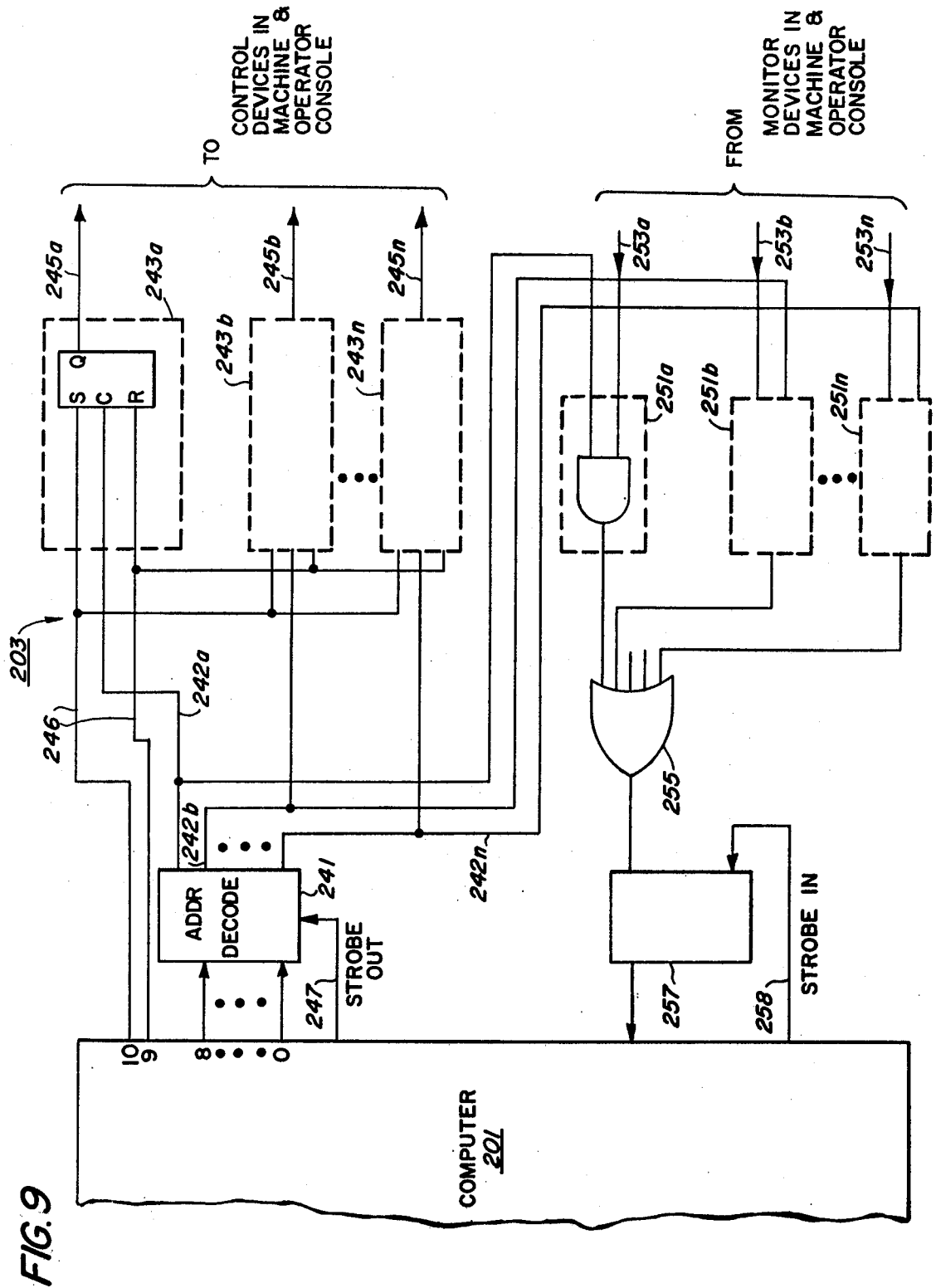
FIG. 9 is a schematic diagram of the input/output interface circuitry between the computer, reproduction machine, and the operator console.

FIG. 9 shows an illustrative embodiment of an interface circuitry 203 in a functional block diagram, that connects the computer 210 to the various operating control devices of reproduction machine 5 and the operator control console 500. Interface circuitry 203 is designed to serve the function of enabling the operator to input copy run information to the computer to run the machine 5 in a particular mode and provide visual output signals indicative of both machine and program status and malfunction conditions at the operator control console 500.

It also serves the function of enabling the computer to monitor various work stations in the process paths and channel the timed control signals to the various control devices in the processing paths. In short, the interface circuitry is so designed that it enables the computer to address or monitor in successive cycles the various stations or control devices positioned in the control console 500 and process paths of the machine.

More specifically, referring to FIG. 9, an address decoder 241 is operatively disposed between the computer 201 and individual latch circuits 243a, 243b . . . 243n and monitoring or scan circuits 251a, 251b . . . 251n. The latch circuits are connected operatively to the various control devices, such as the exposure lamp triggering means 55, 55', solenoid actuating means 126, 127, 170, 402, film advancing means 137 and 137', various switches at the console, etc. When set or toggled as the case may be, the latches enable the control device elements to implement the machine process events or give visual indications to the console. The monitoring or scanning circuits are connected to the sensing means, such as the means 111 and 112 for monitoring the web 28, film code sensing means 139S, 139A, 139B, 139E, jam sensing means 113, etc. for sensing the status of the various stations being monitored by the computer and the various push button input means at the operator console.

With a given decoding capacity, for example, an 9 bit decoding capacity, the decoder 241 can correspond to 9 bit address words from the computer 201 and decode and address up to $2^9$ or 512 lines. The latch circuits 243a, 243b . . . 243n may be reset or set by a sign via set signal paths 246 and check selectively as addressed via the address decoder 241 and its output paths 242a, 242b, . . . 242n. Selective setting, resetting and toggling takes place as the decoder 241 decodes the address words and applies the strobbed out output to the selected or addressed latches when the STROBE OUT clock pulse is applied thereto via a path 247. The selected latch then assumes the condition indicated by computer output lines 9 and 10. It will set if 10 is high and 9 is low, reset if 9 is high and 10 is low, or toggle if both are high.

Similarly in scanning the status of the various monitoring means, the computer addresses then via the decoder 241 and scanning circuit 251a, 251b . . . 251n in succession. The scanned status signals are applied to a latch circuit means 257 via OR gate 255 and are sent to the computer 201 when strobed in by strobe signals applied to the latch 257 in succession via a STROBE IN signal path 258. In this manner, the computer strobes the copy run information from the control console in various keys as the information is keyed in.

The copy run information that the operator programs into the computer in this manner typically includes the condition of the image length, the documents numbers and copy numbers, and the simplex or duplex mode and the like information that the computer requires in running the machine in making the copies.

TIMING OF CONTROL SIGNALS

Certain of the reproduction process steps, such as exposure step for forming latent images on the belts 20, 20' and actuating the guillotine cutter, etc, requires precise timing. There are other machine process events or steps, such as the actuation of the transfer solenoids 126 or 127 or both, depending upon whether or not the machine is to be operated in a simplex or duplex mode. The operation of the cleaning and charging corotrons are generally of such a nature that they must be actuated at the initialization period and kept on for the rest of the copy run or actuated and deactuated during each of the imaging cycles wherein proper timing sequence is required.

There are other types of events which occur at random and which are not time related to the machine operation cycle, such as a paper jam, fuser over-temperature, paper splice a belt runout condition, and the like. These events normally represent machine malfunctions or interrupt conditions which must be monitored and acted upon when the occur.

The way the control signals are derived according to the present invention will be now described in detail in terms of "pitch" zones and process events taking place in successive pitch zones in succession during the successive pitch time intervals in the various process paths, namely, the copy paper or web 28 path, the photoconductive belts paths 20 and 20' and the film path.

Each of these paths may be considered as being divided into "pitch" zones where pitch zones refer to spatial equivalence to a "pitch" zone in the xerographic path, i.e., an image impression length plus a suitable space on the photoreceptor belts 20, 20' traveling, at a constant speed. Here it may be noted that the process speed of items in different process paths need not and in fact are not generally at the same speed. Thus, for example, the speed of the film is much faster than the speed of the belts and moreover does not travel at a uniform speed. In case of the paper path, the web travels at a uniform speed until the guillotine cuts the web into successive sheets containing images. But the cut sheets can be moved out faster than the rate at which the web travels. These process paths with different processing speeds are time and space related to the travel speed and distance of the belts. This relationship can be visualized by considering that these paths are divided into pitch zones, wherein the start and the end of each zone in each path correspond in time to the start and end of the pitch zones in the belt.

Various process speeds at different paths and zones are different. Hence, the spatial distance traversed by the items being processed are different. But, the pitch zones are deemed set up so that the events taking place in the various zones of the different paths controlled to time relate back to a reference process path, namely, the xerographic process or the photoconductor process path in the process system.

According to an aspect of the present invention, the computer 201 is programmed to run and generate timed control signals to the various paths in successive pitch cycles as the belt travels pitch distances in succession. The timing of the control signals and application of the signals to the control devices at the various work stations in the various process paths will now be described in detail with reference to the process paths illustrated in FIGS. 10–14.

FIG. 10 shows the paper web 28 traversing through the paper path, the web tension sensing means 111 and 112, roll end sensing means 99, engaging means 126 and 127 for engaging and disengaging the web 28 from the image transfer stations 25 and 25', fusing station 33 and deflecting means 400 for deflecting unwanted sheets into reject bin 401. FIG. 11 shows the film path with film reel advancing and positioning means 134, 137, and 135, and 137' and image exposure stations A and B. FIG. 12 shows the photoconductive paths which includes image exposure stations 23 and 23' image development stations 24, 24', transfer stations 25 and 25' and cleaning stations 29 and 29', and charging stations 22, 22'.

Suppose the machine is set to operate at a given speed so that belts 20, 20' are driven at 20 inches per second, that the belts are 40 inches long, and the pitch length is 10 inches that is, one impression plus one spacing between impressions. This means that the belts travel past the image exposure station 23 and 23' at the speed of 10 inches per image or pitch. Given the foregoing conditions, it can be visualized that the belts can have four pitch zones, I, II, III and IV with each pitch zone corresponding to a distance the belt travels past the exposure station between successive exposure. For convenience, the time interval it takes for the belt during two successive exposures may be called "pitch time interval" and an "imaging cycle" interchangeably. Similarly, the other two paths, namely, the paper path and film paths can be imagined as being divisible into pitch zones so that they are time related back to the pitch zones in the photoconductor belt.

Figure 13:
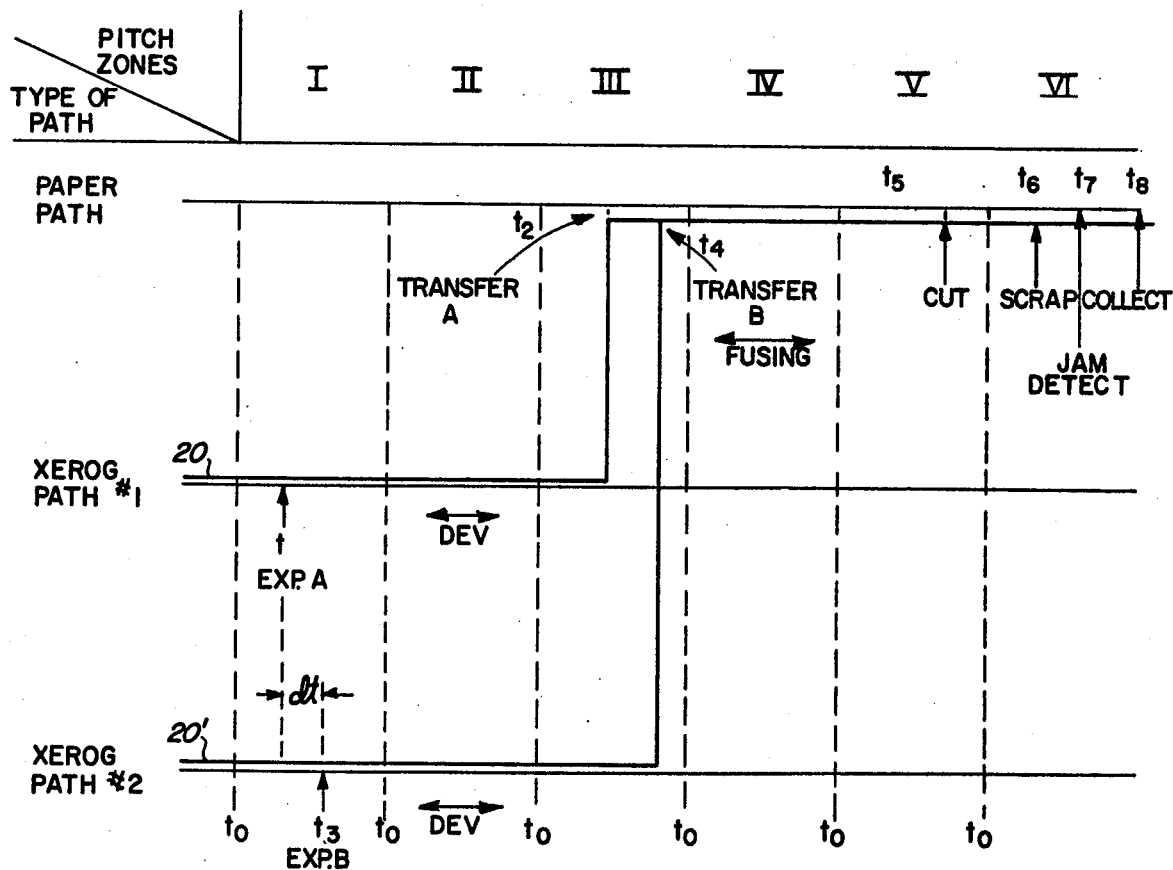

The spatial and timing relationship evident from the foregoing can be a appreciated further from FIGS. 13 and 14 which graphically illustrate the timing and spatial relationship between the paper and the belt paths and various process steps that take place in the pitch zones in their paths. This can be better described in operational context as follows: In operation, the film frame pairs 11A and 11B in film strip 12 are simultaneously positioned on platen 14. (FIG. 4). In a simplex operation, one (11A) of the other (11B) frame is exposed and the light image A' and B' formed is projected onto the belt 20 or 20' to form a latent electrostatic image. In a duplex operation, exposure of the frame 11B (B') is delayed by suitable time interval $dt$ (FIG. 13) after exposure of frame 11A, to allow the web 28 to travel from transfer station 25 to station 25' to effect back-to-back alignment of the impressions produced on web 28.

As illustrated in FIGS. 13 and 14, the belts 20 and 20' are exposed to the light images A' and B' at times $t_1$ and $t_3$ during a first pitch interval in the first pitch zone I, to form the latent images. The images are then developed at pitch zone II during the following or second pitch time interval. The developed images are then transferred at pitch zone III at time $t_2$ and $t_4$. The transferred images A' and B' are thereafter fused at pitch zone IV during the succeeding or fourth pitch interval. The web 28 containing the impression is then cut by a guillotine 160 at pitch zone V during the next or fifth pitch interval. The deflector gate 400 in pitch zone VI is actuated at time $t_6$ in the sixth pitch interval when a cut sheet has to be scrapped otherwise the acceptable sheets is collected at the collection tray at time $t_6$. Pitch zones are set up so that the start, $t_o$ and $t_{end}$ of each of the pitch zone intervals coincide with one another in timing sense. Once the paths are loaded, the aforementioned process events in the various zones occur in the time sequence shown in FIG. 14 on different images processed in the various zones.

It can be appreciated from the foregoing that where copying processes for multiple copies are well under way, a number of images are in process concurrently, but at different stages in different zones. Thus, for example, at any given instant in time, an image may be undergoing fusing operation in pitch zone IV, while a second image is undergoing transfer operation from belt 20 to web 28 in pitch zone III, a third image is undergoing development on photoreceptive belt 20 in pitch zone II and a fourth image undergoing exposure in pitch zone I.

The aforementioned imaginary pitch zones are set up so that they correspond in time, i.e., start and end at the same time, so that the process events for different images occurring at the various pitch zones occur during the same pitch time interval. These process events are repeated in succession for each of the pitch time intervals in the various pitch zones in cyclical manner until the copy run is complated.

In accordance with an aspect of the present invention, a software program is used to operate the computer 201 so that it generates the timed signals for the third process events E1, E2, E3, etc . . . E$n$ taking place at the various zones in the manner described above and apply them to the corresponding control or monitor devices via the interface circuitry 203. The computer is programmed to perform the foregoing operation for each of the imaging or pitch cycles in succession for the entire copy run.

The foregoing general description of the way the control signals are derived using a programmable controller or computer will now be described in detail in terms of a specific example. Assume the clock pulse generator 207 is designed to generate 1000 pulses per pitch interval and that the process paths are fully loaded. Referring to FIG. 14, during each pitch interval the computer generates the timed control signals for the machine process events in succession at successive time intervals starting from the pitch pulse starting time, $t_o$, generated by the computer after the operator commands the machine to print.

The exposure for the frame 11A then occurs at a given time, for example, 230 clock pulses after $t_o$, at zone I, and transfer of an earlier developed image at zone III at 450th pulse at $t_2$. In the first photoconductor belt path 20', the exposure of another frame IIB occurs at the 490th pulse at time $t_3$ in zone I, and the transfer of still another earlier developed image at the 650th pulse time $t_4$ in the second belt path 20' in zone III. The web containing a developed and fused image of still another frame is cut at the 770th pulse at $t_5$ in zone V, and a decision to eject or not eject is made at the 800th pulse at $t_6$ in zone VI.

As alluded to before, the pitch start time $t_o$, may be internally generated or even keyed to a specific machine process step that can serve as the reference or bench mark at the start of each copying or imaging cycle. For example, although not shown, in FIGS. 13 and 14, the exposure step can serve as the start for the imaging cycles for the belt path 20. In FIGS. 13 and 14, this can be readily done by shifting the zone marks to the right so that the exposure step coincides with the start time of the first pitch cycle.

The computer 201 is programmed to calculate the time intervals between the successive machine process events in the form of corresponding, clock pulse counts 230, 220, 40, 160, 120, 30 ... during the initialization as illustrated above and stores them in the memory table 205. In operation, the computer places the count numbers in the counter 209 in the memory in succession and the number on the counter is decremented by the clock pulses from the clock signal generator 207. As the count is decremented to zero the computer generates a control signal and applies it a control device. The counter is then reset with a succeeding count and the rest of steps of decrementing, etc., follows. In this manner, the clock pulse count of 230 is first stored and decremented to zero to generate the transfer signal and so forth until all of the timed control signal pulses for the pitch duration are generated in succession for the entire copy run and addressed and applied to corresponding control devices or control elements to effect the corresponding process events.

During the initial period while the zones in the paper and belt paths are being filled with the images being processed and during the cycle out period while zones are being emptied as the images being processed are cycled out, the computer is programmed to generate appropriate control signals and apply them via the interface circuit 203 that includes appropriate modification to the control signals over those for the fully loaded situation so that only those of the process events for the zones being filled with images in precession are acted on and events for the empty zones are not implemented. The computer is also programmed to respond to the paper jam or other machine interrupt conditions and handle them appropriately.

Use of the software to run the computer for deriving the timed control signals renders the control for the machine highly flexible. Thus, for example, controller can be programmed to make images of different length (in the direction of the travel), i.e., make the machine operate at different pitch length for different reproduction or copy runs. The pitch, i.e., copy length, can be changed from one reproduction run to another by using appropriate instructions in the software routine stored in the computer and without entailing any change in the hardwired logic and the machine.

This is accomplished in accordance with the present invention by having the computer calculate, for each copy run of different pitch length being set up the operator, a set of timing lists in the form of the clock pulse counts for the successive time intervals between the successive process events. The computer is programmed to do this operation during the initialization phase of the particular reproduction run. Consequently, changes required in the timing of the timed control signals for a new reproduction run which is different from the earlier run due to the change in the pitch or copy image length are implemented automatically under the control of a stored program and all the operator is required to do is to indicate or key in the pitch length for the reproduction run about to be made.

This is in contrast to the conventional control systems utilizing a hardwired and fixed logic; although to a limited degree a hardwired logic can be adapted to accommodate variable machine timing, its complexity expands so quickly as the number of machine process control steps and timing variations increase, that either the machine performance must be sacrificed or entail high cost for the hardwired logic.

Generally, in accordance with the present invention, the controller can be programmed to vary the timing sequence and cycles of the control signals, composition and order of the control signals, etc., to meet the changing need of reproduction runs or machine characteristics. This can be done by software with a master program having various optional features stored in the controller that entails little or no change in the hardware, logic and mechanism.

Thus, for example, the present controller can be programmed to run the reproduction machine in a single pass duplex mode whereby copies can be reproduced with impressions on both sides of copy sheets in a single pass of the copy sheets through the process path. Also, with appropriate optional features, the software control can also render the machine readily expandable to add new functions to the machine with little or no changes in the circuitry of the controller, and thereby upgrade the machine capability. For example, an optional instruction routine may be provided for enabling the controller to generate control signals that will enable the xerographic process implementing stations to skip the splice or other types of defective portions of the web 28 being advanced to avoid forming impressions thereon.

To determine the feasibility of operating the reproduction machine described above using a computer, a software program was developed for a PDP8/S computer available from Digital Equipment Corporation; it was programmed to provide many functions, including the function of calculating and providing the timing list of the control signals for successive machine process events in terms of the clock pulse counts for a given pitch or copy length indicated by the operator. An illustrative software program used for a PDP8/S computer is included below. The program will be briefly described in terms of the software program routine architecture shown in FIG. 15 in conjunction with the accompanying operational flow charts shown in FIGS. 16-28.

SYSTEMS SOFTWARE ARCHITECTURE

Figure 15:
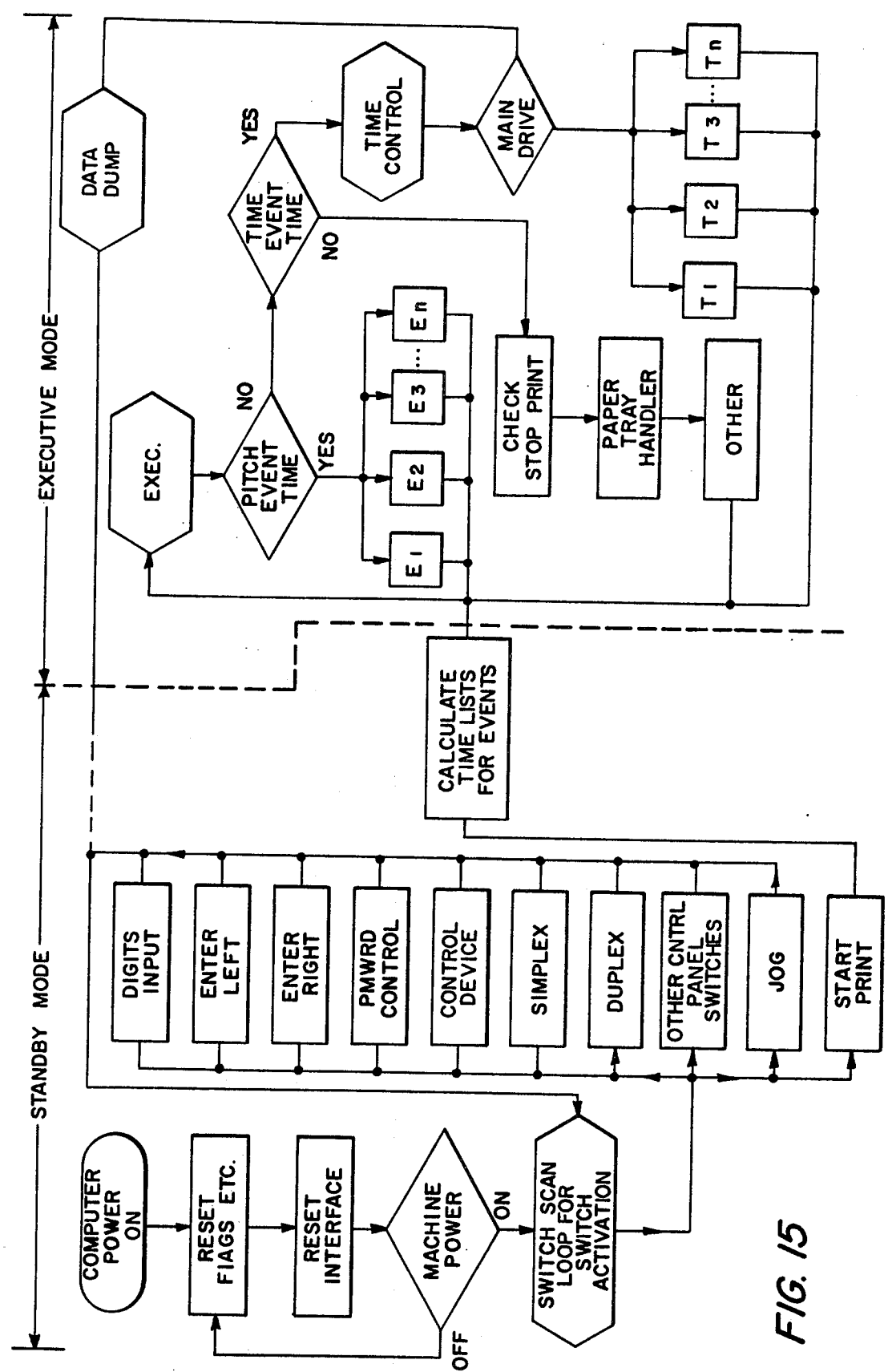
FIG. 15 is a schematic chart of the program routines of the software for use for the computer to operate the machine shown in FIG. 1.
Figure 16:
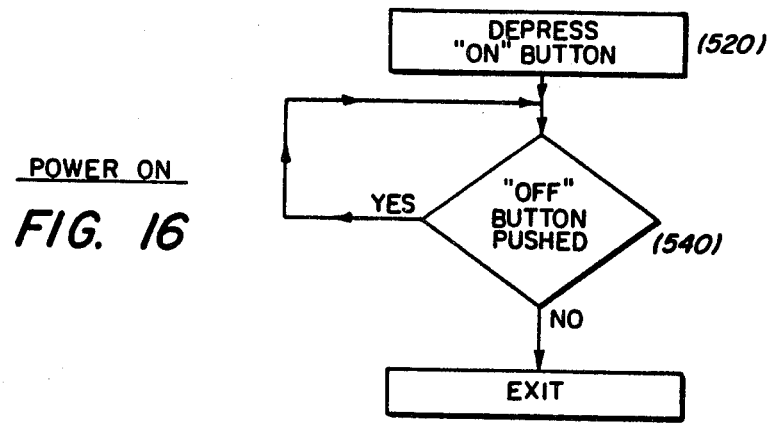
FIG. 16 is a flow chart illustrating a general sequence of the operation of the system shown in FIG. 1.

FIG. 15 shows, in general, a software architecture that parallels the operational process steps shown in the flow charts in FIGS. 16-28 in operating the copier/duplicator machine 5. Broadly, the routine includes steps for initializing and placing the computer into STANDBY mode and calculating the timing list for timed machine events, then placing the computer into EXECUTIVE mode so that the computer generates the control signals for the timed machine process events E1, E2, E3 . . . the housekeeping control signals for monitoring the operating status of the various machine components for machine malfunctions, and real time machine functions events, T1, T2, T3 . . . T$n$.

Specifically now referring to the STANDBY mode operation, after power is applied to the computer and interface logic (See FIG. 16), an instruction routine is used to RESET the latch circuits 243$a$, 243$b$, . . . 243$n$ and FLAG any fault condition. Appropriate FLAG routines are used to program the computer so that the computer checks with various monitoring and control elements to check readiness for operation. After the foregoing routine, the power is applied to the machine 5 itself. (See FIGS. 17 and 18).

Next the software routine enters A SWITCH SCAN loop for entering copy run instruction data from the operator console as programmed by the operator and status of monitoring devices in the machine. This routine entails the steps of scanning the various inputs means or keys in the operator console to receive copy run information and other operator instructions, and the status signals of the machine and calculate the timing list for the timed control signals.

For SWITCH SCAN routines the computer is programmed to scan various input terminals at the operator control console. Referring to FIG. 1B showing the control console, the input information applied to the computer by the operator such as the pitch length, copy run (i.e. document number, copy numbers), mode of operation (i.e., simplex or duplex) are applied to suitable register circuits means (not shown) including the AND gates 251$a$, 251$b$, . . . 251$n$. The inputs so provided are strobed into the computer in succession as the computer addresses them one at a time at a very high speed.

The computer operational speed is extremely fast compared to the speed with which the operator keys in the input information. Consequently, if need be, the computer can be programmed to scan an input instruction from the operator console several times and determine statistically on the basis of composite result of the scanned input the genuineness of the input and store the instruction. This feature renders the control immune to electrical noise signals which would otherwise interfere with the operation of the controller and thus of the machine.

The importance of this noise immunity feature is especially significant in view of the fact that xerographic reproducing machine to be operated by the programmable computer is inherently a very noisy machine in the electrical sense because of the high AC and DC corona generating supplies which range in the order of thousands of volts. The noise immunity features is attributable to a number of factors. Thus for example, the scanning operation implemented by the software control as described above enables the computer and interface logic to use DC power supply in the range of below 20 to 30 volts D.C. There are other factors that render the machine less noise immune: For example, the input signals from the control console are not directly applied to the computer but selectively examiner by the computer using the interface circuits. In this manner, the computer need only examine those signals which are necessary to the operation of the system at a particular given time. All other signals can be ignored so that noise on these other signal lines does not affect the operation of the system. Secondly, the noise signals, e.g. conducted and radiated noise, that might pass through the buffered isolation are prevented from affecting the internal operation of the computer because of the sampling approach used in the input scanning operation. In this regard, it is noted that the scanning and sampling time interval is typically in the order of only microseconds or submicroseconds whereas non-scanning timing interval is in the order of miliseconds. So the probability of noise signals occurring in the microseconds or submicroseconds scan time slot as opposed to the miliseconds non-scan duration is very small. Consequently, the probability that the scanning operation will take up the spark noise is extremely low.

Furthermore, if in spite of this noise should occur at the scanning interval, that noise is even further reduced, according to the present invention by scanning, that is by sampling the input means several times before accepting the input as the genuine input. Thus, suppose the input is applied in the form of logic 1. But suppose the noise condition prevents the entry of logical 1 signal when the input is first scanned. If the scanning cycle is limited in one cycle, this would be picked up and the computer will take the erroneous logical 0 signal as the input.

This rather remote possibility is removed even further by scanning the input means a given number of times, for example, five times, and the computer is programmed to determine the consistency, e.g., four out of five matching sampled signals match, and then treat the matching signal correct input.

Another advantage of the present scanning and sampling technique is that it is immune to switch debounce problem generally associated with electro-mechanical switches used in the control console and elsewhere. Electro-mechanical switched open and close very rapidly for a short period of time after activation. This characterisric is known as switch bounce and often complex interface latching circuits are needed to "debounce" the switch to prevent the control system from thinking there were several switch activations instead of one. By choosing the proper sampling interval with this scanning technique the debounce problem is eliminated without the need for complex circuits or switches.

Another feature of this scan technique is that it solves the problem of multiple operation, switch activation or "rollover." If an operator activates more than one switch at the same time, the controls do not known which information to accept first. This scanning technique prevents any information from being accepted by the computer until the operator is activating only one switch at any one time. Again this is accomplished without complex circuits or interlocking switches.

In short, according to an aspect of the present invention, the software is programmed to include redundancy in sampling or scanning of the inputs during the SWITCH SCAN routine so that the machine operation and particularly, the scanning operation is rendered immune to noise, switch debounce, and rollover problem without the need for complex switches or interface circuits.

Now with reference to FIGS. 1B and 15, some of the SWITCH SCAN routine, in the standby mode, in entering the command or copy run information will be described. Referring to FIG. 15 the DIGIT INPUt routine entails the steps of the computer reading digit inputs, such as the copy run information, i.e., the document numbers, the copy numbers, pitch length etc. into the computer. These digits are entered either to the left (510L) or right (510R) side of the visual means via ENTER LEFT or RIGHT routine using the selection keys 511 and 512 and digit entry keys 501. Whether to enter right or left depends on the specific need of the situation and the way the operator programs the information. For example, the operator may enter the book number of the left and the copy number of the right.

Process Mode Word PMWRD CONTROL (FIG. 15) refers to the software routine that enables the computer to operate selected ones of the operative machine components while the rest of the machine is idle. This feature is expecially useful in the diagnostic operation. Thus, using this routine, the computer can operate and test selected ones of the process members such as guillotine knife 160, web drive motor 105, charging means 22 transfer means 81, developer 24, etc. as signified by the operaor via special instruction keys 533 and 534 so provided.

CONTROL DEVICE routine comprises a software program routine that enables the computer to scan the operative status of the device elements or machine input elements such as interlock, etc. to be sure that they are in an inactivated or reset or energized condition or whatever status is required for operation. For an illustrative routine for this operation, see FIG. 20.

SIMPLEX AND DUPLEX SCAN routines includes software instruction routine enabling the computer to scan the mode of operation (i.e., simplex and duplex) instructed by the operator via the keys 523 and 524. The JOG routine entails software instruction that enables the operator to jog or advance the paper reel 30 by keying the button 531 for a certain purpose such as getting rid of its splice joint.

In a similar manner, other SWITCH SCAN routines may be programmed into the computer to implement other SWITCH SCAN function as directed by the operator.

In short then, the SWITCH SCAN routines described above enable the computer to enter the instructions provided by the operator on the copy run information, copy length, copy run mode, i.e., simplex or duplex and the like and scan the operative status of the machine. (For more specifics see FIGS. 19 and 20 also).

According to another aspect of the present invention, the software is designed so that, if by mistake two or more input keys are pressed simultaneously, it enables the computer to recognize this and not to take in the keyed information until the operator keys in a sequence.

According to yet another aspect of the invention, the software routines prevent the computer from running the machine until the copy run and other necessary information required for making a copy run is keyed in by the operator. When all of the necessary information if keyed properly and entered by the computer then the computer implements the START PRINT SCAN routine and proceeds further.

Figure 21:
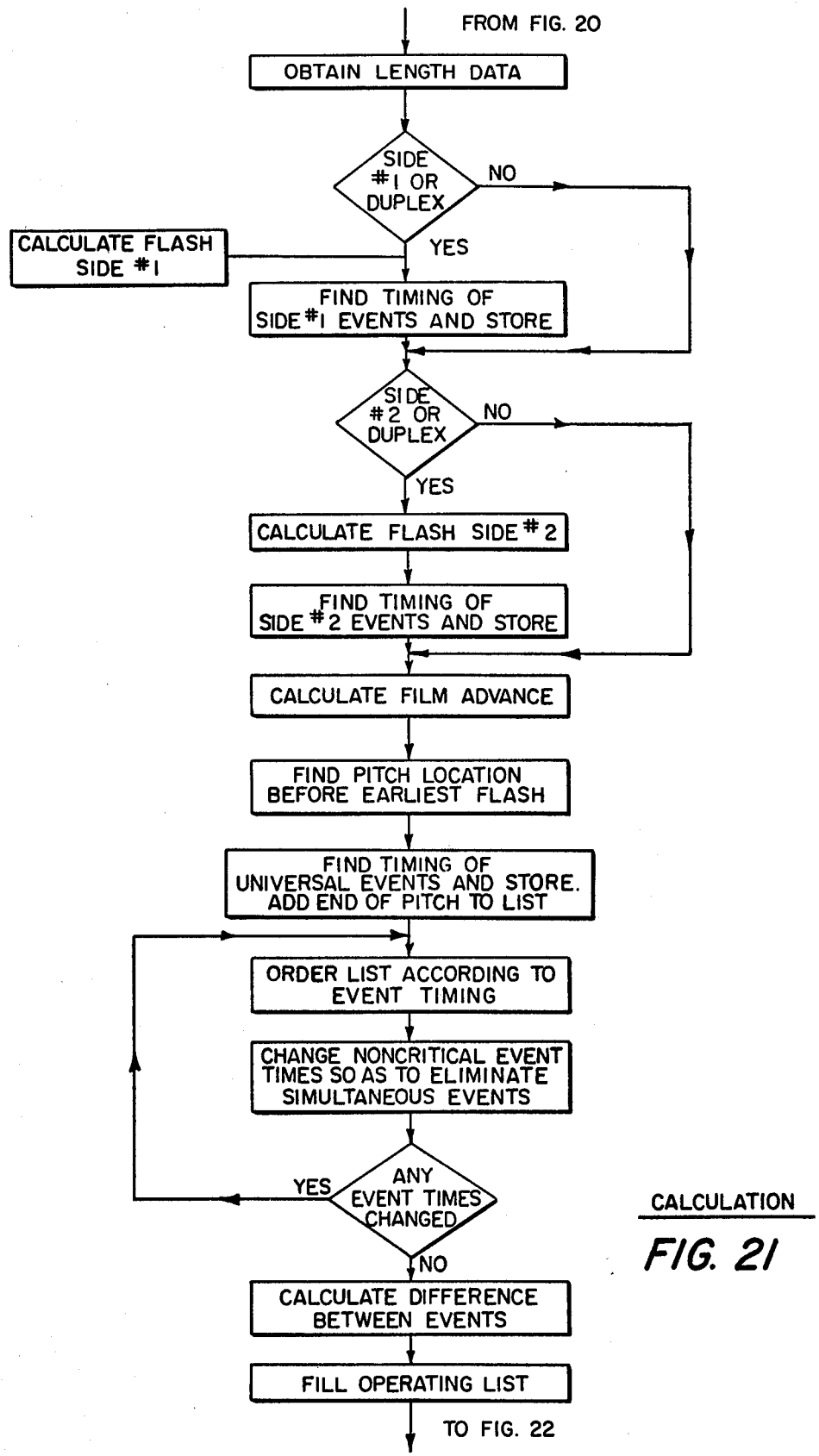

The START PRINT routine is possible only after copy run or diagnostics or other operational instructions have been scanned and entered into the computer properly and the operator presses START PRINT button 521. This routine directs the computer to execute the next routine, namely, calculation of the TIME LISTS of those of machine process events that require precise timing (FIG. 21). In this routine, the software directs the computer to calculate the time intervals between the successive machine events that must occur at precise time positions within each pitch in terms of the clock pulse counts, such as the counts of 230, 450, 650, (FIG. 14) and so on for the exposure transfer, web cutting jam detection etc. discussed earlier in connection with FIGS. 13 and 14. The timing lists derived from this routine is then stored in the event table 205 of the computer memory (FIG. 8) for subsequent use in the EXECUTIVE mode.

Upon completion of the calculating subroutine, the software is programmed to direct the computer to enter with the EXECUTIVE mode to start up the machine (FIG. 22) and generate control signals to implement reproduction process steps and monitor the machine operation in successive cycles until the copy run is completed (FIGS. 23-26).

The EXECUTIVE mode comprises three main types of operational routines. One routine entails the steps of implementing the machine process events, designated PITCH EVENTS, E1, E2, E3 . . . E$n$. This operation requires the computer to generate control signals for the machine process events that require precise timing within each time interval such as flash, web cutting, jam detection, etc. These events occur once every pitch interval when the process zones are fully loaded and are phased in or phased out as the zones are being loaded or unloaded during the start and end of the copy run.

A second routine provides control signals for certain machine process events which do not require precise timing within pitch time intervals but which require proper timing in a real time, although they do not necessarily occur repetitively for every pitch. This subroutine is designated TIME EVENTS, T1, T2, T3 . . . T$n$. These events T1, T2 . . . T$n$, and include the steps actuating the MAIN DRIVE motor, controlling the engagement of web 12 relative to the photoreceptor belts 20, 20', heating of fuser 33, and the like in a proper sequence and in a real time during operation of the machine. The PITCH and TIME event control signals are generated by the computer and addressed to the corresponding control device elements via the address decoder 241 and the latch circuits 254a, 254b . . . 254n of FIG. 9.

A third routine is for checking or monitoring the machine operation status and the like that might be considered a housekeeping routine. This includes the routine to check operator actuated interrupt conditions such as stop command. It includes monitoring operation of sensing components of the machine 5 for checking their malfunction status, such as paper supply run out, excessive fuser temperature, and other of non-timed events of random nature. The third routine entails the steps for enabling the computer to send out the scanning signals to the various scanning stations that monitor or sense the status of the various device control elements in the machine or the switches in the control console.

Upon completion of a copy run, the machine enters a cycle out routine.

In the cycle out routine, the software instructs the computer to go to SWITCH SCAN routine to await for the next copy run instruction the operator may provide. If desired, suitable means, such as teletype or CRT readout may be provided to display the data on the copy run completed via any suitable DATA DUMP routine.

At this point, if the operator encodes the next copy run informations within a suitable waiting time period, then the computer executes the SWITCH SCAN mode for the next copy run. If not, the computer cycles out the machine and the computer.

In operating the computer in the EXECUTIVE MODE the software is programmed to follow through EXEC operations. The EXEC operations comprise a series of interrupt operations adapted to operate the computer as follows. The computer is programmed to operate in cycles in succession usually in micro or sub-micro second cycle time. As the computer through, a PITCH EVENT clock count is stored in counter 209 and checked. If the stored number is not 0, the counter decrements by one and moves to perform the TIME events, the housekeeping operations, or other events.

The computer operates in cyclical fashion in this manner and decrements the counter by one after each machine clock pulse. When the computer finds that the counter being decremented is zero it generates and applis the PITCH event control signal. The next event is taken from the event table and the pitch in qhich the event occurs is checked to see if an image is present. If no image is present, the event is changed to a non-operation event. The computer then loads this next PITCH event count into the counter and moves on to perform other functions. The foregoing steps are repeated to generate the PITCH event control signals in succession as timed by the timing list prepared during the STANDBY mode.

Several significant features may be noted here involving the EXEC operations. Suppose two PITCH events occur at precisely the same time in the actual operation of the machine. Since the software is programmed to generate PITCH EVENT signals one at a time in sequence, it is undesirable to generate more than one PITCH signals simultaneously. But the conflict presented by this situation is avoided by shifting one of the two events by one or two or more machine clock pulse counts and having the computer generate the PITCH event control signals accordingly. The shifting does not adversely affect the operation of the machine nor the quality of the copy because a shift of a few clock pulses as manifested in the operation or copy is hardly noticeable. This can be readily perceived by noting that one clock pulse shift means 0.01 inch movement of the belt in the above example and consequently the image is not adversely affected.

Another aspect of the software control pertains to the jam defect function operation. The software is so programmed that the computer generates PITCH EVENT control signals to look for the absence or presence or both of the cut sheet in the paper path at given times during each pitch time interval. Thus, more specifically, the computer is programmed to generate a timed control signal and apply it to the sensing means 113 of any suitable type. If paper should be there, no jam occurs. Absence of the paper at this point is sensed as jam condition and this is signified to the computer via a monitor circuit and the latch 257. The jam detect operation may be performed at an appropriate time interval later within the same pitch time interval again to assure that the cut sheet has moved. Hence a second jam detect signal is generated by the computer as another PITCH even signal and applied to the monitoring means and sensed. This time the presence of the paper is detected as the jam condition.

The double check performed in detecting the jam condition is especially useful in the high speed machine where, because of the high throughput capacity, failure to detect the jam timely and promptly can result in a large number of sheets being crumpled and accumulated in the paper path which clog the machine and waste paper.

A typical program for use with aforementioned PDP8/S computer for demonstrating the feasibility of operating reproduction machine 5 in an integrated manner to produce copies appears hereinbelow together with an exemplary copy run readout of the program. For information respecting the definition of the various terms used, one may refer to Digital Equipment Corporation's Small Computer Handbook, published in 1967, for the PDP8/S computer.

CONTROL PROGRAM

```
BEGIN,   TAD  I   MASK      /GET M128
         DCA      SCR
         TAD  I   CONS      /OPERATE TABLE START ADDRESS
         DCA      WRITE
         DCA  I   WRITE     /CLEAR OPERATE TABLE
         ISZ      SCR
         JMP      .-2
         TAD  I   CONS+1    /GET -4
         DCA      SCR
         TAD  I   CONS+2    /SHIFT REGISTER START ADDRESS
         DCA      WRITE
         DCA  I   WRITE     /CLEAR SHIFT REGISTER
         ISZ      SCR
         JMP      .-2
         TAD  I   MASK+1    /GET -10
         DCA      SCR
         TAD  I   MASK+2    /BATCH TABLE START ADDRESS
         DCA      WRITE
```

```
         DCA   I  WRITE       /CLEAR BATCH TABLE
         ISZ      SCR
         JMP      .-2
         JMP      DATA        /GET DATA INFORMATION
CONS,    4640
         4636
         4641
MASK,    4633
         4637
         4630
DATA,    TAD   I  MASK+2      /BATCH TABLE START ADDRESS
         DCA      WRITE
         TAD      NMBR
         DCA      TIMER
         TAD      CHK         /DIGIT EXIT ADDRESS
         DCA      SIADD
         TAD      NOLEN       /OVERFLOW EXIT ADDRESS
         DCA      SIMSK
         JMP   I  LFC1        /GO GET LENGTH
CHK,     CHECK
NOLEN,   LENT
LFC1,    LFC
STOLEN,  TAD      SETS
         DCA      LENGTH
NEXT,    TAD      CHAR1       /SET UP EXIT ADDRESS
         DCA      TIMER
         TAD      WRITE       /IS NEXT ENTRY < 10
         TAD   I  CONS1
         SMA CLA
         JMP      D10         /NO
         TAD      NEXIT       /DIGIT EXIT ADDRESS
         DCA      SIADD
         TAD      WRITE       /PUT DIGIT IN TYPE-OUT LIST
         AND   I  MASK1
         IAC
         TAD   I  CONS1+1
         DCA   I  DIGIN
         TAD      NODIG       /OVERFLOW EXIT ADDRESS
         DCA      SIMSK
         JMP   I  NODIG
CONS1,   4642
         4643
MASK1,   4632
NEXIT,   STODIG
DIGIN,   DIGIT
NODIG,   DIGT
D10,     TAD      WRITE       /IS NEXT ENTRY 10
         TAD   I  CONS2
         SPA CLA
         JMP      LAST        /YES
         ISZ      FLAG        /NO
         JMP   I  FULL
FULL,    BBF
LAST,    TAD      NEXIT       /DIGIT EXIT ADDRESS
         DCA      SIADD
         TAD      LDIG        /OVERFLOW EXIT ADDRESS
         DCA      SIMSK
         JMP   I  LDIG
LDIG,    DIGLT
LETTER,  TAD      SCR
         TAD   I  CONS2+3     /IS IT "R"
         SNA CLA
         JMP   I  MID         /YES! START MACHINE
         TAD      SCR         /NO. IS IT "L"
         TAD   I  CONS2+1
         SNA CLA
         JMP      NEWL        /YES! GET NEW LENGTH
         TAD      SCR         /NO. IS IT "C"
         TAD   I  CONS2+2
         SZA
```

```
            JMP   I   CHAR1        /NO. ILLEGAL CHARACTER!
            TAD       OVERC        /YES
            DCA       SIMSK        /OVERFLOW EXIT ADDRESS
            TAD       CHGNR        /DIGIT EXIT ADDRESS
            DCA       SIADD
            TAD       SCR
            TLS
            TSF
            JMP       .-1
            CLA CLL
            DCA       FLAG
            JMP   I   NMBR
MID,        MIDDLE
NEWB,       CHGB
NEWL,       TAD       NORIG
            DCA       TIMER
            JMP       DATA+4
CONS2,      4644
            4646
            4647
            4645
NORIG,      LCHG
CHAR1,      CHAR
OVERC,      NEXT
CHGNR,      CHG
NMBR,       NR
STODIG,     TAD       SETS
            DCA   I   WRITE        /STORE COPIES IN BATCH
            JMP       NEXT
SPEDIG,     TAD       SETS
            DCA   I   SCR+1        /STORE NEW COPIES IN BATCH
            JMP       NEXT
SPED,       SPEDIG
CHG,        TAD       SETS
            TAD   I   MASK+2
            DCA       SCR+1        /STORE BATCH ADDRESS
            TAD       SPED         /DIGIT EXIT ADDRESS
            DCA       SIADD
            TAD       NEWB
            DCA       TIMER
            TAD       SETS         /NUMBER IN PROPER LIMITS
            AND   I   CONS3+1
            SZA CLA
            JMP   I   G10          /NO!  >> 10
            TAD       SETS
            TAD   I   CONS3
            SPA
            JMP       L10          /LESS THAN 10
            SZA CLA
            JMP   I   G10          /GREATER THAN 10
            TAD   I   LDIG1        /OVERFLOW EXIT ADDRESS
            DCA       SIMSK
            JMP   I   SIMSK
L10,        CLA CLL
            TAD       SETS
            JMP   I   NEXT1
G10,        NEXT
CONS3,      4637
            4633
            4632
LDIG1,      LDIG
NEXT1,      NEXT+13
CHAR,       KSF                    /WAIT FOR CHARACTER
            JMP       .-1
            KRB                    /GET NEXT CHARACTER
            DCA       SCR
            TAD       SCR          /DIGIT OR LETTER
            TAD   I   CONS4
            SPA
            JMP       CHAR         /NEITHER
```

```
            TAD   I   CONS3
            SMA CLA
            JMP   I   LTR         /LETTER
            TAD       FLAG        /DIGIT! IS IT LEGAL
            SZA
            JMP       CHAR        /NO
            DCA       LCTR        /YES
            DCA       SETS
            TAD   I   CONS4+1
            DCA       PCTR
            JMP       ZERO        /GET ALL DIGITS
CONS4,      4650
            4636
LTR,        LETTER
NR,         DCA       LCTR
            DCA       SETS
            TAD   I   CONS4+1
            DCA       PCTR
READ1,      KSF
            JMP       .-1
            KRB
            DCA       SCR
            TAD       SCR
            TAD   I   CONS4
            SPA
            JMP       CRCHK
            TAD   I   CONS3
            SMA CLA
            JMP       RUBOUT
            TAD       LCTR
            SNA CLA
            JMP       ZERO
            TAD       SCR
PRT,        TLS
            TSF
            JMP       .-1
            TAD   I   CONS5
            SPA
            JMP       GO
            SNA CLA
            JMP       LF
            TAD       SCR
            AND   I   CONS3+2
            DCA       SCR
            TAD       SETS
            CLL RTL
            TAD       SETS
            SZL
            JMP   I   LFCR
            RAL
            SZL
            JMP   I   LFCR
            TAD       SCR
            SZL
            JMP   I   LFCR
            DCA       SETS
            ISZ       LCTR
            ISZ       PCTR
            JMP       READ1
            JMP       OVER
CONS5,      4651
            4652
            4653
            4654
CRCHK,      CLA
            TAD       SCR
            TAD   I   CONS5
            SZA CLA
            JMP       READ1
            TAD       LCTR
```

```
          SNA CLA
          JMP       READ1
          JMP       PRT-1
ZERO,     TAD       SCR
          AND   I   CONS3+2
          SNA CLA
          JMP       READ1
          JMP       PRT-1
OVER,     TAD   I   CONS5
          CIA
          JMP       PRT
LF,       TAD   I   CONS5+1
          JMP       PRT
LFCR,     LFC
RUBOUT,   TAD       SCR
          TAD   I   CONS5+2
          SZA
          JMP       READ1
          JMP       OVER
GO,       CLA CLL
          TAD       SCR
          TAD   I   CONS5+2
          SNA CLA
          JMP       NR
          JMP   I   SIADD
CHECK,    TAD       SETS      /DIGIT < 8
          TAD   I   CONS5+3
          SPA CLA
          JMP   I   SIMSK     /YES! GET ANOTHER
          TAD       SETS      /NO!  DIGIT <17
          TAD   I   CONS7
          SMA CLA
          JMP       X10       /NO
X100,     TAD   I   CONS7+1   /YES! X100
          DCA       SCR
          TAD       SETS
          CLL RTL
          TAD       SETS
          RAL
          DCA       SETS
          ISZ       SCR
          JMP       X100+2
MAX,      TAD       SETS      /DIGIT <1700
          TAD   I   CONS7+2
          SMA CLA
          JMP   I   SIMSK     /NO!  GET ANOTHER
          TAD       SETS      /YES! DIGIT >800
          TAD   I   CONS7+5
          SPA CLA
          JMP   I   SIMSK     /NO!  GET ANOTHER
          JMP   I   GLEN      /YES! STORE IT
X10,      TAD       SETS      /DIGIT < 170
          TAD   I   CONS7+3
          SMA CLA
          JMP       MAX       /NO.
          TAD   I   CONS7+4
          DCA       SCR
          JMP       X100+2
CONS7,    4655
          4656
          4657
          4660
          4635
          4661
          4636
          4710
GLEN,     STOLEN
LCHG,     TAD       LENGTH
          JMP       BCD
CHGB,     TAD   I   SCR+1
```

```
            JMP     BCD
            DCA     EVENT+1
CONV,       TAD     EVENT
            TAD  I  SUB
            SZL
            DCA     EVENT
            CLA
            TAD     EVENT+1
            RAL
            DCA     EVENT+1
            ISZ     SUB
            ISZ     SCR+2
            JMP     CONV
            JMP  I  BEXIT
MASK99,     4627
            4632
            4600
            4640
TEMP1,      TEMP
THOU1,      THOU
HUN1,       HUN
TEN1,       TEN
EVENT3,     CCRET
GETNR,      GET4
THMASK,     6040
TOMASK,     4601
BCD,        DCA     EVENT
            TAD  I  CONS7+6
            DCA     SCR+2
            ISZ     SCR+2
            TAD     CONS7+7
            DCA     SUB
            TAD     THOU1
            DCA     BEXIT
            JMP     CONV-1
THOU,       TAD     EVENT+1
            RTL
            DCA     EVENT+1
            TAD  I  CONS7+6
            DCA     SCR+2
            TAD     HUN1
            DCA     BEXIT
            JMP     CONV
HUN,        TAD     EVENT+1
            TAD     THMASK
            DCA     WORD1
            TAD  I  CONS7+6
            DCA     SCR+2
            TAD     TEN1
            DCA     BEXIT
            JMP     CONV-1
TEN,        TAD     EVENT+1
            RTL
            RTL
            RTL
            TAD     EVENT
            TAD  I  TOMASK
            DCA     WORD2
            TAD     WORD1
LAST2,      AND  I  MASK99
            CLL RTR
            RTR
            RTR
            JMS  I  TEMP1
            TAD     WORD1
            AND  I  MASK99+1
            JMS  I  TEMP1
            TAD     WORD2
            DCA     WORD1
            DCA     WORD2
```

```
                TAD         WORD1
                SZA
                JMP         LAST2
                TAD     I   CONS7+4
                JMS     I   TEMP1
                TAD         FLAG
                AND     I   MASK99+2
                SNA CLA
                JMP     I   GETNR
                JMP     I   EVENT3
COMPUT,         TAD     I   MASK99+3    /DIFF TABLE STARTING ADDRESS
                DCA         WRITE
                LAS                     /GET MODE OF OPERATION
                DCA         SETS
                TAD         SETS
                CIA
                DCA         SCR
                TAD         CONS8       /GET START & NUMBER
                SKP
                IAC
                ISZ         SCR
                JMP         .-2
                DCA         SCR
                TAD     I   SCR
                DCA         SCR+1
                TAD         SCR+1
                AND     I   MASK3+4
                CLL RTR
                RTR
                RTR
                TAD     I   CONS8+4
                DCA         READ        /START OF INPUT TABLE
                TAD         SCR+1
                AND     I   MASK3+2
                DCA         PCTR        /NUMBER OF INPUTS
                TAD         SETS
                AND     I   MASK3       /DUPLEX OR SIMPLEX #2
                SZA CLA
                JMP         FLASH       /YES!  COMPUTE FLASH #2
                TAD         PCTR        /NO
                CIA
                DCA         LCTR
                JMP         AGAIN
MIDDLE,         TAD         LENGTH
                TAD     I   CONS8+6
                SNL CLA
                SKP
                IAC
                IAC
                CMA
                DCA         HOLD
                TAD     I   MASK3+5     /CHECK MIDDLE-OF-RUN FLAG
                AND         FLAG
                SNA CLA
                JMP         COMPUT
                TAD         FLAG
                TAD     I   MASK3+6     /SET RUN FLAG
                DCA         FLAG
                LAS
                TAD     I   CONS8+7
                SMA
                SKP
                JMP     I   SIMPL1
                SZA CLA
                JMP     I   DUPLEX
                JMP     I   SIMPL2
SIMPL1,         SIMP1
SIMPL2,         SIMP2
DUPLEX,         DUPL
                4636
                4651
```

```
GET4,     KSF
          JMP     .-1
          KRB
          DCA     SCR
          TAD     SCR
          TAD   I GET4-1
          SNA CLA
          JMP   I NOGOOD
          TAD   I GET4-2
          DCA     PCTR
          DCA     LCTR
          DCA     SETS
          JMP   I NOR1
NOR1,     READ1+4
NOGOOD,   SAVE
FLASH,    TAD     PCTR
          IAC
          DCA     PCTR
          TAD     PCTR
          CIA
          DCA     LCTR
          TAD   I CONS8+2    /START OF INPUT TABLE
          DCA     SCR
          TAD   I CONS8+3
          DCA     SCR+1
          CLL
          TAD   I MASK3+1    /COMMON LENGTH
          TAD     LENGTH
          SNL                /RETARD OR ADVANCE
          JMP     RETARD     /RETARD
          CLL                /ADVANCE
          TAD     SCR+1      /ADDING TIME
          DCA     SCR+1
          SZL                /IS THERE A CARRY
          IAC                /YES
          TAD     SCR        /NO
          AND   I MASK3+2
          TAD   I MASK3+3
          DCA     SCR
          JMP     AGAIN+4
RETARD,   TAD     SCR+1      /SUBTRACTING TIME
          DCA     SCR+1
          SNL                /IS THERE A BORROW
          TAD   I CONS8+5    /YES! SUBTRACT ONE
          JMP     RETARD-5   /NO
CONS8,    4662
          4640
          5000
          5001
          4670
          4635
          4723
          4656
MASK3,    4612
          4667
          4634
          4604
          4633
          4617
          4600
AGAIN,    TAD   I READ
          DCA     SCR
          TAD   I READ
          DCA     SCR+1
          TAD     SCR
          AND   I MASK3+2
          DCA     SCR+2
          TAD     SCR
          AND   I MASK3+4
          DCA     EVENT
```

```
        DCA     ACC
        TAD     LENGTH
        CIA
        DCA     SCR
        CLL
START,  TAD     SCR+1
        TAD     SCR
        ISZ     ACC
        SNL
        JMP     .+3
        CLL
        JMP     START+1
        DCA     SCR+1
        TAD     SCR+2
        SNA
        JMP     STORE
        TAD  I  CONS9
        DCA     SCR+2
        TAD     SCR+1
        JMP     START+5
STORE,  TAD     SCR+1
        TAD     LENGTH
        DCA  I  WRITE
PITCH,  TAD  I  CONS9+1
        DCA     SCR+1
        TAD  I  CONS9+2
        DCA     SCR
        TAD     ACC
        TAD     SCR
        SMA SZA
        JMP     OK
        DCA     ACC
        TAD     SCR+1
        TAD  I  CONS9+3
        DCA     SCR+1
        TAD     ACC
        SNA
        JMP     OK+5
        DCA     ACC
        TAD     SCR
        CIA
        TAD     ACC
        DCA     ACC
        TAD     SCR
        TAD  I  CONS9+4
        DCA     SCR
        JMP     PITCH+4
OK,     TAD  I  CONS9
        TAD     SCR+1
        TAD     EVENT
        DCA  I  WRITE
        JMP     CHECK1
        TAD  I  CONS9+5
        TAD     SCR+1
        TAD     EVENT
        JMP     OK+3
CHECK1, ISZ     LCTR
        JMP  I  AGIN
        JMP     SORT
CONS9,  4635
        4606
        4671
        4654
        4672
        4673
AGIN,   AGAIN
SORT,   CLL
        TAD  I  CONS10
        DCA     READ
        TAD  I  READ
```

```
            DCA     SCR
            TAD  I  READ
            DCA     SCR+1
            TAD     SCR+1
            AND  I  MASK5
            AND  I  MASK5+1
            SZA
            JMP     S1              /SIMPLEX #1
            TAD     LENGTH          /SIMPLEX #2 OR DUPLEX
            TAD  I  CONS10+1        /COMMON LENGTH
            SNL
            JMP     F1              /FLASH #1 LAST
S1,         CLA CLL                 /FLASH #2 LAST
            TAD     SCR
            IAC
            DCA  I  WRITE
            TAD     SCR+1
            AND  I  CONS10+2
            TAD  I  CONS10+3
            DCA  I  WRITE
            JMP     RES
F1,         CLA CLL
            TAD  I  READ
            DCA     EVENT
            TAD  I  READ
            DCA     SCR+2
            TAD     SCR+2           /IS THERE A FLASH #1
            AND  I  MASK5
            AND  I  MASK5+1
            SNA CLA
            JMP     S1              /NO! USE FLASH #2
            TAD     EVENT
            DCA     SCR
            TAD     SCR+2
            DCA     SCR+1
            MMP     S1
CONS10,     4640
            4667
            4634
            4616
MASK5,      4633
            4605
RES,        TAD     PCTR
            CIA
            DCA     LCTR
            DCA     FLAG
            TAD  I  CONS10
            DCA     READ
            TAD  I  CONS10
            DCA     WRITE
            TAD  I  READ
            DCA     SCR             /FIRST RESIDUE
            TAD  I  READ
            DCA     EVENT
MORE,       TAD  I  READ
            DCA     SCR+1           /NEXT RESIDUE
            TAD  I  READ
            DCA     EVENT+1
            TAD     SCR+1
            CIA
            TAD     SCR             /FIRST - SECOND RESIDUE
            SPA SNA
            JMP     ENTRY
            CLA CLL
            TAD     SCR
            DCA     SCR+2
            TAD     SCR+1
            DCA     SCR
            TAD     SCR+2
            DCA     SCR+1
```

```
            TAD     EVENT
            DCA     SCR+2
            TAD     EVENT+1
            DCA     EVENT
            TAD     SCR+2
            DCA     EVENT+1
            ISZ     FLAG
ENTRY,      CLA CLL
            TAD     SCR
            DCA  I  WRITE
            TAD     EVENT
            DCA  I  WRITE
            TAD     SCR+1
            DCA     SCR
            TAD     EVENT+1
            DCA     EVENT
            ISZ     LCTR
            JMP  I  MORE1
            TAD     SCR
            DCA  I  WRITE
            TAD     EVENT
            DCA  I  WRITE
            TAD     FLAG
            SNA CLA
            JMP     RES1+1          /CHECK SIMULTANEOUS EVENTS
            JMP  I  RES1            /SORT AGAIN
MORE1,      MORE
RES1,       RES
            TAD     SIMSK           /HAS END PITCH BEEN ENTERED
            SNA CLA
            JMP     SETUP           /YES!  SKIP
            TAD     LENGTH          /NO!   ENTER END PITCH
            DCA  I  WRITE
            TAD     CONS11+1
            DCA  I  WRITE
            DCA     SIMSK
            TAD     PCTR
            IAC
            DCA     PCTR
SETUP,      TAD  I  CONS11
            DCA     READ
            TAD  I  CONS11
            DCA     WRITE
            TAD     PCTR
            CIA
            DCA     LCTR
            TAD  I  READ
            DCA     SCR
            TAD  I  READ
            DCA     EVENT
SIMUL,      TAD  I  READ
            DCA     SCR+1
            TAD  I  READ
            DCA     EVENT+1
            TAD     SCR             /CHECK RESIDUES
            CIA
            TAD     SCR+1
            SZA                     /ARE RESIDUES EQUAL
            JMP  I  WRITE1          /NO!  WE'RE IN LUCK
            TAD     TRY2            /YES!  DO SOME CHECKING
            DCA     NORM            /EXIT ADDRESS ENTERED
            TAD     EVENT+1
            AND  I  CONS11+2
            JMP     TRY
CONS11,     4640
            2300
            4633
TRY2,       DONE
WRITE1,     ENTER
TRY,        TAD  I  CONS11+2        /IS IT FLASH #1.
```

```
              SNA
              JMP       YES
              TAD  I    CONS11+2    /NO!  IS IT FLASH #2
              SNA
              JMP       YES
              TAD  I    CONS11+2    /NO!  IS IT FILM ADVANCE
              SNA
              JMP       YES
              TAD  I    MASK6       /NO!  IS IT PAPER CUT
              SNA
              JMP       YES
              TAD       MASK6+1     /NO!  IS IT END PITCH
              SNA CLA
YES,          IAC
              JMP  I    NORM        /NO!  CHANGE RESIDUE
MASK6,        4677
              6400
DONE,         SNA CLA               /CAN WE CHANGE #2
              JMP       INCRN       /YES
              TAD       TRY1        /NO!  CHECK #1
              DCA       NORM
              TAD       EVENT
              AND  I    CONS11+2
              JMP       TRY
TRY1,         DONE1
EXIT2,        EXITA
DONE1,        SNA CLA               /CAN WE CHANGE #1
              JMP       INCRA       /YES
              JMP  I    WRITE1      /NO!  NORMAL WRITE
INCRN,        TAD       SCR+1
              DCA       MOD         /GET RESIDUE #2
              TAD       EVENT+1
              DCA       ACC         /GET EVENT#2
              TAD       EXIT1
              DCA       NORM        /EXIT ADDRESS ENTERED
              JMP  I    TOOBAD
EXIT1,        EXITN
TOOBAD,       CHGRES
EXITN,        TAD       MOD
              DCA       SCR+1       /ENTER NEW RESIDUE
              TAD       ACC
              DCA       EVENT+1     /ENTER EVENT
              JMP  I    WRITE1
INCRA,        TAD       SCR
              DCA       MOD         /GET RESIDUE #1
              TAD       EVENT
              DCA       ACC         /GET EVENT #1
              TAD       EXIT2
              DCA       NORM        /EXIT ADDRESS ENTERED
              JMP       CHGRES
WRITE2,       ENTER
EXITA,        TAD       MOD
              DCA       SCR         /ENTER NEW RESIDUE
              TAD       ACC
              DCA       EVENT       /ENTER EVENT
              JMP  I    WRITE2
CHGRES,       IAC
              DCA       FLAG        /SET CHANGE FLAG
              TAD       LENGTH
              CIA
              TAD       MOD         /IS RESIDUE > LENGTH
              SZA
              JMP       LUCKY       /NO!
              DCA       MOD         /YES!  CHECK PITCH ADDRESS
              TAD       ACC
              AND  I    MASK7
              TAD       CONS12      /IS POSITION > 5
              SZA
              JMP       LUCKY1      /NO!
              TAD       ACC         /YES!
```

```
                AND     MASK7+1
                TAD  I  CONS12+1
                DCA     ACC
                SKP
LUCKY1, ISZ             ACC
LUCKY,  ISZ             MOD
                CLA CLL
                JMP  I  NORM
MASK7,  4625
        7770
CONS12, 7773
        4610
ENTER,  CLA CLL
                TAD     SCR
                DCA  I  WRITE
                TAD     EVENT
                DCA  I  WRITE
                TAD     SCR+1
                DCA     SCR
                TAD     EVENT+1
                DCA     EVENT
                ISZ     LCTR
                JMP  I  SIMUL1
                TAD     SCR
                DCA  I  WRITE
                TAD     EVENT
                DCA  I  WRITE
                TAD     FLAG
                SNA CLA
                JMP     .+4
                JMP  I  OVER1
SIMUL1, SIMUL
OVER1,  RES
                TAD  I  CONS30
                DCA     READ
                TAD  I  CONS30
                DCA     WRITE
                TAD     PCTR
                CIA
                DCA     LCTR
                TAD  I  READ
                DCA     SCR
                TAD  I  READ
                DCA     EVENT
                TAD     SCR
                DCA  I  WRITE
                TAD     EVENT
                DCA  I  WRITE
DIFF,           TAD  I  READ
                DCA     SCR+1
                TAD  I  READ
                DCA     EVENT
                TAD     SCR
                CIA
                TAD     SCR+1
                DCA  I  WRITE
                TAD     EVENT
                DCA  I  WRITE
                TAD     SCR+1
                DCA     SCR
                ISZ     LCTR
                JMP     DIFF
                JMP     RUN
CONS30, 4640
        4674
RUN,    CLA CLL
                TAD     SETS        /WHICH FLASH IS FIRST
                AND  I  MASK30
                SNA CLA
                JMP  I  SIM1        /FLASH #1! NO FLASH C2
```

```
           TAD      SETS
           AND   I  MASK30+1
           SNA CLA
           JMP   I  SIM2       /FLASH #2!  NO FLASH #1
           JMP   I  DUP        /DON'T KNOW, CHECK LENGTH
           TAD      LENGTH
           TAD   I  CONS31     /COMMON LENGTH
           SZL
           JMP      FL1
FL2,       CLA
           TAD   I  CONS31+1   /-0200
           DCA      FLAG
           JMP      LOOK
FL1,       CLA
           TAD   I  CONS31+2   /-0100
           DCA      FLAG
           JMP      LOOK
SIM1,      SIMP1
SIM2,      SIMP2
DUP,       DUPL
CONS31,    4667
           4675
           4633
MASK30,    4612
           4613
LOOK,      TAD   I  CONS30     /DIFF TABLE START ADDRESS
           DCA      READ
           TAD   I  READ
           CLA
           TAD   I  READ
           AND   I  CONS31+2   /CLEAR PITCH INFO
           TAD      FLAG       /SUBTRACT EVENT NUMBER
           SZA
           JMP      LOOK+2     /NO GOOD!  GET NEXT ONE
           DCA      FLAG       /CLEAR FLAG
           TAD      READ       /THIS IS IT!
           DCA      SCR
           TAD   I  SCR
           DCA      SCR
           TAD      SCR
           AND   I  MASK32     /EXTRACT REGISTER ADDRESS
           TAD   I  CONS33     /SUBTRACT ONE
           SMA
           SKP
           JMP      C1         /CONDITION ONE
           SZA
           JMP      C2         /CONDITION TWO
           TAD      SCR        /DIFFICULT CONDITION
           AND   I  MASK31
           CLL RAR
           RTR
           TAD   I  CONS32
           DCA   I  SIADD      /SHIFT REGISTER ADDRESS
           TAD      CONS32+1
           DCA      SIMSK+1    /FIRST MASK ADDRESS
           TAD      CONS32+2
           DCA      SIMSK      /SECOND MASK ADDRESS
           TAD      FLAG       /SET UP SPECIAL FLAG
           TAD   I  CONS32+3
           DCA      FLAG
           JMP      INSERT
CONS32,    4676
           4621
           4614
           4602
MASK31,    4624
C1,        CLA CLL             /SET UP ADDRESS AND MASK
           TAD      SCR
           AND   I  MASK31
           RAR
```

```
            RTR
            TAD   I   CONS32
            TAD   I   CONS33
            DCA       SIADD       /SHIFT REGISTER ADDRESS
            TAD       CONS33+1
            DCA       SIMSK       /MASK ADDRESS
            TAD       CONS33+2
            JMP       AOK
C2,         CLA CLL               /EASY FLASH POSITION
            TAD       SCR
            AND   I   MASK31
            RAR
            RTR
            TAD   I   CONS32
            DCA       SIADD       /SHIFT REGISTER ADDRESS
            TAD       SCR
            AND   I   MASK32
            CIA
            IAC
            DCA       SCR+1
            TAD       CONS33+3
            DCA       SIMSK
            ISZ       SCR+1
            SKP
            JMP       INSERT
            ISZ       SIMSK
            JMP       .-4
INSERT,     TAD       SCR         /SET PITCH CODE INSERTION
            AND   I   MASK32
            CIA
            DCA       SCR+1
            TAD       CONS33+4
            ISZ       SCR+1
            SKP
            JMP       AOK
            TAD   I   CONS33+2
            JMP       .-4
CONS33,     4635
            4632
            4612
            4626
            4600
MASK32,     4625
AOK,        DCA       NORM
            TAD   I   CONS34
            DCA       READ
AOK1,       TAD   I   READ
            CLA CLL
            TAD   I   READ
            AND   I   MASK33
            TAD   I   CONS34+1
            SZA
            JMP       AOK1
            TAD       READ
            DCA       SCR
            TAD   I   SCR
            DCA       SCR
            TAD       SCR
            RTR
            RAR
            AND   I   MASK32
            TAD   I   CONS32
            DCA       MADD
            TAD       SCR
            AND   I   MASK32
            TAD   I   MASK33+1
            SNA
            JMP       .+3
            SMA CLA
```

```
          JMP      AOK2
          TAD      SCR
          AND   I  MASK32
          CMA
          DCA      SCR+1
          TAD   I  CONS34+2
          SKP
          CLL RTR
          ISZ      SCR+1
          JMP      .-2
          DCA      MOD
          JMP      FIN
CONS34,   4640
          4677
          4601
          4613
MASK33,   4633
          4636
AOK2,     CLA CLL
          TAD   I  CONS34+3
          TAD      FLAG
          DCA      FLAG
          TAD   I  CONS34+3
          DCA      MOD
FIN,      TAD   I  MASK33+1
          DCA      LCTR
          TAD   I  CONS35+2
          DCA      PCTR
          TAD   I  CONS35+3
          DCA      PRADD
          TAD   I  CONS35+3
          DCA      LDADD
          TAD   I  MASK34+3
          DCA      INADD
          JMP   I  MCHK1
NOMEM,    DCA      FLAG
          TAD   I  MASK34+1
          DCA      SETS
          TAD   I  MASK34+2
          DCA      READ
          TAD   I  READ
          SNA
          JMP      .+7
          CIA
          DCA      SETS
          TAD      READ
          AND   I  BMASK
          DCA      MODE
          JMP      INST-3
          ISZ      SETS
          JMP      NOMEM+5
          JMP   I  NOCOP
BMASK,    4632
READER,   DDIM+2
          TAD   I  MASK34+3
          DCA      ODD          /GET PAPER CUTTER MASK
          TAD   I  ODD
INST,     CLA
          TAD   I  ODD
          AND   I  MASK34+4
          TAD      INST
          SZA
          JMP      INST-1
          TAD      ODD
          DCA      SCR
          TAD   I  SCR
          DCA      SCR
          TAD      SCR
          RTR
          RAR
```

```
        AND   I   MASK34+5
        DCA       PCADD
        TAD       SCR
        AND   I   MASK34+5
        TAD       MASK34+6
        SMA CLA
        JMP       SPEC
        TAD       SCR
        AND   I   MASK34+5
        IAC
        CMA
        DCA       SCR
        SKP
        CLL RTR
        TAD   I   MASK34+7
        ISZ       SCR
        JMP       .-3
        DCA       PCMSK
        JMP       .+4
SPEC,   ISZ       PCADD
        TAD   I   MASK34+7
        JMP       SPEC-2
        TAD   I   MASK34+3
        DCA       ODD            /FIND INVERT MASK
        TAD   I   ODD
        CLA
        TAD   I   ODD
        AND   I   MASK34+4
        TAD       CONS35
        SZA
        JMP       SPEC+5
        TAD       ODD
        DCA       SCR
        TAD   I   SCR
        DCA       SCR
        TAD       SCR
        RTR
        RAR
        AND   I   MASK34+5
        DCA       IVADD
        TAD       SCR
        AND   I   MASK34+5
        CMA
        DCA       SCR
        SKP
        CLL RTR
        TAD   I   MASK34+7
        ISZ       SCR
        JMP       .-3
        DCA       IVMSK
        TAD   I   MASK34+2
        DCA       ODD
MEM,    TCF
        KCC
        JMP   I   READER
MCHK1,  MCHK
MASK34, 4600
        4637
        4630
        4640
        4633
        4625
        7773
        4614
CONS35, 6700
        4676
        4636
        4700
NOCOP,  NCOP
```

```
LOAD,   CLA CLL
        TAD   I   INADD       /GET DIFFERENTIAL
        DCA   I   LDADD       /PUT IT IN TABLE
        TAD   I   INADD       /GET EVENT
        DCA       SCR
        TAD       SCR         /GET BIT LOCATION
        AND   I   MASK34+5
        CMA
        DCA       SCR+1
        TAD       SCR         /GET SHIFT REGISTER ADDRESS
        RAR
        RTR
        AND   I   MASK34+5
        TAD   I   CONS35+1
        DCA       SCR+2       /GOT IT
        TAD   I   SCR+2       /GET SHIFT REGISTER
        SKP
        RTL                   /GET PITCH CODE
        ISZ       SCR+1       /DO WE HAVE IT
        JMP       .-2         /NO!  TRY AGAIN
        CLL RTL
        RAL
        AND   I   MASK10+1
        CMA
        DCA       SCR+2       /SAVE IT
        TAD       SCR         /GET VALIDITY CODE
        AND   I   MASK10+2
        CLL RTR
        RTR
        RTR
        TAD   I   CONS16+1
        DCA       SCR+1
        TAD   I   SCR+1       /GOT IT
        SKP
VALID,  RAR                   /IS EVENT VALID
        ISZ       SCR+2
        JMP       .-2
        AND   I   MASK10+3
        SNA
        JMP       .+3
        CLA CLL
        TAD       SCR
        DCA   I   LDADD       /LOAD IT IN TABLE
        TAD       SCR
        TAD       CONS16+2    /IS IT TIME TO SHIFT
        SNA CLA
        JMP       SHIFT
        ISZ       LCTR        /END OF TABLE
        SKP                   /NO
        JMP       RESET       /YES
WAIT,   TAD       LCTR        /IS ANOTHER ENTRY NEEDED
        CIA
        TAD       PCTR
        SZA
        JMP   I   LOAD1       /YES!  DO IT
        JMP   I   COUNT1      /NO!  WAIT
RESET,  TAD   I   CONS16+3
        DCA       LCTR
        TAD   I   CONS16+4
        DCA       LDADD
        JMP       WAIT
CONS16, 4676
        4701
        5500
        4636
        4700
MASK10, 4625
        4621
        4633
```

```
             4613
COUNT1,  COUNT
JACK1,   JACK
LOAD1,   LOAD
SVC,     TAD   I   PRADD       /GET DIFFERENTIAL
         DCA       TIMER
         TAD   I   PRADD       /GET EVENT
         AND   I   MASK10+2    /CLEAR PITCH INFORMATION
         CLL RTR
         RTR
         RTR
         TAD   I   CONS17      /ADD BASE ADDRESS
         DCA       EVENT
         JMP   I   EVENT       /PERFORM EVENT
END,     ISZ       PCTR        /END OF TABLE
         JMP       RETURN      /NO! CONTINUE
         TAD   I   CONS16+3
         DCA       PCTR
         TAD   I   CONS16+4
         DCA       PRADD
RETURN,  TCF
         JMP       WAIT
INT,     KRB
         TAD       CONS17+1    /IS THIS STOP SET
         SNA
         JMP       SS
         TAD       CONS17+2    /IS THIS END FRAME
         SNA
         JMP       INV
         TAD   I   CONS17+3    /IS THIS STOP FRAME
         SNA
         JMP       SF
         TAD   I   CONS16+3    /IS THIS JAM
         SNA
         JMP   I   JAM1
         TAD       CONS17+6    /IS THIS EMERGENCY
         SNA
         JMP   I   PANIC1
         TAD       CONS17+2    /IS THIS SPLICE
         SNA CLA
         JMP       SPL
         JMP   I   0000
JAM1,    JAM
         4606
         4607
CONS17,  4703
         7476
         7775
         4635
         4601
         0174
         7772
PANIC1,  PANIC
INV,     TAD   I   CONS17+4
         TAD       FLAG
         DCA       FLAG
         JMP   I   0000
SPL,     TAD   I   CONS17+4
         TAD   I   CONS17+5
         DCA   I   CONS17+5
         JMP   I   0000
SS,      TAD   I   JAM1+1
         TAD       FLAG
         DCA       FLAG
         JMP   I   0000
SF,      TAD   I   JAM1+2
         JMP       .-4
SHIFT,   TAD       FLAG
         AND   I   MASK10+3
         SNA CLA
```

```
            JMP    I   JACK1
            TAD        MOD
            CLL RTR
            RAR
            DCA        MOD
            TAD        MADD
            IAC
            DCA        MADD
            JMP        .+4
JACK,       TAD        MOD
            CLL RTR
            DCA        MOD
            TAD    I   CONS19+2
            DCA        INADD
            TAD        FLAG        /IS SPECIAL FLAG SET
            AND    I   MASK11+1
            SNA CLA
            JMP        EASY        /NO
            TAD        SIADD       /IS SPLICE PRESENT
            TAD    I   CONS19+3
            DCA        SCR
            TAD    I   SCR
            AND    I   SIMSK+1
            SZA CLA
            JMP        MOVE        /YES!  SHIFT
EASY,       TAD    I   SIADD
            AND    I   SIMSK
            SZA CLA                /NO!  CHECK RUN
            JMP        MOVE        /YES!  SHIFT
            TAD        FLAG        /IS RUN FLAG SET
            AND    I   MASK11+2
            SNA CLA
            JMP        BATCH1
            TAD    I   NORM        /NORMAL PITCH CODE
            TAD    I   SIADD
            DCA    I   SIADD
MOVE,       TAD    I   CONS19+4
            IAC
            DCA        SCR
            TAD        CONS19+5
            DCA        SCR+1
            TAD        SCR+1
            TAD    I   CONS19+3
            DCA        SCR+2
            TAD    I   SCR+1
            AND    I   CONS19+4
            CLL RTR
            DCA    I   SCR+1
            TAD    I   SCR+2
            AND    I   MASK11+3
            RTR
            RAR
            TAD    I   SCR+1
            DCA    I   SCR+1
            TAD        SCR+2
            DCA        SCR+1
            ISZ        SCR
            JMP        MOVE+5
            TAD    I   SCR+1
            AND    I   CONS19+4
            RTR
            DCA    I   SCR+1
            JMP    I   WAIT1
BATCH,      TAD        SCR+3
            SZA CLA
            JMP        MOVE
            TAD        MODE
            TAD        CONS19+6
            SMA CLA
            JMP        ENDRUN
```

```
            ISZ     MODE
            TAD  I  READ
            SNA
            JMP     BATCH+3
            CIA
            DCA     SETS
            TAD  I  CONS19+4
            IAC
            DCA     SCR+3
            JMP     MOVE
CONS19,     4601
            0174
            4640
            4635
            4636
            0177
            7766
MASK11,     4613
            4602
            4600
            4621
            4617
WAIT1,      WAIT-3
BATCH1,     TAD  I  MASK11+4
            AND     FLAG
            SNA CLA
            JMP     BATCH
            TAD     SETS
            SNA CLA
            JMP     BATCH+3
            JMP     MOVE
ENDRUN,     TAD  I  MASK11+4
            AND     FLAG
            SNA
            JMP     MOVE
            CMA
            AND     FLAG
            DCA     FLAG
            JMP     MOVE
MCHK,       TAD     MOD
            DCA     PMOD
            TAD     MADD
            DCA     PMADD
            TAD  I  MASK11+4
            AND     FLAG
            SNA
            JMP     .+5
            CMA
            AND     FLAG
            DCA     FLAG
            JMP  I  MEM1
            TAD     FLAG
            TAD  I  MASK11+2
            JMP  I  NOMEM1
MEM1,       MEM
NOMEM1,     NOMEM
COUNT,      TAD     TIMER
            CMA
            DCA     TIMER
            ION
            ISZ     TIMER
            JMP     .-1
            IOF
            JMP  I  GO1
GO1,        SVC
            JMP  I  E0
            JMP  I  E1
            JMP  I  E2
            JMP  I  E3
```

```
                JMP   I   E4
                JMP   I   E5
                JMP   I   E6
                JMP   I   E7
                JMP   I   E8
                JMP   I   E9
                JMP   I   E10
                JMP   I   E11
                JMP   I   E12
                JMP   I   E13
                JMP   I   E14
                JMP   I   E15
                JMP   I   E16
                JMP   I   E17
                JMP   I   E18
                JMP   I   E19
E0,             EV0
E1,             EV1
E2,             EV2
E3,             EV3
E4,             EV4
E5,             EV5
E6,             EV6
E7,             EV7
E8,             EV8
E9,             EV9
E10,            EV10
E11,            EV11
E12,            EV12
E13,            EV13
E14,            EV14
E15,            EV15
E16,            EV16
E17,            EV17
E18,            EV18
E19,            EV19
EV0,            JMP   I   EVE0
EVE0,           END
EV1,            TAD   I   MASK12
                AND       FLAG
                SNA CLA
                JMP   I   EVE0
                JMS   I   EVE1
                0614
                0123
                1040
                6145
                4300
                JMP   I   EVE0
MASK12,         4600
                4601
CONS20,         4604
                4676
EVE1,           0200
EV2,            TAD   I   MASK12
                AND       FLAG
                SNA CLA
                JMP   I   EVE0
                JMS   I   EVE1
                0614
                0123
                1040
                6245
                4300
                JMP   I   EVE0
EV3,            ISZ       CCTR
```

```
              TAD    I  MASK12+1   /END FRAME PRESENT
              AND       FLAG
              SZA
              JMP       EVE3       /YES!  CHECK COPIES
              JMS    I  EVE1       /NO!   ADVANCE FILM
              0611
              1415
              4001
              0426
              0116
              0305
              4000
              JMP    I  FORCHK
    FORCHK,   FORREV
    EVE3,     CMA
              AND       FLAG       /CLEAR END FRAME FLAG
              TAD    I  CONS20
              DCA       FLAG       /SET INHIBIT FLAG
              TAD       SETS
              IAC
              CIA
              JMP    I  SHOW
    SHOW,     BCD
    CHGDR,    CHGDIR
    CCRET,    ISZ       SETS       /BATCH COMPLETE
              JMP    I  CHGDR      /NO!   CHANGE FILM DIRECTION
              TAD    I  MASK12     /YES!  KILL RUN FLAG
              CMA
              AND       FLAG
              DCA       FLAG
              JMS    I  EVE1       /SLEW FILM
              2314
              0527
              4006
              1114
              1545
              4300
              JMP    I  FORDR
    FORDR,    FORDIR
    EV4,      JMS    I  EVE1
              2320
              1411
              0305
              4004
              0524
              0503
              2445
              4300
              JMP    I  EVE0
    EV5,      JMS    I  EVE1
              2001
              2005
              2240
              2205
              1405
              0123
              0545
              4300
              JMP    I  COROF
    COROF,    COROFF
    ICCHK,    TAD       IVADD
              CIA
              DCA       EVENT
              TAD    I  MASK13+1
              DCA       EVENT+1
    ZEBRA,    TAD    I  EVENT+1
              SZA
              JMP       EVEN6
              ISZ       EVENT+1
              ISZ       EVENT
```

```
            JMP      ZEBRA
            TAD      IVADD
            TAD   I  MASK13+1
            DCA      EVENT
            TAD   I  EVENT
            AND      IVMSK
 EVEN6,     SNA CLA
            JMP   I  OFF1        /YES!  SHUT-DOWN
            JMP   I  EVE6        /NO!   RETURN
 EV6,       TAD   I  MASK13      /RUN FLAG CHECK
            AND      FLAG
            SZA
            JMP      EVE5        /RUN FLAG UP!  CUT PAPER
            TAD      PCADD       /NO RUN FLAG!  CLEAR CHECKS
            CIA
            DCA      EVENT
            TAD   I  MASK13+1
            DCA      EVENT+1
            TAD   I  EVENT+1
            SZA
            JMP      EVE5        /NO!  CUT PAPER
            ISZ      EVENT+1
            ISZ      EVENT
            JMP      .-5
            TAD      PCADD
            TAD   I  MASK13+1
            DCA      EVENT
            TAD   I  EVENT
            AND      PCMSK
            SNA CLA
            JMP   I  EVEN5
 EVE5,      JMS   I  EVE7
            2001
            2005
            2240
            0325
            2445
            4300
            JMP   I  EVE6
 EVE6,      END
 EVEN5,     EV5
 MASK13,    4600
            4676
 OFF1,      OFFCHK
 EV7,       JMS   I  EVE7
            0102
            1722
            2440
            1716
            4543
            0000
            JMP   I  EVE6
 EVE7,      0200
 EV8,       JMS   I  EVE7
            0102
            1722
            2440
            1706
            0645
            4300
            JMP   I  EVE6
 EV9,       JMS   I  EVE7
            1116
            2605
            2224
            4543
            0000
            JMP   I  EVE6
```

```
EV10,   JMS  I  EVE7
        1201
        1540
        6140
        2422
        2505
        4543
        0000
        JMP  I  EVE6
EV11,   JMS  I  EVE7
        1201
        1540
        6140
        0601
        1423
        0545
        4300
        JMP  I  EVE6
EV12,   JMS  I  EVE7
        1201
        1540
        6240
        2422
        2505
        4543
        0000
        JMP  I  EVE6
EV13,   JMS  I  EVE7
        1201
        1540
        6240
        0601
        1423
        0545
        4300
        JMP  I  EVE6
EV14,   JMS  I  EVE7
        1201
        1540
        6340
        2422
        2505
        4543
        0000
        JMP  I  EVE6
EV15,   JMS  I  B
        1201
        1540
        6340
        0601
        1423
        0545
        4300
        JMP  I  A
EVE16,  JMS  I  B
        2422
        0622
        4061
        4017
        1645
        4300
        JMP  I  A
EVE17,  JMS  I  B
        2422
        0622
        4062
        4017
        1645
        4300
        JMP  I  A
```

```
EV18,   TAD     CCTR
        TAD I   MASK14+3
        DCA     CCTR
        CLL
        JMP I   A
EV19,   TAD I   MASK14          /CHECK INHIBIT FLAG
        AND     FLAG
        SZA
        JMP     INH
        TAD     FLAG
        AND I   MASK14+1        /CHECK EXTRA SHIFT FLAG
        SNA CLA
        JMP     YOU
        TAD     MOD
        CLL RAL
        RTL
        DCA     MOD
        TAD     MADD
        TAD I   MASK14+3
        DCA     MADD
        JMP     .+4
YOU,    TAD     MOD
        CLL RTL
        DCA     MOD
        TAD I   MASK14+2        /RUN FLAG SET
        AND     FLAG
        SZA
        JMP     F
        JMP I   MAYBE1
MAYBE1, MAYBE
SZS,    ISZ     SCR+3
        JMP     F
        JMP I   ODDSET
ODDSET, ODCHK2+1
        0000
        TAD I   MASK14+2
        TAD     FLAG
        DCA     FLAG
F,      JMS I   B
        0516
        0440
        2011
        2403
        1045
        4343
        0000
        JMP I   PAPER1
PAPER1, PAPER
INH,    CMA                     /CLEAR INHIBIT FLAG
        AND     FLAG
        DCA     FLAG
        JMP I   XYZ1            /GO CHECK RUN & STOP FLAGS
XYZ1,   XYZ
ODDCHK, TAD I   ODD             /CHECK FOR ODD COPIES
        AND I   MASK14+1
        SZA CLA
        JMP     C
        TAD I   MADD            /EVEN!  ENTER INVERT CODE
        TAD     MOD
        DCA I   MADD
C,      TAD I   MASK14+1
        AND     FLAG
        SNA CLA
        JMP     YOU1
        TAD     MOD
        CLL RAL
        RTL
```

```
            DCA     MOD
            TAD     MADD
            TAD  I  MASK14+3
            DCA     MADD
            JMP     .+4
YOU1,       TAD     MOD
            CLL RTL
            DCA     MOD
            TAD     MOD        /CLEAR SHIFT REGISTER
            CIA
            CMA
            AND  I  MADD
            DCA  I  MADD
            JMP     F
D,          TAD  I  MADD
            TAD     MOD
            DCA  I  MADD
            JMP     EV19+4
MASK14,     4604
            4613
            4600
            4635
A,          END
B,          0200
OFF,        JMS  I  B
            1501
            0310
            1115
            0540
            2310
            2524
            5517
            0606
            5640
            4024
            1740
            2205
            2324
            0122
            2454
            4020
            2205
            2323
            4042
            0317
            1624
            4245
            4300
GOODIE,     TAD  I  KOOK
            DCA     READ-1
            TAD  I  KOOK+1
            DCA     READ-2
            DCA  I  READ-1
            ISZ     READ-2
            JMP     .-2
            HLT
            JMP  I  BEGGAR
KOOK,       4610
            4633
BEGGAR,     BEGIN
TYPE,       0200
X,          CHAR
DIGT,       JMS  I  TYPE
            0201
            2403
            1040
            1622
DIGIT,      4061
            4003
            1720
```

```
                1105
                2375
                4040
                0000
                JMP     LFC+4
DIGLT,  JMS  I  TYPE
                0201
                2403
                1040
                1622
                4061
                6040
                0317
                2011
                0523
                7540
                4000
                JMP     LFC+4
LENT,   JMS  I  TYPE
                1405
                1607
                2410
                7540
                4000
                JMP     LFC+4
BBF,    JMS  I  TYPE
                0201
                2403
                1040
                0225
                0606
                0522
                4006
                2514
                1456
                4543
                0000
                JMP  I  X
LFC,    JMS  I  TYPE
                4543
                0000
                JMP  I  SIMSK
                CLA CLL
                JMP  I  TIMER
SIMP1,  JMS  I  TYPE
                4543
                1501
                1116
                4004
                2211
                2605
                2340
                1716
                4543
                0000
                ISZ     SCR+3
                NOP
                ISZ     SCR+3
                JMP     .-2
                NOP
                ISZ     SCR+3
                JMP     .-2
                JMS  I  TYPE
                0310
                0122
                0705
                4003
                1722
                1724
                2217
```

```
                1640
                6140
                1716
                4543
                0000
                NOP
                ISZ     SCR+3
                JMP     .-2
                NOP
                ISZ     SCR+3
                JMP     .-2
                JMS  I  TYPE
                0405
                2605
                1417
                2005
                2240
                0422
                1126
                0540
                6140
                1716
                4543
                4300
                TAD  I  SMASK
                AND     FLAG
                SNA CLA
                JMP  I  FLA1
                JMP  I  FINISH
SMASK,          4617
FLA1,           FL1
FINISH,         FIN
SIMP2,          JMS  I  TYPE1
                4543
                1501
                1116
                4004
                2211
                2605
                2340
                1716
                4543
                0000
                DCA     SCR+3
                NOP
                ISZ     SCR+3
                JMP     .-2
                NOP
                ISZ     SCR+3
                JMP     .-2
                JMS  I  TYPE1
                0310
                0122
                0705
                4003
                1722
                1724
                2217
                1640
                6240
                1716
                4543
                0000
                NOP
                ISZ     SCR+3
                JMP     .-2
                NOP
                ISZ     SCR+3
                JMP     .-2
```

```
            JMS   I   TYPE1
            0405
            2605
            1417
            2005
            2240
            0422
            1126
            0540
            6240
            1716
            4543
            4300
            TAD   I   SMASK
            AND       FLAG
            SNA CLA
            JMP   I   FLA2
            JMP   I   FINISH
FLA2,       FL2
TYPE1,      0200
DUPL,       JMS   I   TYPE1
            4543
            1501
            1116
            4004
            2211
            2605
            2340
            1716
            4543
            0000
            DCA       SCR+3
            NOP
            ISZ       SCR+3
            JMP       .-2
            NOP
            ISZ       SCR+3
            JMP       .-2
            JMS   I   TYPE1
            0310
            0122
            0705
            4003
            1722
            1724
            2217
            1623
            4040
            1716
            4543
            0000
            NOP
            ISZ       SCR+3
            JMP       .-2
            NOP
            ISZ       SCR+3
            JMP       .-2
            JMS   I   TYPE1
            0405
            2605
            1417
            2005
            2240
            0422
            1126
            0523
```

```
                4040
                1716
                4543
                4300
                TAD  I   SMASK
                AND      FLAG
                SNA CLA
                JMP  I   DPX
                JMP  I   FINISH
DPX,            FL2-4
OFFCHK,         TAD  I   SMASK
                AND      FLAG
                SNA CLA
                JMP  I   STOP1
                JMP  I   STPMD1
STOP1,          OFF
STPMD1,         STPMID
*5200
TYPE7,          0200
PANIC,          JMS  I   TYPE7
                3117
                2540
                1001
                2605
                4012
                2523
                2440
                1011
                2440
                2410
                0540
                2001
                1611
                0340
                0225
                2424
                1716
                4140
                4015
                0103
                1011
                1605
                4023
                1025
                2455
                0417
                2716
                5640
                4024
                1740
                2205
                5545
                4323
                2401
                2224
                4020
                2205
                2323
                4042
                0317
                1624
                4245
                4343
                0000
                JMP  I   GOOD1
GOOD1,          GOODIE
NCOP,           JMS  I   TYPE7
                1501
                0310
                1116
```

```
            0540
            2310
            2524
            5504
            1727
            1656
            4040
            2014
            0501
            2305
            4005
            1624
            0522
            4023
            1715
            0540
            0317
            2011
            0523
            4016
            0530
            2440
            2411
            1505
            4140
            4020
            2205
            2323
            4042
            0317
            1624
            4245
            4343
            0000
            JMP    I   GOOD1
PON,        JMS    I   TYPE7
            2001
            2005
            2240
            2001
            2410
            4017
            1645
            4300
            JMP    I   END10
END10,      END
RFLAG,      4600
            4610
JAM,        TAD    I   RFLAG
            CMA
            AND        FLAG
            TAD    I   RFLAG+1
            DCA        FLAG
            JMS    I   TYPE7
            1501
            0310
            1116
            0540
            2324
            1720
            4004
            2505
            4024
            1740
            1201
            1541
            4040
            2022
            0523
            2340
```

```
            4203
            1716
            2442
            4024
            1740
            2205
            2324
            0122
            2456
            4543
            4300
            TAD     PMOD
            DCA     MOD
            TAD     PMADD
            DCA     MADD
            HLT
            TAD     CCTR
            CMA
            DCA     CCTR
            TAD     FLAG
            AND  I  AFLAG
            SNA
            JMP     .+4
QUE,        CMA
            AND     FLAG
            JMP     .+3
            TAD  I  AFLAG
            TAD     FLAG
            DCA     FLAG
            TAD     FLAG
            AND  I  AFLAG+1
            SNA CLA
            JMP     SRTUP
BACKUP,     ISZ     CCTR
            JMP     ECHK
            TAD  I  AFLAG+1
            TAD  I  AFLAG+2
            CMA
            AND     FLAG
            TAD  I  AFLAG+2
            DCA     FLAG
            JMP     QUE-4
ECHK,       KSF
            JMP  I  MOVEFL
            KRB
            CLA CLL
            TAD     READ
            DCA     SCR
            TAD  I  SCR
            TAD     SETS
            SNA CLA
            JMP     .+5
DECR,       TAD     SETS
            TAD  I  AFLAG+3
            DCA     SETS
            JMP     QUE-4
            DCA     SETS
            TAD     READ
            TAD  I  AFLAG+3
            DCA     READ
            TAD     READ
            DCA     SCR
            TAD  I  SCR
            SNA CLA
            JMP     .-7
            TAD     READ
            AND  I  AFLAG+4
            DCA     MODE
            TAD     READ
            TAD  I  AFLAG+3
```

```
        DCA     ODD
        TAD  I  SCR
        AND  I  AFLAG+5
        SNA CLA
        JMP     UNITE
        TAD  I  AFLAG
        CMA
        AND     FLAG
        DCA     FLAG
        JMS  I  MOVEFL+1
        2314
        0527
        4006
        1114
        1540
        2417
        4014
        0123
        2440
        0622
        0115
        0545
        4300
        JMP     DECR
UNITE,  TAD     FLAG
        AND  I  AFLAG
        SNA CLA
        TAD  I  AFLAG
        TAD     FLAG
        DCA     FLAG
        JMS  I  MOVEFL+1
        2314
        0527
        4006
        1114
        1540
        2417
        4006
        1122
        2324
        4006
        2201
        1505
        4543
        0000
        JMP     DECR
AFLAG,  4611
        4610
        4607
        4635
        4632
        4613
        4636
        4641
MOVEFL, EV3+5
        0200
NEXTNR, NEXT
SAVE,   TAD     NEXTNR
        DCA     SIMSK
        JMP  I  LFC2
LFC2,   LFC
SRTUP,  TAD  I  AFLAG+6
        DCA     READ-2
        TAD  I  AFLAG+7
        DCA     INADD
        DCA  I  INADD
        ISZ     READ-2
        JMP     .-2
        TAD  I  TFLAG+1
        CMA
```

```
            AND     FLAG
            DCA     FLAG
            JMP  I  TFLAG
TFLAG,      MIDDLE
            4612
            4617
            4600
            0200
COROFF,     TAD  I  TFLAG+1
            CMA
            AND     FLAG
            DCA     FLAG
            JMP  I  ICCHK1
ICCHK1,     ICCHK
PAPER,      TAD     HOLD
            SNA CLA
            JMP  I  HOLDOF
            ISZ     HOLD
            JMP  I  HOLDOF
            TAD     FLAG
            TAD  I  TFLAG+1
            DCA     FLAG
            JMP  I  PON1
PON1,       PON
HOLDOF,     END
MAYBE,      TAD  I  TFLAG+2
            AND     FLAG
            SZA CLA
            JMP  I  YOU2
            TAD     SCR+3
            SNA CLA
            JMP  I  SZS2
            JMP  I  SZS1
YOU2,       YOU1+3
SZS2,       SZS+2
SZS1,       SZS
XYZ,        TAD  I  TFLAG+3
            AND     FLAG
            SZA CLA
            JMP  I  D1
            TAD  I  TFLAG+2
            AND     FLAG
            SNA CLA
            JMP  I  ODCHK1
            TAD     SETS
            SNA CLA
            JMP  I  ODCHK1
            JMP  I  D1
ODCHK1,     ODDCHK
D1,         LOADER+1
EV16,       TAD     FLAG
            AND  I  TFLAG+1
            SZA CLA
            JMP  I  EVEN16
            JMS  I  TFLAG+4
            2422
            0622
            4061
            4017
            0606
            4543
            0000
            JMP  I  TRNOT
TRNOT,      END
EVEN16,     EVE16
EVEN17,     EVE17
EV17,       TAD     FLAG
            AND  I  TFLAG+1
            SZA CLA
            JMP  I  EVEN17
```

```
            JMS    I  TFLAG+4
            2422
            0622
            4062
            4017
            0606
            4543
            0000
            JMP    I  TRNOT
CHGDIR,     TAD       FLAG
            AND    I  FORDIR+2
            SNA
            JMP       .+5
            CMA
            AND       FLAG
            DCA       FLAG
            JMP       GETON
            TAD       FLAG
            TAD    I  FORDIR+2
            JMP       .-4
FORDIR,     TAD    I  FORDIR+2
            JMP       CHGDIR+4
            4611
GETON,      TAD    I  TFLAG+2
            AND       FLAG
            SNA CLA
            JMP    I  TRNOT
            TAD    I  TFLAG+3
            CMA
            AND       FLAG
            DCA       FLAG
            JMP    I  TRNOT
FORREV,     TAD       FLAG
            AND    I  FORDIR+2
            SZA
            JMP       REV
            JMS    I  TFLAG+4
            4006
            1722
            2701
            2204
            4543
            0000
            JMP    I  JUMPY1
JUMPY1,     JUMPY
REV,        JMS    I  TFLAG+4
            4022
            0526
            0522
            2305
            4543
            0000
JUMPY,      TAD       FLAG
            AND    I  JFLAG
            SZA CLA
            JMP    I  UPBACK
            TAD    I  JFLAG+1
            AND       FLAG
            SNA CLA
            JMP    I  DNE
            TAD    I  JFLAG+2
            CMA
            AND       FLAG
            DCA       FLAG
            JMP    I  DNE
UPBACK,     BACKUP
JFLAG,      4610
            4607
            4600
DNE,        END
```

```
STPMID, JMS  I   DDIM+1
        1511
        0404
        1405
        5517
        0655
        2225
        1640
        2310
        2524
        5504
        1727
        1656
        4040
        2022
        0523
        2340
        4203
        1716
        2442
        4024
        1740
        2205
        5523
        2401
        2224
        4045
        4300
        HLT
        JMP  I   DDIM
DDIM,   MIDDLE
        0200
        TAD      READ
        TAD  I   ICONS
        DCA      ODD
        JMP  I   LOADER
ICONS,  4635
LOADER, LOAD
        TAD      SCR+3
        SNA CLA
        JMP  I   D2
        JMP  I   ODCHK2
D2,     D
ODCHK2, ODDCHK
        TAD      READ
        TAD  I   ICONS
        DCA      ODD
        TAD      SETS
        SNA CLA
        JMP  I   NO
        JMP  I   YES
NO,     F
YES,    F-3

*4600                        /TABLE OF MASKS AND CONSTANTS
        4000
        2000
        1000
        0400
        0200
        0100
        0040
        0020
        0010
        0004
        0002
        0001
        6000
```

```
1400
0300
0060
0014
0003
7000
0700
0070
0007
7400
1700
0360
0074
0017
7700
0077
7777
7774
7766
0377
0173
7407
4060
7406
7456
7464
7475
7520
7563
0212
7401
7770
7756
7776
4533
7525
6340
0017
0416
0020
5000
5001
5623
4777
7750
0006
0005
2200
7600
0174
7500
0350
5100
5600
3403
7473
7455
7460
7720
0140
4060
6030
6340
7160
7470
7634
7660
7730
7754
7766
6173
```

```
*5000                   /INPUT TABLE
        0101
        0460
        2001
        3724
        0400
        0310
        0501
        3414
        0?02
        6457
        0703
        5021
        1003
        5026
        1104
        1253
        1202
        7277
        1302
        6767
        1403
        5477
        1503
        5167
        1604
        1253
        1704
        0743
        2204
        2713
        2101
        3560

*5100                   /VALIDITY TABLE
        0000
        0004
        0004
        0004
        0017
        0000
        0015
        0003
        0014
        0010
        0017
        0017
        0017
        0017
        0014
        0003
        0017
        0017
        0014
        0017

*0001                   /INTERRUPT SERVICE
        JMP  I  HIT
HIT,    INT

*0011                   /AUTO INDEXES
READ,   0000
WRITE,  0000
INADD,  0000
LDADD,  0000
PRADD,  0000
ODD,    0000
```

```
*0100                   /SCRATCH PAD
    SETS,    0000
    LENGTH,  0000
    FLAG,    0000
    ACC,     0000
    LCTR,    0000
    PCTR,    0000
    EVENT,   0000
             0000
    NORM,    0000
    MOD,     0000
    SIADD,   0000
    SIMSK,   0000
             0000
    MODE,    0000
    MADD,    0000
    SCR,     0000
             0000
             0000
             0000
    PCADD,   0000
    PCMSK,   0000
    IVADD,   0000
    IVMSK,   0000
    BEXIT,   0000
    SUB,     0000
    HOLD,    0000
    TIMER,   0000
    PMOD,    0000
    PMADD,   0000
    CCTR,    0000
    WORD1,   0000
    WORD2,   0000

*0260
    TEMP,    0000
             TAD     ASCII
             TLS
             TSF
             JMP     .-1
             CLA CLL
             JMP   I TEMP
    ASCII,   0260
```

EXAMPLE OF A RUN ON THE COMPUTER

The following is the printout on the Teletype of a typical run of the program on the PDP-8/S.

The first thing the computer does is to force a length request. In this case the operator enters 17 inches. Next the computer requests the number of copies required in batch number 1. The operator in this instance enters 2. The computer then goes on to request the number of copies needed in batch number 2. The operator requests 1 copy. The computer then requests the number of copies in batch number 3. At this point the operator requests a return to the length input mode which the computer does. It types out "Length" and the previously entered length of 17 inches and then waits to allow the operator to change the length if he wants to. In this example the operator changes the length to 13.5 inches. The computer immediately returns to inputing the number of copies in batch number 3 where it was before the change length request came. At this point the operator requests to return to the number of copies in batch number 2 mode, so that he can change that number. A computer does this, showing that the operator had requested one copy previously. The operator changes this value to 2 and the computer again returns to the point that it was before the change request, namely inputing the number of copies in batch number 3. At this point the operator makes a run request and the computer does the necessary calculations as indicated by the flow charts and starts cycling up the machine.

The computer is now in the run mode and the timed operations are typed out in sequence. The jam true and false operation involves testing the condition of various paper detectors to determine if paper is present or absent at the proper times. The "End Pitch" output separates the block of operations which go on in each pitch length of belt travel. In the exposure sequence, the frame pairs are exposed and the film advances forward to the next pair of frames. This repeats until the micro input sees an end frame (in this simulation the end frame indication is entered from the keyboard) at which point the film advance is inhibited because these pair of frames are the last pages of this set and the first pages of the next set and must be exposed twice in succession. In our example the operator arbitrarily produces an end frame via the keyboard after the second pair of frames is in position. Thus or set in batch number one has 4 pages in it, and it will be noted that after the second pair of exposures the film does not advance forward again. The first set in this batch has been made at this point, so that the display is changed from two to one as shown immediately following the two flashes. It should be noted that the paper path and the transfer corotrons have not been turned on until this point. This is because the paper path is turned on as late as possible to minimize waste of paper.

The first set of this batch is now completely exposed and the second and last set is started. Two more pairs of images are exposed to complete the batch, and the film is slewed forward to the next batch.

When the next set is in position on the micro input, it's exposure begins. Again the operator of the simulation has arbitrarily made this set contain four pages. It is exposed like the first batch, and the machine starts to process out the copies.

In the middle of this processing, the operator has simulated a jam condition via the keyboard which shuts down the machine immediately. The operator then restarts the machine and the controller repositions the film to recover those images which were lost in the jam. The controller restarts the machine, reprocesses the lost images, and cycles out normally.

```
LENGTH=   1700
BATCH NR 1 COPIES=   2
BATCH NR 2 COPIES=   1
BATCH NR 3 COPIES=
LENGTH=   1700/1350
BATCH NR 3 COPIES=   C2
BATCH NR 2 COPIES=   0001/2
BATCH NR 3 COPIES=
MAIN DRIVES ON
CHARGE COROTRONS   ON
DEVELOPER DRIVES   ON

ABORT ON
JAM 2 FALSE
SPLICE DETECT
JAM 2 TRUE
TRFR 2 OFF
JAM 3 FALSE
TRFR 1 OFF
PAPER CUT
JAM 1 FALSE
JAM 1 TRUE
END PITCH

ABORT ON
JAM 2 FALSE
SPLICE DETECT
JAM 2 TRUE
FLASH 1
FLASH 2
FILM ADVANCE   FORWARD
TRFR 2 OFF
JAM 3 FALSE
TRFR 1 OFF
PAPER CUT
JAM 1 FALSE
JAM 1 TRUE
END PITCH

PAPER PATH ON
ABORT ON
JAM 2 FALSE
SPLICE DETECT
JAM 2 TRUE
FLASH 1
FLASH 2
0001/TRFR 2 ON
JAM 3 FALSE
TRFR 1 ON
PAPER CUT
JAM 1 FALSE
JAM 1 TRUE
END PITCH
ABORT ON
JAM 2 FALSE
SPLICE DETECT
JAM 2 TRUE
FLASH 1
FLASH 2
FILM ADVANCE   REVERSE
TRFR 2 ON
JAM 3 FALSE
TRFR 1 ON
PAPER CUT
JAM 1 FALSE
JAM 1 TRUE
END PITCH

ABORT ON
JAM 2 FALSE
SPLICE DETECT
JAM 2 TRUE
FLASH 1
FLASH 2
0000/SLEW FILM
TRFR 2 ON
JAM 3 FALSE
TRFR 1 ON
PAPER CUT
JAM 1 FALSE
JAM 1 TRUE
END PITCH

ABORT ON
JAM 2 FALSE
SPLICE DETECT
JAM 2 TRUE
TRFR 2 ON
JAM 3 FALSE
TRFR 1 ON
PAPER CUT
JAM 1 FALSE
JAM 1 TRUE
END PITCH

ABORT ON
JAM 2 FALSE
SPLICE DETECT
JAM 2 TRUE
TRFR 2 ON
JAM 3 FALSE
TRFR 1 ON
PAPER CUT
JAM 1 FALSE
JAM 1 TRUE
END PITCH

ABORT ON
JAM 2 FALSE
SPLICE DETECT
JAM 2 TRUE
TRFR 2 ON
JAM 3 FALSE
```

```
TRFR 1 ON
PAPER CUT
JAM 1 FALSE
JAM 1 TRUE
END PITCH

ABORT ON
JAM 2 FALSE
SPLICE DETECT
JAM 2 TRUE
TRFR 2 ON
JAM 3 FALSE
TRFR 1 ON
PAPER CUT
JAM 1 FALSE
JAM 1 TRUE
END PITCH

ABORT OFF
JAM 2 FALSE
SPLICE DETECT
JAM 2 TRUE
FLASH 1
FLASH 2
FILM ADVANCE  FORWARD
TRFR 2 ON
JAM 3 FALSE
TRFR 1 ON
PAPER CUT
JAM 1 FALSE
JAM 1 TRUE
END PITCH

ABORT OFF
JAM 2 FALSE
SPLICE DETECT
JAM 2 TRUE
FLASH 1
FLASH 2
0001/TRFR 2 ON
TRFR 1 ON
PAPER CUT
JAM 3 TRUE
JAM 1 FALSE
JAM 1 TRUE
END PITCH

ABORT OFF
   JAM 2 FALSE
   SPLICE DETECT
   JAM 2 TRUE
   FLASH 1
   FLASH 2
   FILM ADVANCE  REVERSE
   TRFR 2 ON
   TRFR 1 ON
   PAPER CUT
   INVERT
   JAM 3 TRUE
   JAM 1 FALSE
   JAM 1 TRUE
   END PITCH

ABORT OFF
   JAM 2 FALSE
   SPLICE DETECT
   JAM 2 TRUE
   FLASH 1
   FLASH 2
   0000/SLEW FILM
   TRFR 2 ON
```

```
TRFR 1 ON

PAPER CUT

JAM 3 TRUE

JAM 1 FALSE

JAM 1 TRUE

END PITCH

ABORT ON
JAM 2 FALSE
SPLICE DETECT
JAM 2 TRUE
TRFR 2 ON
TRFR 1 ON
PAPER CUT
INVERT
JAM 3 TRUE
JAM 1 FALSE
JAM 1 TRUE
END PITCH

ABORT ON
JAM 2 FALSE
SPLICE DETECT
JAM 2 TRUE
TRFR 2 ON
JAM 3 FALSE
TRFR 1 ON
PAPER CUT
JAM 1 FALSE
JAM 1 TRUE
END PITCH

ABORT ON
JAM 2 FALSE
SPLICE DETECT
JAM 2 TRUE
TRFR 2 ON
JAM 3 FALSE
TRFR 1 ON
PAPER CUT
JAM 1 FALSE
MACHINE STOP DUE TO JAM!
   PRESS "CONT" TO RESTART.

SLEW FILM TO FIRST FRAME
FILM ADVANCE  FORWARD
FILM ADVANCE  REVERSE

MAIN DRIVES ON
CHARGE COROTRONS  ON
DEVELOPER DRIVES  ON

ABORT ON
JAM 2 FALSE
SPLICE DETECT
JAM 2 TRUE
TRFR 2 OFF
JAM 3 FALSE
TRFR 1 OFF
PAPER CUT
JAM 1 FALSE
JAM 1 TRUE
END PITCH

ABORT ON
JAM 2 FALSE
```

```
           107                                        108
SPLICE DETECT                         JAM 1 TRUE
JAM 2 TRUE                            END PITCH
FLASH 1
FLASH 2                               ABORT ON
FILM ADVANCE  FORWARD        5        JAM 2 FALSE
TRFR 2 OFF                            SPLICE DETECT
JAM 3 FALSE                           JAM 2 TRUE
   TRFR 1 OFF                         TRFR 2 ON
                                      JAM 3 FALSE
   PAPER CUT                10        TRFR 1 ON
                                      PAPER CUT
   JAM 1 FALSE
                                         JAM 1 FALSE
   JAM 1 TRUE

END PITCH                   15

JAM 1 TRUE
ABORT ON
JAM 2 FALSE                           END PITCH
SPLICE DETECT
JAM 2 TRUE                  20        ABORT ON
FLASH 1                               JAM 2 FALSE
FLASH 2                               SPLICE DETECT
0001/TRFR 2 OFF                       JAM 2 TRUE
JAM 3 FALSE                           TRFR 2 ON
TRFR 1 OFF                  25        JAM 3 FALSE
PAPER CUT                             TRFR 1 ON
JAM 1 FALSE                           PAPER CUT
JAM 1 TRUE                            JAM 1 FALSE
END PITCH                             JAM 1 TRUE
                            30        END PITCH
PAPER PATH ON
ABORT ON                              ABORT ON
JAM 2 FALSE                           JAM 2 FALSE
SPLICE DETECT                         SPLICE DETECT
JAM 2 TRUE                  35        JAM 2 TRUE
FLASH 1                               TRFR 2 ON
FLASH 2                               JAM 3 FALSE
FILM ADVANCE  REVERSE                 TRFR 1 ON
TRFR 2 ON                             PAPER CUT
JAM 3 FALSE                 40        JAM 1 FALSE
TRFR 1 ON                             JAM 1 TRUE
PAPER CUT                             END PITCH
JAM 1 FALSE
JAM 1 TRUE                            ABORT OFF
END PITCH                   45        JAM 2 FALSE
                                      SPLICE DETECT
ABORT ON                              JAM 2 TRUE
JAM 2 FALSE                           TRFR 2 ON
SPLICE DETECT                         JAM 3 FALSE
JAM 2 TRUE                  50        TRFR 1 ON
FLASH 1                               PAPER CUT
FLASH 2                               JAM 1 FALSE
0000/SLEW FILM                        JAM 1 TRUE
TRFR 2 ON                             END PITCH
JAM 3 FALSE
TRFR 1 ON                   55        ABORT OFF
PAPER CUT                             JAM 2 FALSE
JAM 1 FALSE                           SPLICE DETECT
JAM 1 TRUE                            JAM 2 TRUE
END PITCH                             TRFR 2 ON
                            60        TRFR 1 ON
ABORT ON                              PAPER CUT
JAM 2 FALSE                           JAM 3 TRUE
SPLICE DETECT                         JAM 1 FALSE
JAM 2 TRUE                            JAM 1 TRUE
TRFR 2 ON                   65        END PITCH
JAM 3 FALSE
TRFR 1 ON                             ABORT OFF
PAPER CUT                             JAM 2 FALSE
JAM 1 FALSE
```

```
SPLICE DETECT
JAM 2 TRUE
TRFR 2 ON
TRFR 1 ON
PAPER RELEASE
INVERT
JAM 3 TRUE
JAM 1 FALSE
JAM 1 TRUE
END PITCH

ABORT OFF
JAM 2 FALSE
SPLICE DETECT
JAM 2 TRUE
TRFR 2 OFF
TRFR 1 OFF
PAPER RELEASE
JAM 3 TRUE
JAM 1 FALSE
JAM 1 TRUE
END PITCH

ABORT ON
JAM 2 FALSE
SPLICE DETECT
JAM 2 TRUE
TRFR 2 OFF
TRFR 1 OFF
PAPER RELEASE
INVERT
JAM 3 TRUE
JAM 1 FALSE
JAM 1 TRUE
END PITCH

ABORT ON
JAM 2 FALSE
SPLICE DETECT
JAM 2 TRUE
TRFR 2 OFF
JAM 3 FALSE
TRFR 1 OFF
PAPER RELEASE
MACHINE SHUT-OFF.
    TO RESTART, PRESS "CONT"
```

SYSTEMS Operations

The sequence of systems will now be described with reference to the accompanying flow charts shown in FIGS. 16 – 24. The sequence assumes a roll fusing approach, but other suitable fusing means and operations can be used. If fluash fusing is used all steps involving fuser warm up and fuser roll engagement disengagement operation would be eliminated as indicated.

In operating the system, the first aforementioned software program including various features are stored into the comuter in a conventional manner. To make individual copy runs, a particular film cassette having desired document originals are locked in place. These being done then the following sequence of operations follow in making the copy run.

GENERAL SEQUENCE (FIG. 16)

The flow chart shows the general overall sequencing of the machine. The charts following this one, break down the individual boxes in this chart into more detailed descriptions of the specific sequences. The general sequencing of the machine is always entered through the "Power On" which is initiated by pressing the ON button 520. From there the "initialization and Warmup" sequence follows. After the machine is properly warmed up and it has been determined that the machine is ready for operation, the "Data Acquisition" mode is entered. In this mode the operation enters through the control console 500 all the information needed for a copy run, namely, the pitch length, mode indication (simplex or duplex), document numbers and number of copies for each of the documents called for copies. After the entry of the required information about the run and loading of the film cassette, the operator pushes the print button and the machine enters the "Checkout/Start" mode using the aforedescribed SWITCH SCAN routine to check if the copy run information entry is complete and correct. From there the "Calculation" mode is entered to calculate the timing list of the machine process events. After this sequence is finished the "Start Up Sequence" is entered. Previous to this point the machine had been in the STANDBY routine but at this point the machine begins to cycle up. After the "Checkout/Start" sequence has been completed, the SYSTEM enters EXCUTIVE routine and performs a "Run Mode". At this point the machine processes copies.

During the "Run Mode" if an emergency or malfunction situation is detected in the machine, an exit to the "Emergency Condition" is made and appropriate action is taken. Afterwards depending upon the required action, the "Emergency Condition" exits to a "Run Mode", "Cycle Out" mode or to "Hold" mode. During the "Run Mode" if no emergency situation is detected, the machine processes out the required number of copies and the "Run Mode" exits to the "Cycle Out" mode.

The "Cycle Out" mode starts the shut down routine of the machine, but since some copies are still in process in the machine, the "Cycle Out" mode returns to the "Run Mode" which in turn returns to the "Cycle Out" mode. When all the required copies are processed, the "Cycle Out" mode shuts the machine down and exits to the "Hold" condition. If the run was normal with no emergencies, the "Hold" condition exits to "Data Acquisition" to receive information for the next run. If the run had not been completed properly the information about the uncompleted run is held by the controller while it is in "Hold" and when the problem is cleared up, the machine exits to the "Start Up Sequence" to complete the run.

This is the general sequence for the machine. Now the flow charts showing the in depth details of each mode follows.

Figure 17:
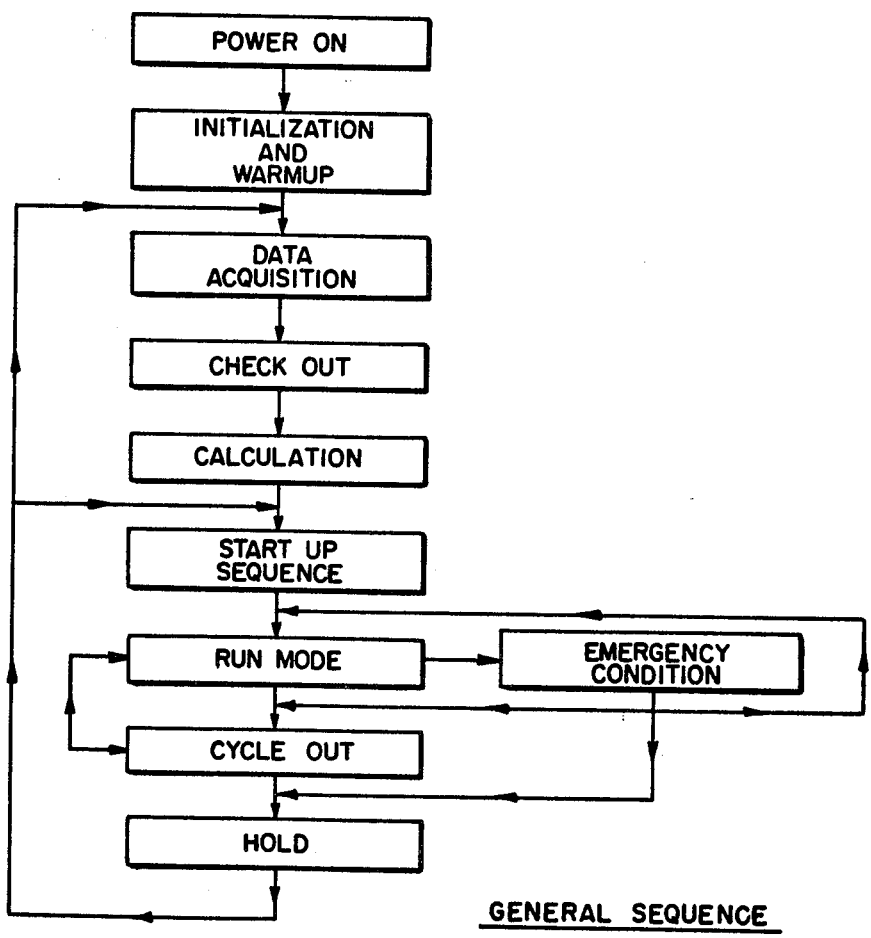
FIGS. 17 – 28 show in detail the various major component parts and the general sequence of operation shown in FIG. 16.

Power On (FIG. 17)

This is the entry point for the whole system. It is entered by pushing the ON button 520 and the only descision pont is a check to make sure the OFF button 540 is not pushed. OFF always overrides ON. We now exit to "Initialization and Warmup".

Figure 18:
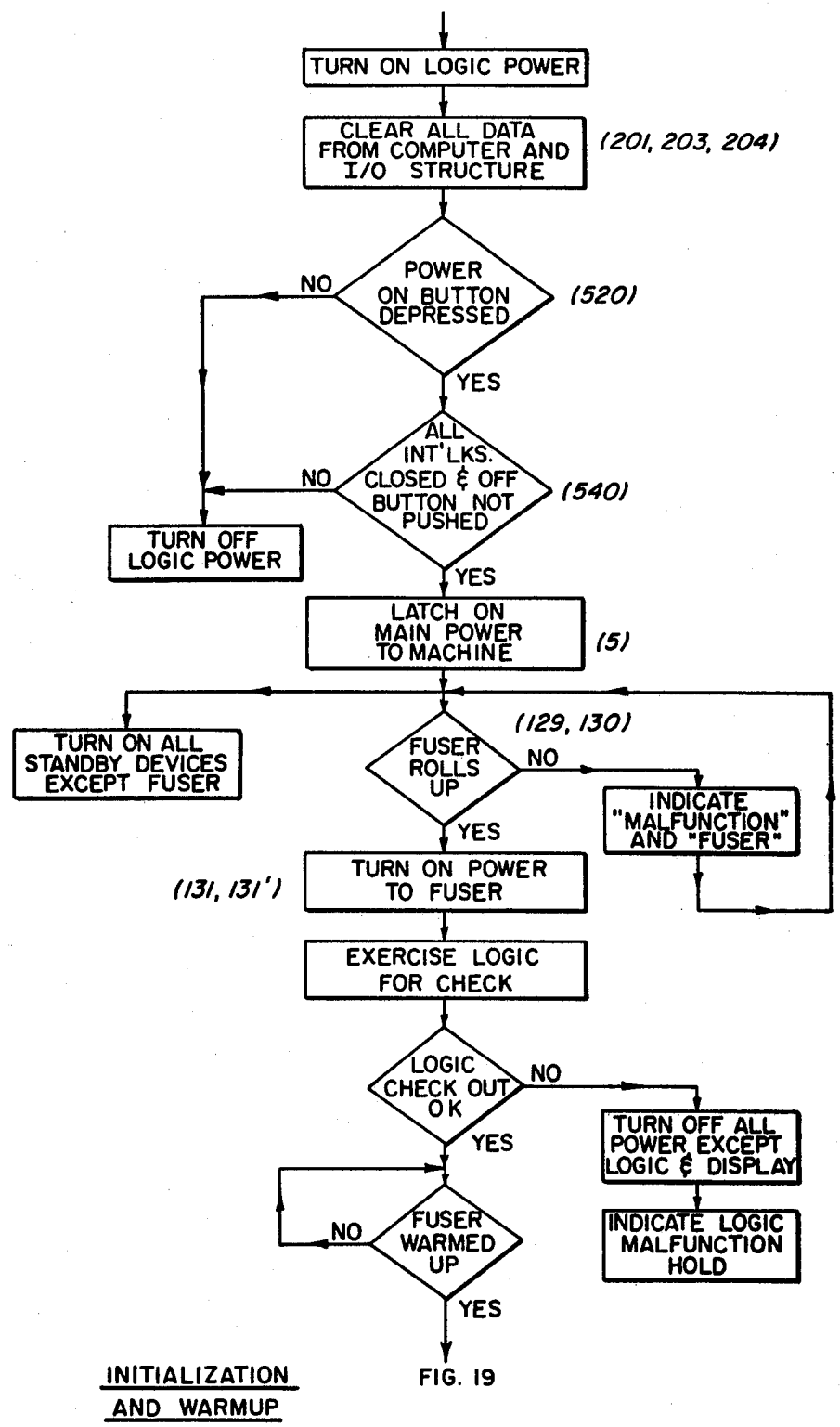

Initialization and Warmup (FIG. 18)

The first thing done upon entering this mode is to turn on the computer logic power supply. The controller goes into a routine which clears its registers and clears the output structure as described before. The ON button is checked by the controller and the interlocks are checked. If all conditions are satisfied, the main power is latched on by the controller. At this point, all the standby devices such as fuser 33 and developer 62, charge 22, etc. are turned on. RESET and POWER ON software routine described above are used to implement these steps.

If the machine had a roll fuser it would have been warmed up at this point. Since the flash fuser needs no warm up this step would be eliminated with flash fusing. A logic check is performed next and if this is successful and if there is no fuser warmup, the program exits to "Data Acquisition" shown in FIG. 19.

Figure 19:
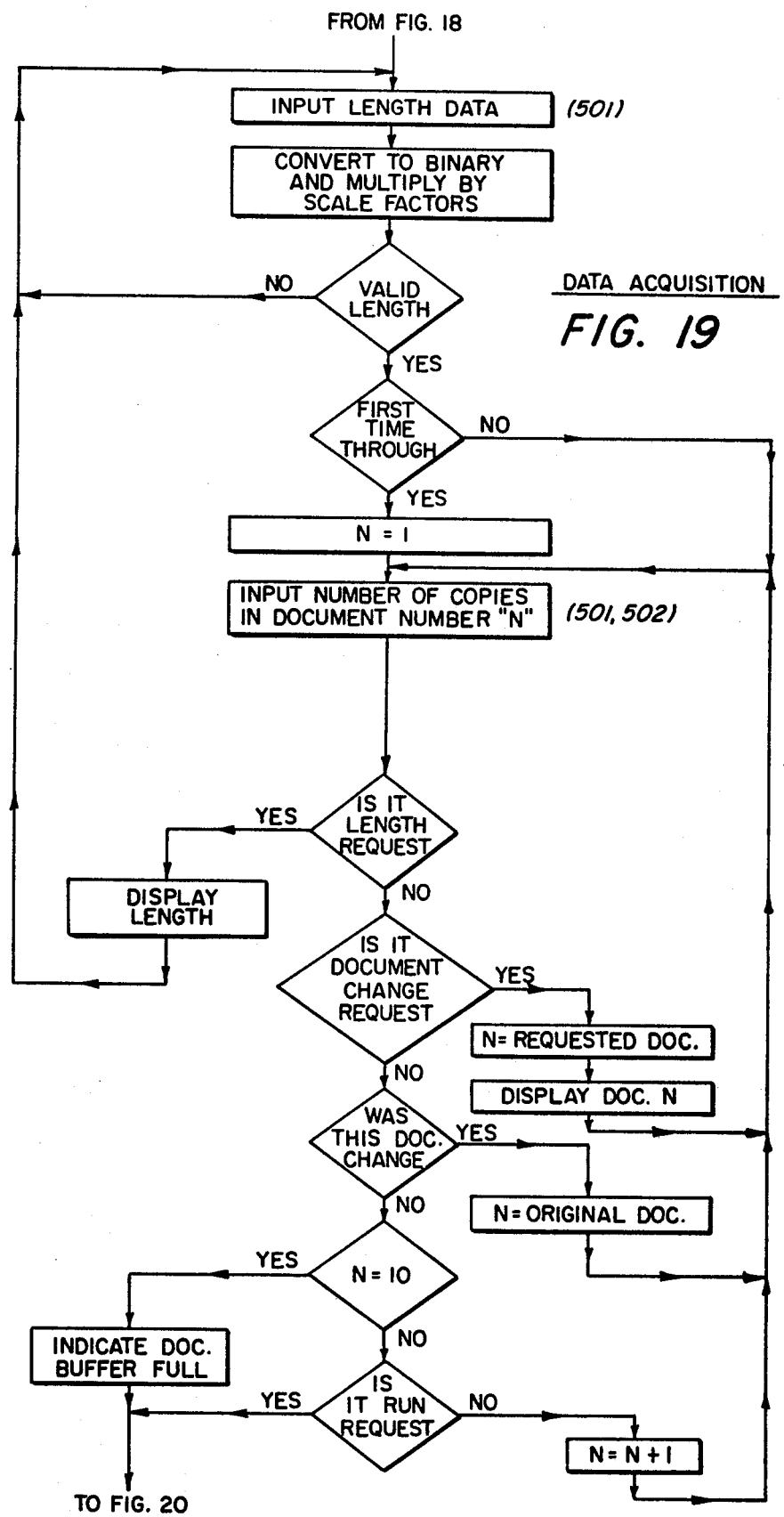

Data Acquisition (FIG. 19)

Upon entering this mode the first thing the controller requests is the input of a pitch length. This may be entered in digits via the digit keys 501. The program then converts the digits to a binary form using the proper scale factors and check to make sure that this figure falls within the machine allowable length of say between 4 and 30 inches. After the length data is satisfactorily entered, the other information on the copy run, i.e. document numbers and copy numbers and mode (i.e., simplex or duplex) are entered. Since a billing system has not been specified, billing information is not included in this discussion, but it can be easily incorporated in the program once the billing format is decided upon. The program is so written that it is possible to change the document number and page nunbers or the length data at any time before the systems enters into the "run mode" and start processing the copies. The program is written so that the document numbers and corresponding copy numbers can be entered in at random to the document buffer register 210. But the computer reads them into the computer memory in the order of sequence in which the numbers appear on film 12. If a request to change previously entered document or length data is made, the program will return to the requested location to make the change and then return back to the original location when the request for the change was made. Information for at least one document must be entered before the program can leave this mode and information for up to 10 documents can be entered before the document buffer register is considered to be full. The exit from this mode is provided by a run request or when the document table 205 is full. The capacity of document table 205 depends on the memory capacity and the configuration of the reproduction memory system. They can be readily increased by appropriate changes in the memory capacity and the software.

The "Data Acquisition" mode is implemented by the SWITCH SCAN Software routine described before.

Figure 20:
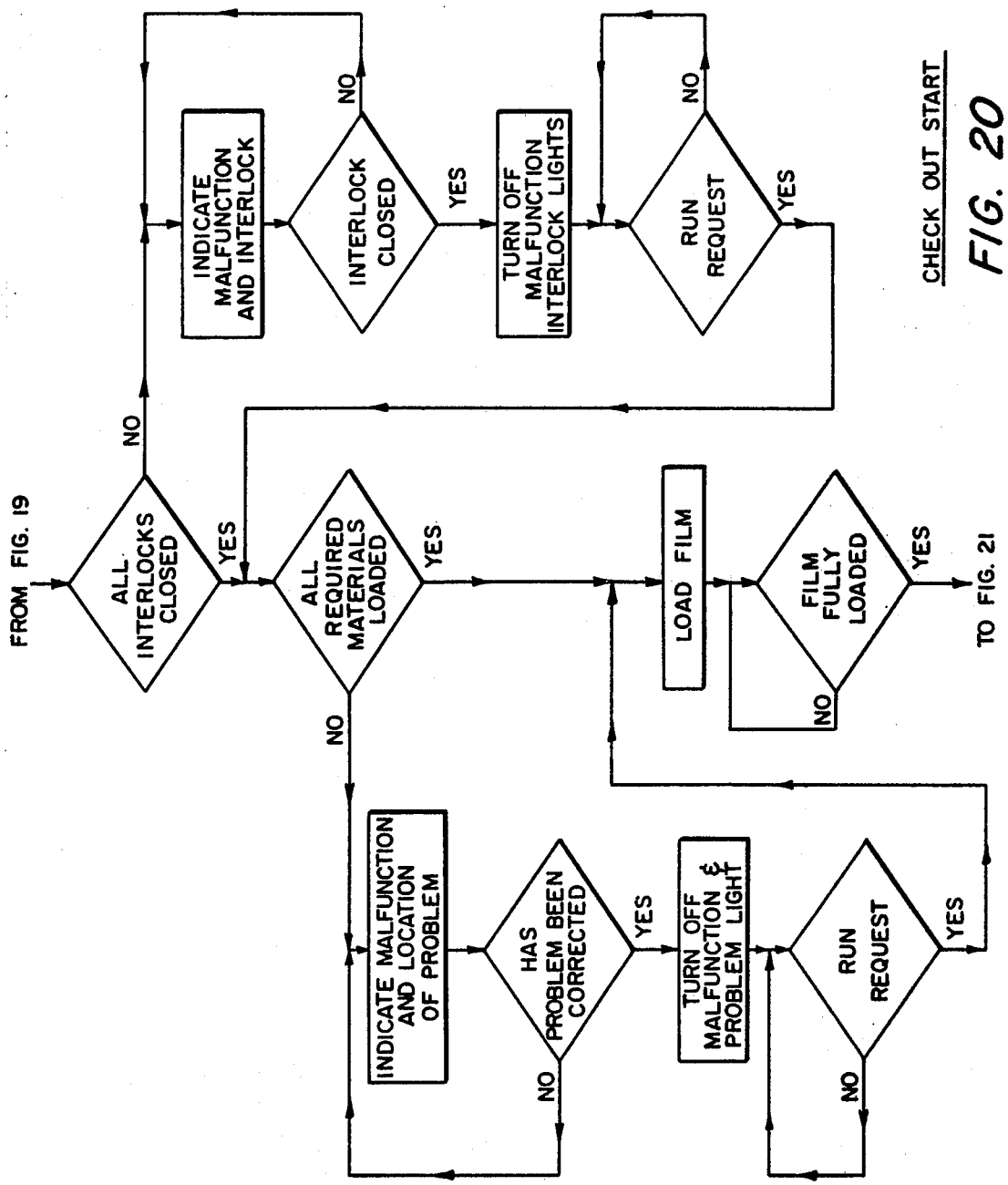

Check/Out/Start (FIG. 20)

A check out routine may be used to check out the machine 5 is made sure it is ready to run and the film 12 is loaded (FIG. 20) into the film input head (FIG. 3, 11). Successful completion of these operations allows the program to exit from this mode. Malfunction conditions of various relevant elements are checked out and if a malfunction is detected, appropriate steps are taken. SWITCH SCAN Software routine described above are written to include necessary instructional routine to implement this step.

CALCULATION (FIG, 21)

In this mode a list of the machine timing of process events is calculated based on the pitch length information and the mode of operation (i.e. simplex or duplx) in the manner described above in terms of the clock pulse count numbers between the successive machine process events in the pitch zones of the process paths as described above. Film advance and positioning is figured in so that film movement occurs between the successive machine exposure steps. As an added feature of the control, selected ones of the exposure and other steps can be skipped to avoid defective portions. For example, the pitch location immediately preceding the earliest flash is calculated so tht splices in the paper web 28 can be avoided properly.

Since the controller is limited as to the number of simultaneous events which it can handle and since only a few events have very critical time relationships, the non-critical events are adjusted i.e., time shifted, so as to eliminate simultaneous events. The calculated timing lists is then stored in the memory 206 for use. The program exists from this mode and enters into the executive mode.

Figure 22:
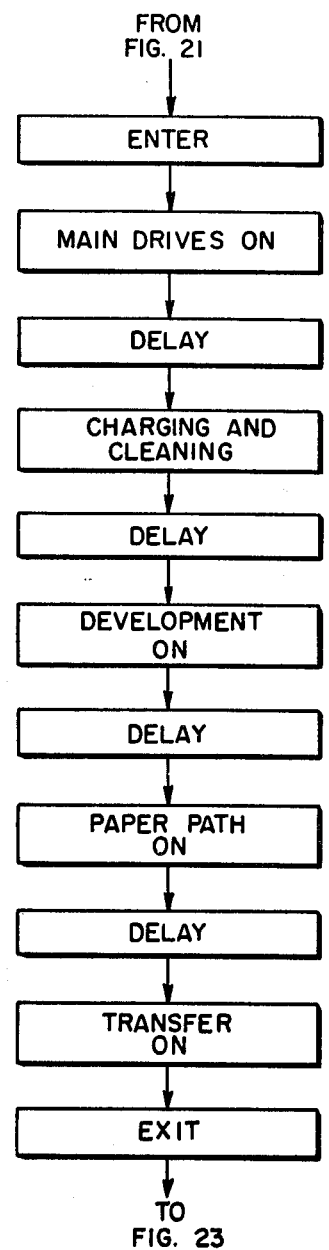

Start-up Sequence (FIG. 22)

The Start-up sequence shows a general sequence for the machine cycle up. The delays can be adjusted by the program to almost any value, although it would be easiest if they were all the same length. This sequence is implemented by the real time process event T1, T2, T3 ... Tn software routine during the EXECUTIVE mode as described above.

Figure 23:
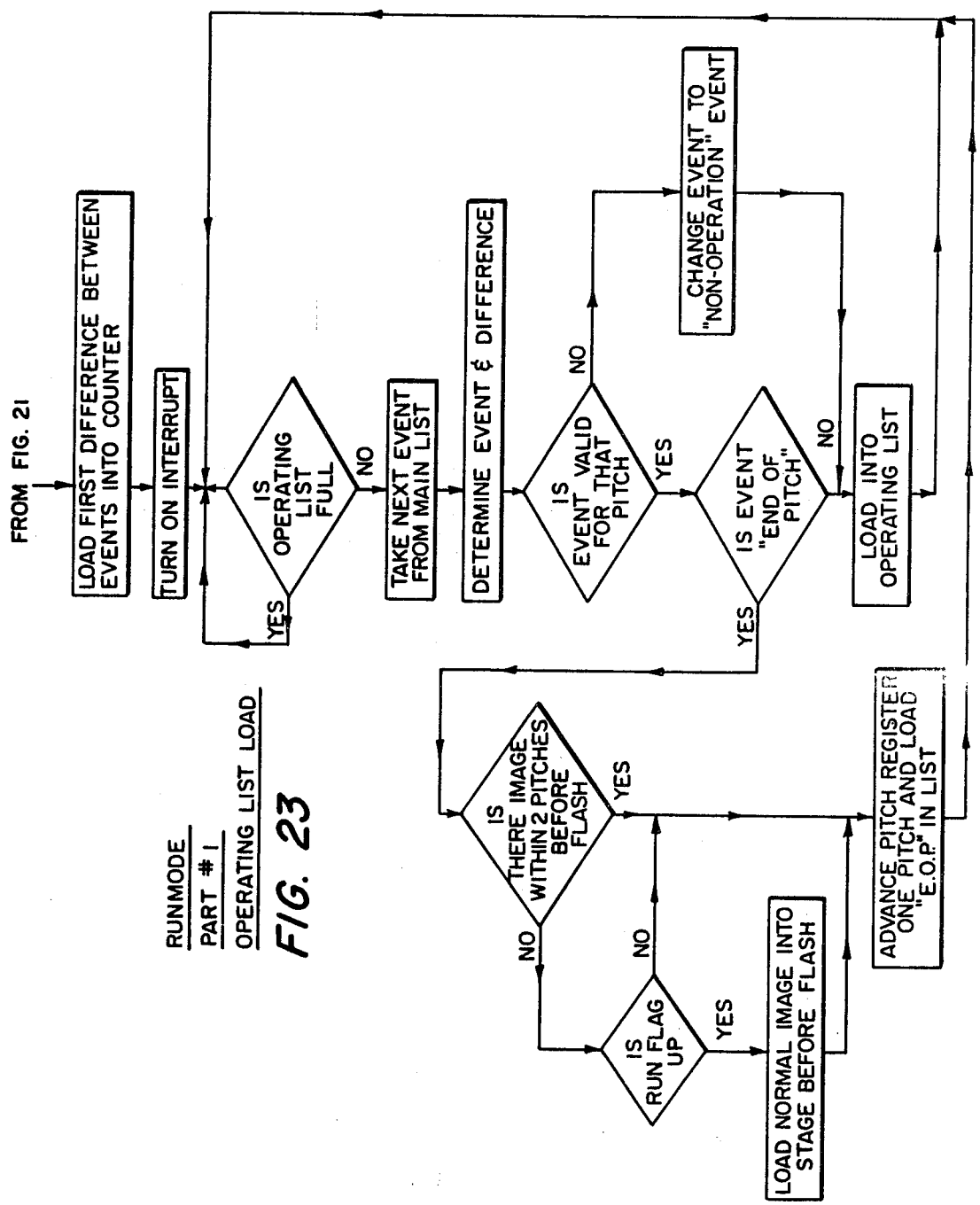

Run Mode Part I (FIG. 23)

This shows the list development program that the controller 200 implements as the controller determines what events should occur in any pitch pulse time interval according to the progress of machine operation. During this operation, conventional interrupt routine is utilized to load the counter 209 with a time interval indicating the time difference between succeeding events in the form of clock pulse counts for the intended machine process.

Figure 24:
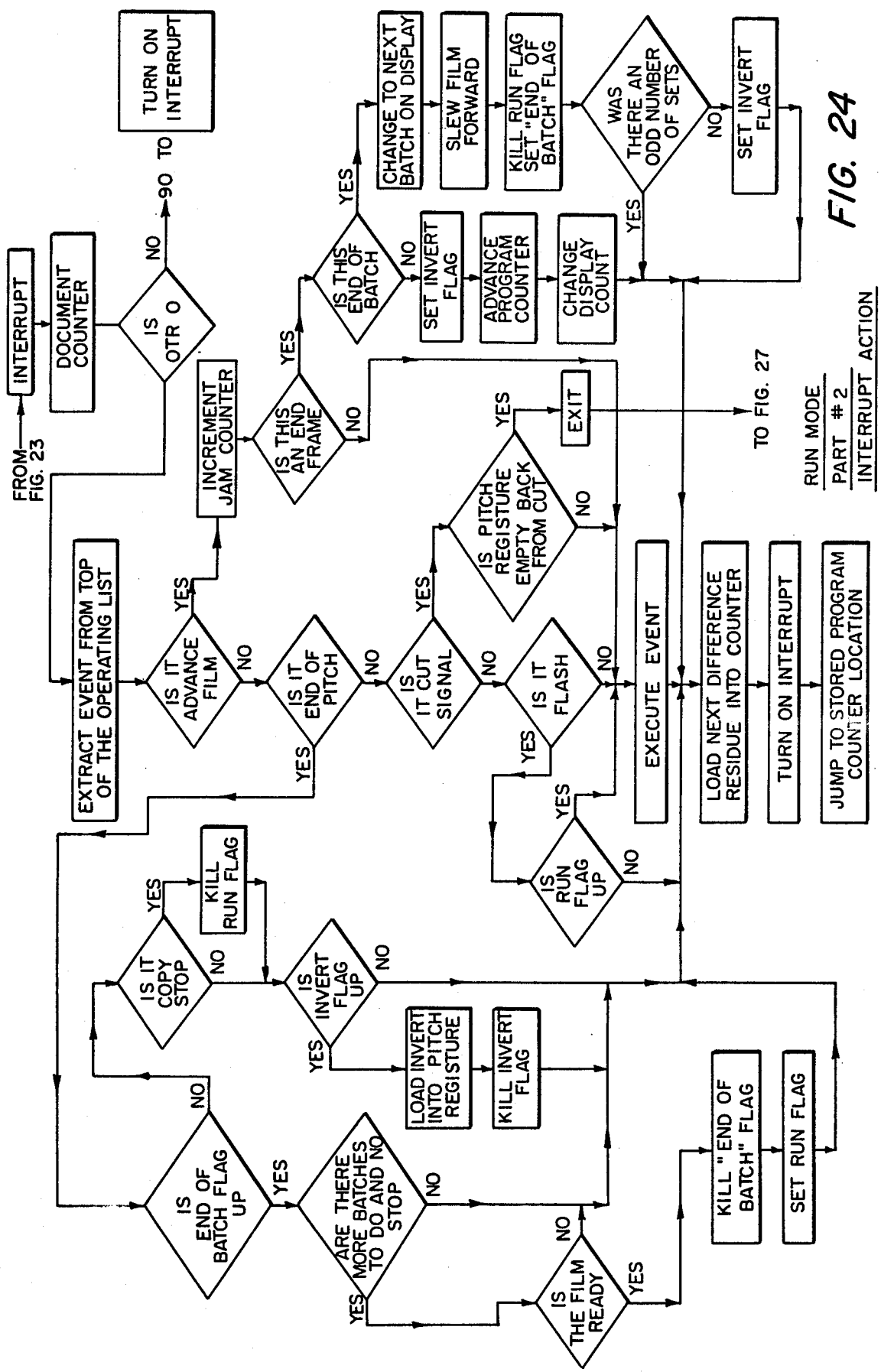

Run Mode Part II (FIG. 24)

This chart shows the flow of action when the controller has determined that the next event in the list developed in the Run Mode Part I (FIG. 23) should occur. In most cases this involves straightforward execution of the event. In the case of certain real time events, T, such as End of Pitch, Web Cutting Signal, Flush, etc. the operations must be done in real time to determine whether the event should be executed or not. For instance, before the advance film signal can be sent out, it must be determined if an end frame is present and if one is, whether the film should be advanced to the next document or more copies should be processed of the same document by reversing the direction of advancement of the film 12. The End of Pitch event does not cause the end of outputs by itself. Certain internal "housekeeping" chores are performed by the controller before this takes place. The flash signal has to check an internal flag before it is allowed to occur. The cut signal event is used to check to see if all copies have been processed out up to the cut area. If the machine is clear up to this point, the program exits to "Cycle Out", Chart 28.

Figure 25:
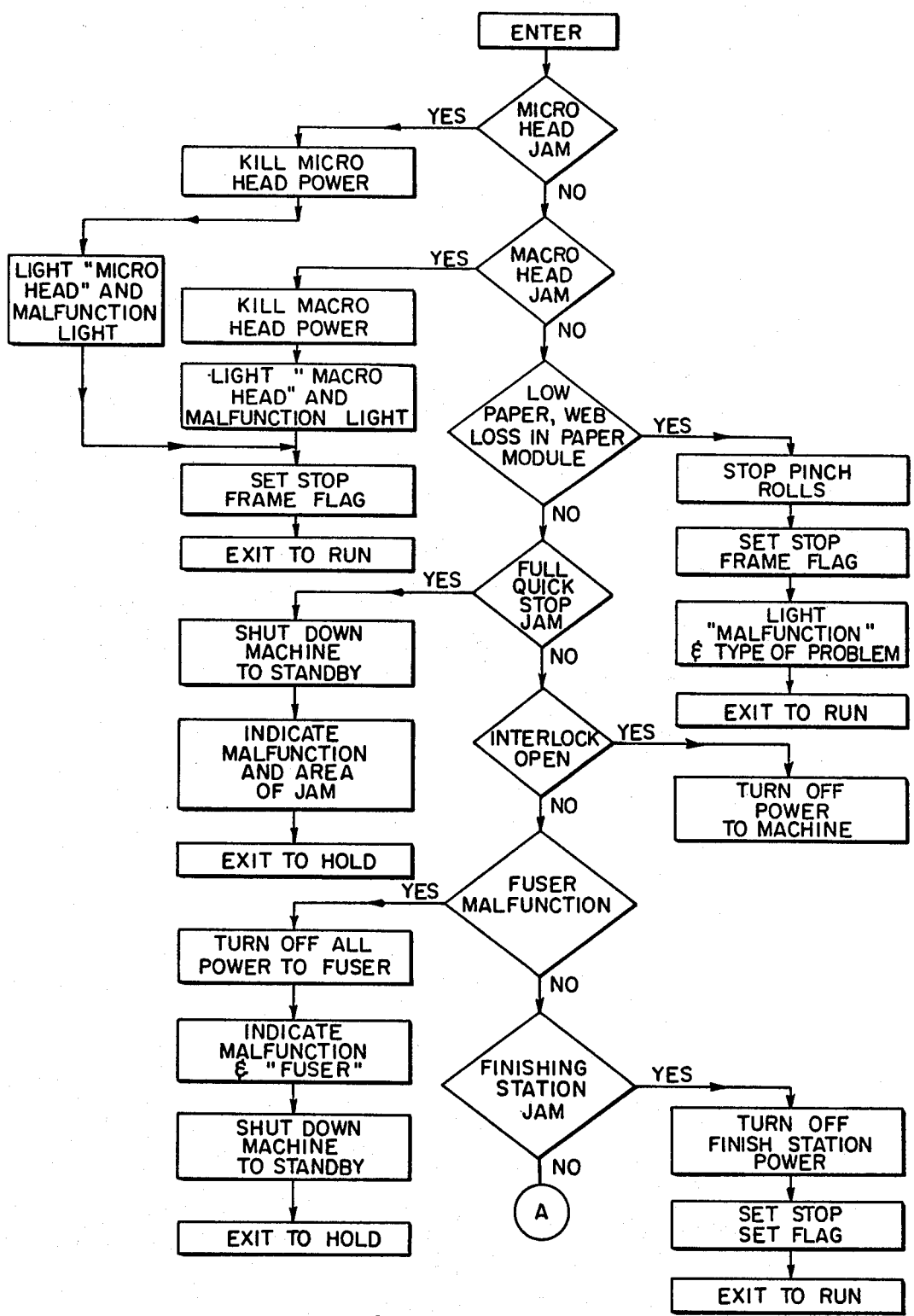
Figure 26:
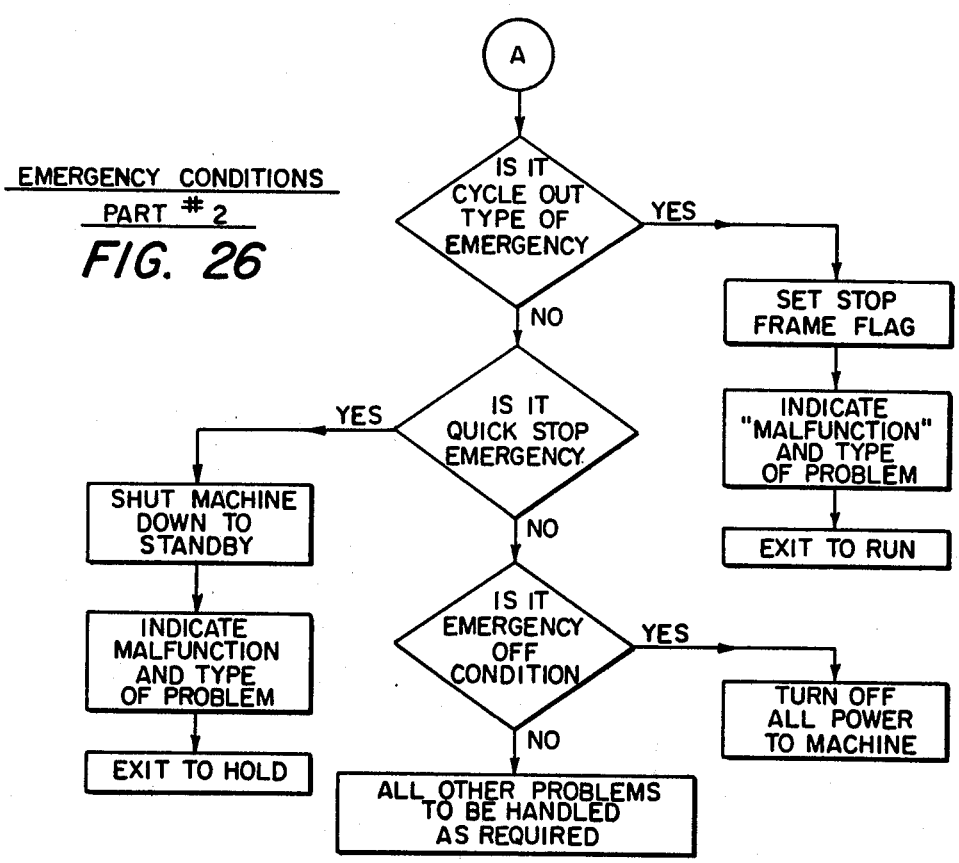

Emergency Conditions (FIGS. 25 and 26)

This mode is entered whenever an emergency condition is discovered. Basically there are three types of emergencies as defined by the actions taken when an undesired condition is detected. The first type is a cycle out type of emergency where the program acts as if the stop copy button 540 had been pushed and cycles out the machine, processing out the copies already exposed in the machine. A more severe type of emergency is the "Quick Stop" type in which the machine is shut down to standby immediately and all data is held for start-up. The most extreme type of emergency is the emergency OFF conditions in which all power to the machine is shut off immediately.

Figure 27:
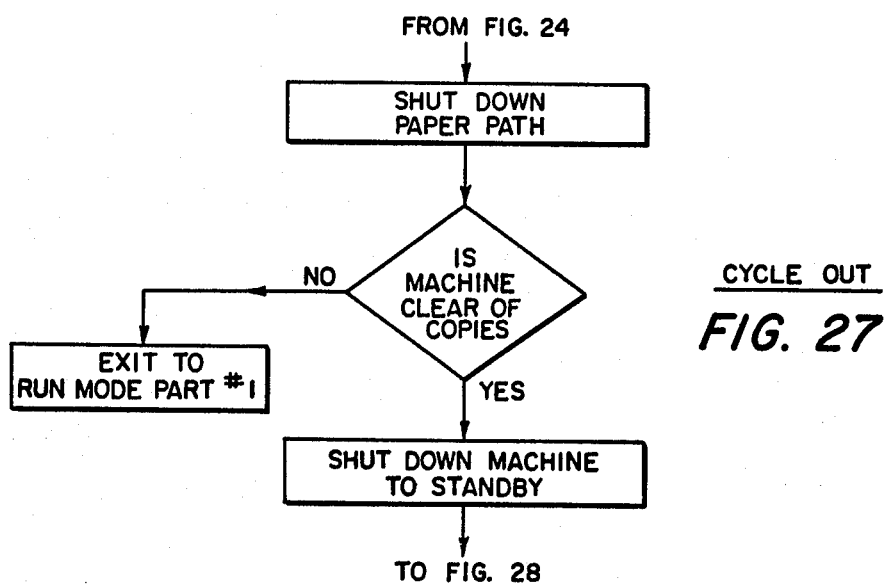

Cycle Out (FIG. 27)

This is the mode that the Run Mode Part II (FIG. 24) exits to when the machine copy sheet paper path is clear of copies up to cutting station 34. The paper path is shut down to save paper and then the rest of the process is cycled out. When the machine is completely empty of copies, the program exits of "Hold".

Figure 28:
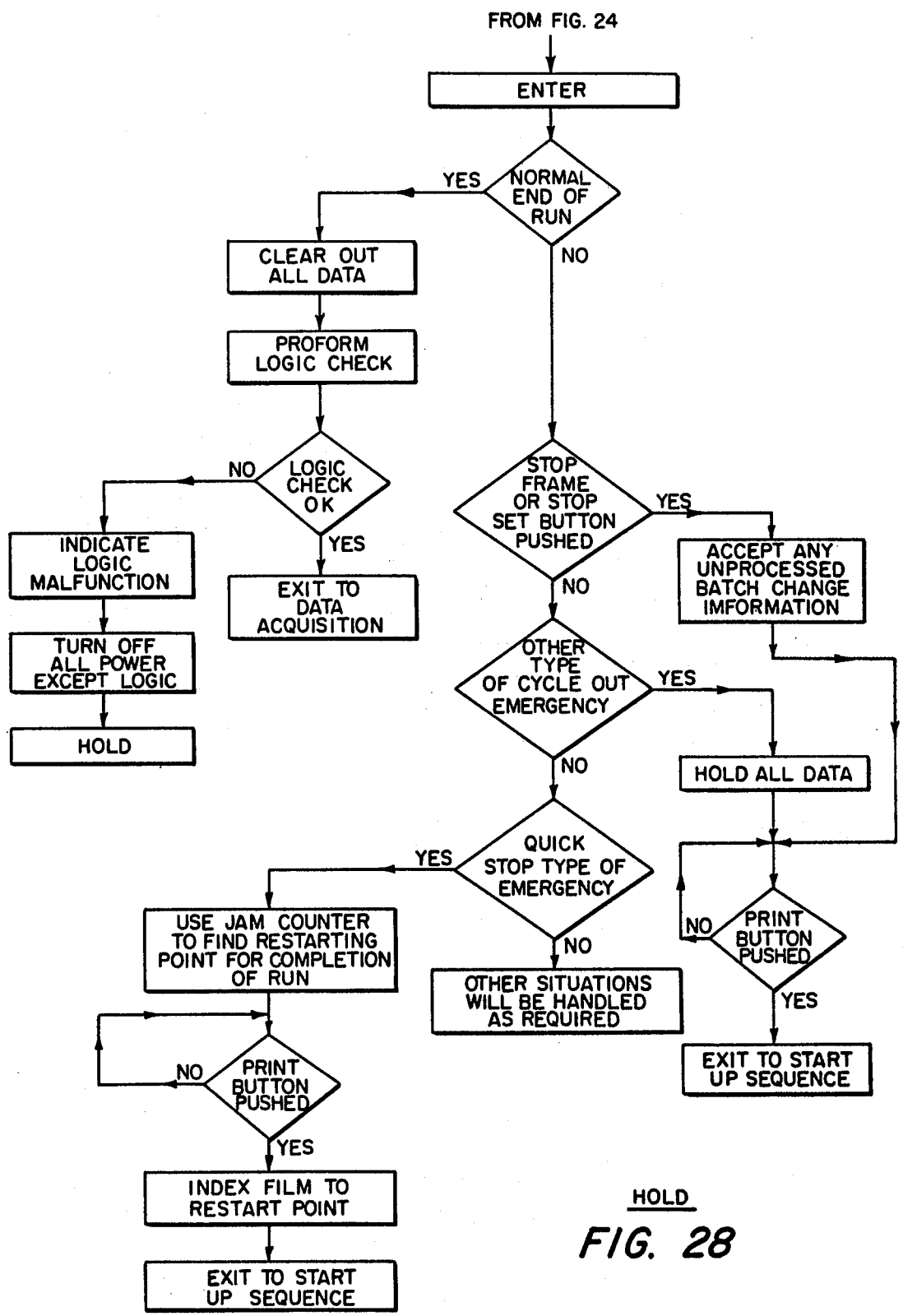

Hold (FIG. 28)

This is the mode entered from both the cycle out (FIG. 27) and emergency modes (FIGS. 25 and 26). If this is a normal end of run entrance, the old data is cleared out of the controller, a check is performed upon the logic, and the program exits to receive new data for the next run. If the termination of run was not normal, then all information is held until the problem is corrected at which point the machine can be restarted so as to complete the run. A feature of the program is that in the case of a quick stop type of emergency in which some copies are lost in process in the machine, the machine, the film 12 is automatically repositioned by the program upon restarting so that the lost copies may be reprocessed out.

In the foregoing, an electrostatographic reproducing machine with a programmable controller embodying various aspects of the present invention has been described above. Utilization of a programmable controller renders the machine highly flexible and versatile. In particular, it renders the machine to be capable of functioning as a variable pitch machine whereby the spaces or distances allotted for successive images formed and developed can be changed from reproduction run to reproduction run using stored programs and without changing any intervals circuitry.

While the principles of the present invention have been described in terms of web fed, single pass simplex duplex copier/duplicator machine, clearly the application thereof is not so limited. A person of skill in the art may modify or change the application from the teachings of the principles of the present invention without departing from the spirit and scope thereof.

What is claimed is:

1. In a synchronous reproduction machine for producing impressions of variable size and quantity from an original, the reproduction machine having a photosensitive member and a plurality of discrete operating components cooperable with one another and the photosensitive member to electrostatically produce impressions on support material, the improvement comprising:
   programming means for programming the machine to produce the impressions desired;
   control means for operating said components in timed relationship with one another to produce the desired impressions in accordance with said programming means; and
   component monitoring means for periodically checking at least one of said operating components in the intervals between actuation of said operating components to determine if said one component is functioning properly.

2. In a synchronous reproduction machine for producing impressions of variable size and quantity from an original, the reproduction machine having a photosensitive member and a plurality of discrete operating components cooperable with one another and the photosensitive member to electrostatically produce impressions on support material, the improvement comprising:
   a programmable controller for use in programming the machine to produce the impressions desired, said controller including
   a master program,
   a computer, said computer being adapted to calculate timing signals in accordance with said master program for actuating said components in timed relationship with one another to produce the impressions desired,
   memory means for storing said timing signals pending use by said controller, and
   monitoring means programmed by said master program for periodically checking the operability of at least one of said operating components in the interval between said timing signals.

3. In a synchronous reproduction machine for producing impressions of variable size and quantity from an original, the reproduction machine having a photosensitive member, a plurality of discrete operating components cooperable with one another and the photosensitive member to electrostatically produce impressions on support material, and sensing means to monitor the operational status of at least one of said components, the improvement comprising:
   a programmable controller for use in programming the machine to produce the impressions desired, said controller including
   a master program,
   a computer, said computer being adapted to calculate timing signals in accordance with said master program for actuating said components in timed relationship with one another to produce the impressions desired,
   memory means for storing said timing signals pending use by said controller, and
   monitoring means programmed by said master program for periodically checking said sensing means in the interval between said timing signals to determine the operational status of their respective components.

4. In a synchronous reproduction machine for producing impressions of variable size and quantity from an original, the reproduction machine having a photosensitive member and a plurality of discrete operating components cooperable with one another and the photosensitive member to electrostatically produce impressions on support material, the improvement comprising:
   a programmable controller for use in programming the machine to produce the impressions desired, said controller including
   a master program, and
   a computer, said computer being adapted to calculate timing signals in accordance with said master program for actuating said components in timed relationship with one another to produce the impressions desired,
   said computer including memory means for storing said timing signals pending use by said controller,
   said master program including an instruction routine for periodically updating the timing signals stored in said computer memory means.

5. The reproduction machine according to claim 4 in which said instruction routine updates the timing signals in said computer memory means in the intervals between actuation of said operating components.

* * * * *